United States Patent [19]

Noguchi et al.

[11] Patent Number: 5,399,302
[45] Date of Patent: Mar. 21, 1995

[54] PARISON LENGTH CONTROL METHOD FOR BLOW MOLDING MACHINE

[75] Inventors: Tokuji Noguchi, Ichikai; Masashi Yano, Takanezawa; Masayuki Akimoto, Kaminokawa; Mitsuo Yamanoi, Utsunomiya; Minoru Ohizumi, Tokyo, all of Japan

[73] Assignees: Kao Corpoation; Tahara Machinery Limited, both of Japan

[21] Appl. No.: 995,202

[22] Filed: Dec. 22, 1992

[30] Foreign Application Priority Data

Dec. 27, 1991 [JP] Japan .................. 3-358178
Mar. 17, 1992 [JP] Japan .................. 4-090083
Oct. 28, 1992 [JP] Japan .................. 4-311100

[51] Int. Cl.⁶ .................. B29C 49/04; B29C 49/78
[52] U.S. Cl. .................. 264/40.2; 264/40.7; 264/540; 264/541; 425/140; 425/532
[58] Field of Search .................. 264/40.1, 40.2, 40.7, 264/540, 541; 425/140, 147, 532

[56] References Cited

U.S. PATENT DOCUMENTS

| | | |
|---|---|---|
| 3,211,815 | 10/1965 | Cordiale et al. |
| 3,759,648 | 9/1973 | Hunkar |
| 3,795,719 | 3/1974 | Morecroft et al. .......... 425/145 |
| 4,382,761 | 5/1983 | Daubenbuchel et al. ...... 264/40.7 |
| 4,444,702 | 4/1984 | Thomas et al. ............. 264/40.7 |
| 4,834,643 | 5/1989 | Klinedinst et al. |

FOREIGN PATENT DOCUMENTS

| | | |
|---|---|---|
| 0026828 | 8/1980 | European Pat. Off. |
| 0472126 | 2/1992 | European Pat. Off. |
| 50-111167 | 1/1975 | Japan |
| 51-41061 | 6/1976 | Japan |
| 60-049920 | 3/1985 | Japan |
| 2169552 | 7/1986 | United Kingdom |
| 2220607 | 1/1990 | United Kingdom ......... 425/135 |
| WO91/07271 | 3/1991 | WIPO |

OTHER PUBLICATIONS

Dormeier et al., Entwicklung einer selbstanpassenden Vortforminglangenregelung (The Development of Self-Adapting Preform Length Control), Kunststoffberater, Feb. 1977.

Junk et al., Von der Prozebanalyse zur Rechnersteuerung-dargestellt am Beispiel des Extrusionblasformens (On Process Analysis of Computer Control-Illustrated with the Example of Extrusion Blow Molding, Kunstofberater, Jun. 1978.

"Regelsystem für die Vorformlinglänge," S. Dormeier, J. Sahlmen, *Plastverarbeiter*, vol. 38, No. 11, Nov. 1987, pp. 70–80.

Primary Examiner—Catherine Timm
Attorney, Agent, or Firm—Austin R. Miller

[57] ABSTRACT

A parison length control method for a blow molding machine in which a parison is extruded vertically, the end of the parison is closed, and a blowing gas is blown into the closed parison. The method includes the step of deriving a relationship between parison length and extruder screw rotation speed during a test molding process. Current parison length is then detected during normal molding operation, and the difference between the current parison length and a target parison length is derived. The extruder screw rotation speed is then controlled by calculating a correction amount for the extruder screw rotation speed based on the parison length difference in combination with the relationship between parison length and extruder screw rotation speed. The extruder screw rotation speed is then adjusted by the correction amount so as to attain the target parison length.

6 Claims, 41 Drawing Sheets

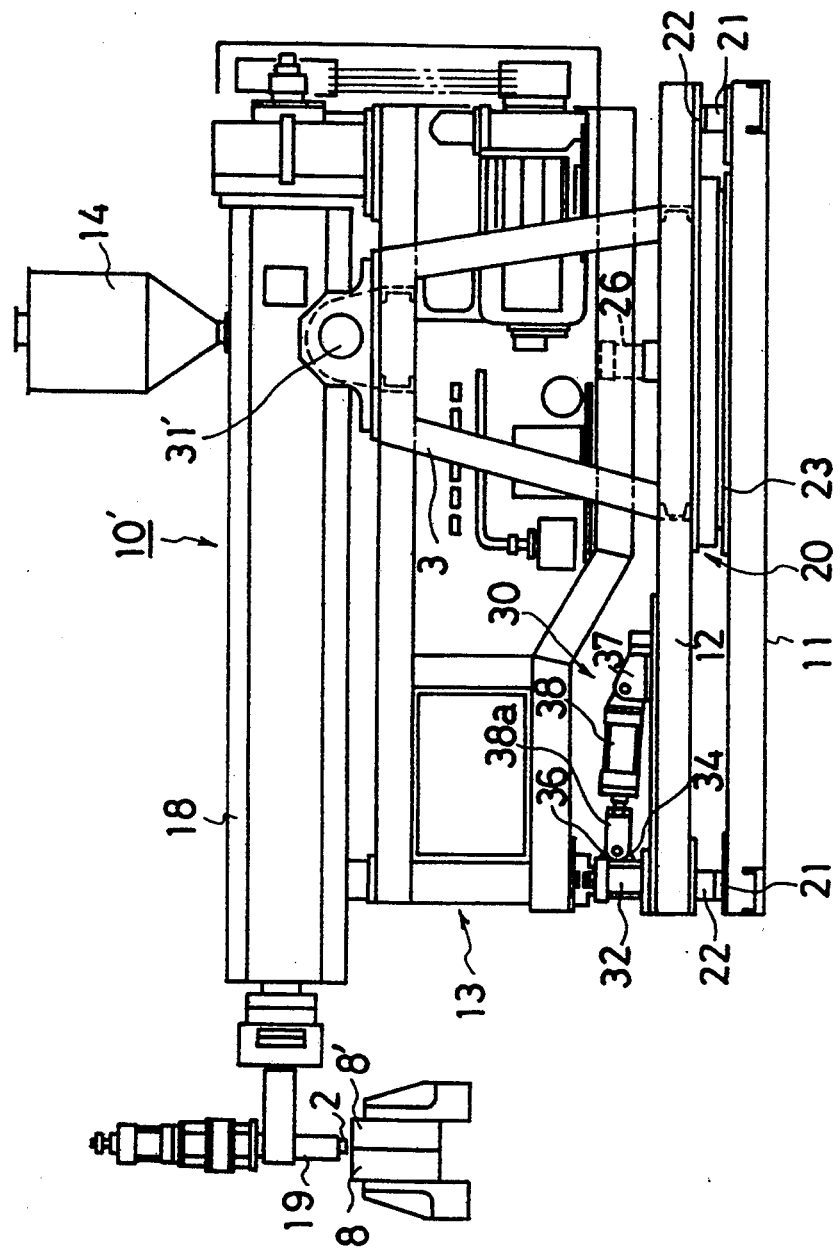

PARISON LENGTH CONTROL METHOD FOR BLOW MOLDING MACHINE

BACKGROUND OF THE INVENTION

1. Field of the Invention

The present invention relates to a method and system for removing with parison an article from a blow molding machine such as a machine for blow molding containers for detergents, decorative bottles or the like.

Also, the present invention relates to a method for controlling the length of a parison in a blow molding machine.

2. Description of the Related Art (A) Article Removing Method

Japanese Unexamined Patent Publication No. 50-111167 discloses a rotary blow molding machine for sequentially molding hollow resin articles employing a thermoplastic resin parison. Such rotary blow molding machine has a pair of rotary frames. Between the pair of rotary frames, a plurality of pairs (8 pairs) of molds which can be opened and closed by means of a locking mechanism, are disposed. Though an extruder positioned above the pair of rotary frames, a parison is supplied to each pair of molds positioned beneath the extruder sequentially on a one-by-one basis. After locking the mold the parison is sheared off the extruder by rotation of the pair of frames in a predetermined direction. After blow molding, each blow molded article is removed from the pair of opened molds by chucking flash thereof by a chuck of an article removing device.

However, in the above-mentioned conventional rotary blow molding machine, the parison supplied to the pair of molds is apt to be sheared off the extruder upon rotation of the pair of rotary frames. The flash at the upper end of the parison, which extends upwardly from the upper surface of the pair of molds, tends to fall down to the upper surface of the pair of molds so that it may be solidified in the fallen position to become the flash of the blow molding article. In such case, difficulty has been encountered in chucking such flash by the chuck of the article removing device.

Also, since the articles removed by the article removing device are discharged to downstream processes for quality discrimination, it is possible that defective articles will be supplied to the downstream processes.

(B) Parison Length Control Method

The blow molding machine performs blow molding by the processes of downwardly extruding the parison from the extruder, closing the end of the parison, injecting a blowing gas into the closed parison to expand the parison it has the configuration of the cavity.

To this end, the length of the parison extruded from the extruder has to be controlled to a constant length for the reasons ①~③ set out below.

① The thickness of the parison extruded from the extruder is cyclically controlled at a regular interval toward a target parison length in order to provide desired thickness for the articles after blow molding. Accordingly, in order to obtain high precision thickness distribution of the article with the cyclically performed parison thickness control, it becomes necessary to accurately maintain a constant parison length at the time of closing the molds.

② When the length of the parison is excessive, the length of the lower end of the parison protruding from the molds becomes excessive, causing substantial loss of material.

③ When the parison is too short, it becomes difficult to clamp the lower end of the parison to the molds and makes blow molding impossible. Therefore, in the prior art, proposals were made for controlling parison length, as disclosed in U.S. Pat. No. 3,759,648 and Japanese Unexamined Patent Publication No. 51-41061.

The method disclosed in U.S. Pat. No. 3,759,648 performs discrimination whether the parison length is sufficiently long or too short by checking whether or not the parison reaches a position to block a light beam of a phototube unit. This is done with specific timing with respect to the clamping timing. Based on the results of this discrimination the screw rotation speed of the extruder is modified to ensure a given length of the parison in accordance with the clamping timing.

The method disclosed in Japanese Unexamined Patent Publication No. 51-41061 includes two sets of phototube units arranged below the extruder so as to discriminate regarding the length of the parison in such a manner that (a) when the light beams of both phototube units are not blocked by the parison, the decision is made that the parison length is too short, (b) when the light beam of only the upper phototube unit is blocked, the parison length is proper, and (c) when the light beams of both of the phototube units are blocked, the parison is too long. Based on these results the clamping timing is modified so as to ensure a constant length of parison in accordance with the clamping timing.

However, the prior art set forth above encounters the following problems ①~③.

① In both U.S. Pat. No. 3,759,648 and Japanese Unexamined Patent Publication No. 51-41061, the relationship between the object to be monitored (parison length) and the variable to be controlled (screw rotation speed of the extruder or the clamping timing) is so indefinite that the control constant has to be determined on a trial-and-error basis. Therefore, it takes a long time to determine the optimal value. Furthermore, reproductivity of the control is rather poor.

e,crc/2/ In both U.S. Pat. No. 3,759,648 and Japanese Unexamined Patent Publication No. 51-41061, discrimination is made only as to whether the current parison is too long or too short, ignoring the offset magnitude from the target value (parison length difference). Therefore the control, depending upon parison length difference, cannot be performed to maintain precision level of control. In addition, when the offset magnitude is relatively small, it often causes hunting of the control and when the offset magnitude is relatively large the control takes a relatively long time.

③ In Japanese Unexamined Patent Publication No. 51-41061, since the variable to be controlled is the timing of clamping, difficulty is encountered in synchronization of operation with the parison thickness control which is performed cyclically at a regular interval. This tends to cause degradation of precision of thickness distribution in the article. Furthermore, modification of clamping timing causes necessity of adjustment of operation timing and/or operation speed of the mechanical system and accordingly reduces the efficiency of the molding operation.

SUMMARY OF THE INVENTION

It is an object of the present invention to provide an article removal process assuring removal of articles with good discrimination between normal products and defective products for discharge to do this under sequential operations without interruption of the operations, and to do this at any time during the operation from molding start up to normal operation.

Another object of the invention is to provide a process which enables quick determination of control variables corresponding to the resin to be used or currently used, provides increasing precision of parison length control, achieves increasing precision of thickness distribution of articles, and offers ready adaption to high speed molding.

(A) Article Removing Method

According to an important aspect of the invention, there is provided an article removing process for a blow molding machine, in which a mold for clamping a parison is arranged below an extruder extruding the parison, the parison is cut above the upper surface of the mold so as to leave an upper flash on a molded article, comprising the steps of:

correcting the configuration of the upper end of the parison into a flat and vertically extending configuration before solidification;

performing quality discrimination for discriminating a normal article from a defective article during a step between the stage of initiation of extrusion of the parison and the stage of removing the article; and chucking the upper flash at an article removing stage to discharge the removed articles to a normal article discharging destination for the normal article and alternatively discharging defective articles to a defective discharging destination on the basis of the result of the quality discrimination.

The article removing process includes the feature that the defective discrimination includes:

(a) means for judging whether the parison is defective upon initiation of molding operation;
(b) means for judging whether the parison is defective when its length is outside a target length range;
(c) means for detecting blowing gas supply failure during parison blowing;
(d) means for detecting failure of downstream facility following the blow molding machine;
(e) means for detecting absence of an article at the article removing station;
(f) means for detecting when lower flash of article is not present at a predetermined position at the article removing station;
(g) means for detecting abnormality when the article removing device erroneously holds an article; and
(h) means for detecting defects in articles molded by molds on which the absence of an article is detected in the above-mentioned item (e) in preceding cycle.

According to a still further aspect of the invention, there is provided an article removing system for a blow molding machine, in which a mold for clamping a parison is arranged below an extruder extruding the parison, wherein the parison is cut above the upper surface of the mold so as to leave an upper flash on a molded article, comprising:

a flash configuration correcting device provided above the mold and arranged to shape the upper end of the parison into a flat and vertically extending configuration before solidification of the parison;

an article removing device arranged to clamp an upper flash of the molded article and to remove the article from the mold; and a defective discrimination control device for performing quality discrimination for discriminating between a normal article and a defective article during the process between a step of initiation of extrusion of the parison and the step of removing the article and controlling the article removing device to discharge the removed article to a normal article discharge destination for the normal articles and to a defective discharge destination for the defective articles, all on the basis of the results of quality discriminations.

According to a still further aspect of the invention, there is provided an article removing system for a blow molding machine in which a mold for clamping a parison is arranged below an extruder extruding the parison, the parison is cut above the upper surface of the mold so as to leave an upper flash on a molded article, comprising:

an article removing device provided above the mold and shaping the upper end of the parison into a flat and vertically extending configuration before solidification of the parison, and clamping an upper flash of the molded article and removing the article from the mold; and a defective discrimination control device for performing quality discrimination for discriminating a normal article and a defective article during a process between initiation of extrusion of the parison and removing the article and controlling the discharge of the removed articles to a normal article discharging destination for the normal articles and to a defective discharging destination for the defective articles, all on the basis of the result of the quality discrimination.

According to the present invention, the following effects (1) to (4) can be achieved.

(1) Since the shown embodiment shapes the upper end of the parison extending upwardly from the upper surfaces of the molds into a flat and vertically extending configuration before solidification, the upper flash can be certainly and readily chucked. Accordingly, removal of the articles can be assured and a continuous operation performed without stopping operation throughout initiation of molding to the normal operating condition.

(2) By discriminating between normal articles and defective articles during the stage between starting extrusion of the parison to removal of the article, normal articles are discharged to the destination for the normal produce (normal article discharging conveyer) and the defective articles are discharged to the destination for the defectives (defective discharging conveyer). Accordingly, not only in the molding process, but also in the article removing process, quality discrimination between the normal articles and the defective articles can be performed to accurately discharge the normal articles and the defective ones separately.

(3) By the above-mentioned effect (1), the defective articles upon initiation of the molding operation can be automatically discharged without stopping the machine. This enables automating the initial operation.

(4) By the above-mentioned effects (1) and (2), the defective articles in normal operation can be automatically taken out without stopping the machine to eliminate the necessity of re-starting the operation associated with stopping of the machine, and avoiding discharging of the defective articles to the downstream processes. Therefore, sequential molding can be achieved.

(B) Parison Length Control Method

According to still another aspect of the invention, there is provided a parison length control method for a blow molding machine, in which a parison is extruded from a extruder to hang, the end of the parison is closed and a blowing gas is blown into the closed parison. The method comprises the steps of:

preliminarily deriving a target relationship between a parison length of a resin to be used and the screw rotation speed of the extruder depending upon the resin to be used, during a test molding process;

detecting a current parison length during normal molding operation;

deriving a parison length difference between the current parison length and the target parison length;

controlling the extruder screw rotation speed by calculating a correction amount for the extruder screw rotation speed according to the preliminarily determined relationship between the parison length and the extruder screw rotation speed to attain the target parison length.

According to still another aspect of the invention, the parison length control method for a blow molding machine according to the foregoing aspect of the invention, further comprises a step of deriving a fluctuation of the current parison length over a relatively short period and setting a width of a deadband, in which deadband no correction of the extruder screw rotation speed is performed, all on the basis of the magnitude of the fluctuation.

According to yet another aspect of the invention, the parison length control method for a blow molding machine according to the above-mentioned aspects, features in that a period, in which a light is blocked by the parison, is measured by a phototube provided below the extruder and the measured period is used as a value corresponding to the current parison length.

In accordance with the invention, the following effects (1) to (5) are achieved.

(1) The control constant is calculated automatically. Accordingly, the control constant can be derived quickly without relying on the operator's trial and error, and thus provides good reproducing ability of the control.

(2) Since the control constant can be derived corresponding to the resin, it may provide high precision of control.

(3) Since the parison length is controlled on the basis of the error (parison length difference) between the current parison length and the target parison length, high precision can be provided for control. Also, since the control is performed depending upon the parison length difference, possibility of causing hunting can be reduced and the converging period can be shortened.

(4) Since the object of control is the extruder screw rotation speed and need not modify the timing of locking of the molds, synchronization to the parison thickness control which is performed cyclically with a constant interval can be facilitated. In addition, since the parison length can be controlled to be constant, the thickness distribution of the article can be controlled with high precision.

(5) Since the locking timing of the molds is not necessarily modified, it is unnecessary to adjust the operation timing and the operation speed of the mechanical system to permit adaption for high speed molding.

According to the invention, the following effects (6) and (7) can be achieved.

(6) The deadband can be controlled on the basis of the data reflecting the fluctuation of the current parison length with respect to the molding device to be actually used. Therefore, the deadband can be controlled to the proper range to avoid hunting.

(7) The deadband can be calculated automatically. Accordingly, the deadband can be set quickly without requiring trial and error of the operator. Also, high reproducing ability can be achieved.

According to the invention, the following effect of (8) can be achieved.

(8) The current parison length is calculated from the light blocking period, making it possible to certainly and easily derive the parison length.

According to still another embodiment of the invention, there is provided a parison length control method for a blow molding machine, in which a parison is extruded from a extruder to hang, the end of the parison is closed and a blowing gas is blown into the closed parison, the method comprising the steps of:

detecting a current parison length during normal molding operation;

deriving a parison length difference between the current parison length and a target parison length and deriving a relationship between the parison length of a resin to be used and the screw rotation speed of the extruder; and controlling the extruder screw rotation speed by calculating a correction amount for the extruder screw rotation speed according to the determined relationship to attain the target parison length.

According to still another aspect of the invention, the parison length control method for a blow molding machine according to the foregoing aspect of the invention, further comprises the step of deriving a fluctuation of the current parison length over a relatively short period and setting a width of a deadband, in which the correction of the extruder screw rotation speed is not performed, on the basis of the magnitude of the fluctuation.

According to still another aspect of the invention, the parison length control method for a blow molding machine according to the above-mentioned aspects, the period when light is blocked by the parison is measured by a phototube provided below the extruder and the measured period is used as a value corresponding to the current parison length.

With the above-mentioned aspects of the invention, the following effects of (1) to (5) are achieved.

(1) The control constant is calculated automatically. Accordingly, the control constant can be derived quickly without relying on the operator's trial and error, and thus provides high reproducing ability of the control.

(2) The control constant can be derived with respect to the current used resin, and especially depending upon the property variation of the resin in real time. Accordingly, high precision control can be achieved.

In addition, (a) since it becomes unnecessary to preliminarily perform tests to obtain the control constant, and since the control constant can be derived during the normal molding process, it becomes possible to save the resin and power required for testing. (b) Even when the die head comprising the die and core is modified for new resin and for new parison configuration, a normal molding operation for obtaining normal products can be directly initiated without performing the test process. (c) When the control constant derived through the test process is employed, it is possible that the control constant will fall outside the optimal value, due to variation of the property of the resin resulting from variation of the resin between lots, or due to variation of the mixture ratio of a recycled resin, to lower the precision of control. The present invention is adapted to derive the control constant from time to time, so that the control constant can be always maintained at the optimal value to permit optimal control.

(3) Since the parison length is controlled on the basis of the error (parison length difference) between the current parison length and the target parison length, high precision can be provided for control. Also, since the control is performed depending upon the parison length difference, possibility of causing hunting can be reduced and the converging period can be shortened.

(4) Since the object of control is the extruder screw rotation speed and not the timing of locking of the molds, synchronization to the parison thickness control which is performed cyclically with a constant interval can be facilitated. In addition, since the parison length can be controlled to be constant, the thickness distribution of the article can be controlled with high precision.

(5) Since the locking timing of the molds is not modified, it is unnecessary to adjust the operation timing and the operation speed of the mechanical system to permit adaption for high speed molding.

According to the invention, the following effects (6) and (7) can be achieved.

(6) The deadband can be set on the basis of the data reflecting the fluctuation of the current parison length with respect to the molding device to be actually used. Therefore, the deadband can be set at the proper range to successfully avoid hunting.

(7) The deadband can be calculated automatically. Accordingly, the deadband can be set quickly without requiring trial and error of the operator. Also, high reproducing ability can be achieved.

According to the invention, the following effect (8) can be achieved.

(8) The current parison length is calculated from the light blocking period, so that it becomes possible to certainly and easily derive the parison length.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention but are for explanation and understanding only.

In the drawings:

(A) Article Removing Method

Figure 1:
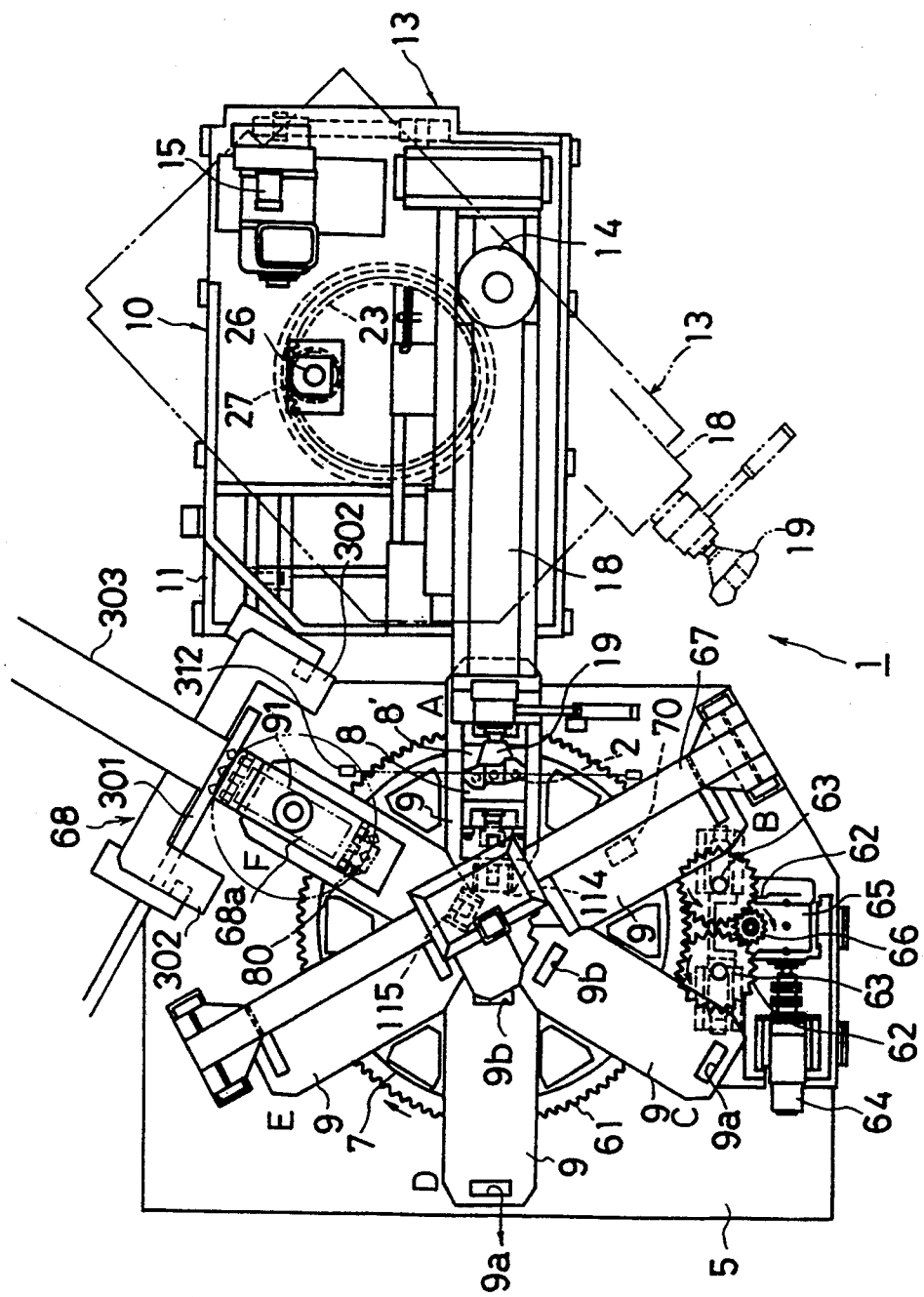
Figure 2:
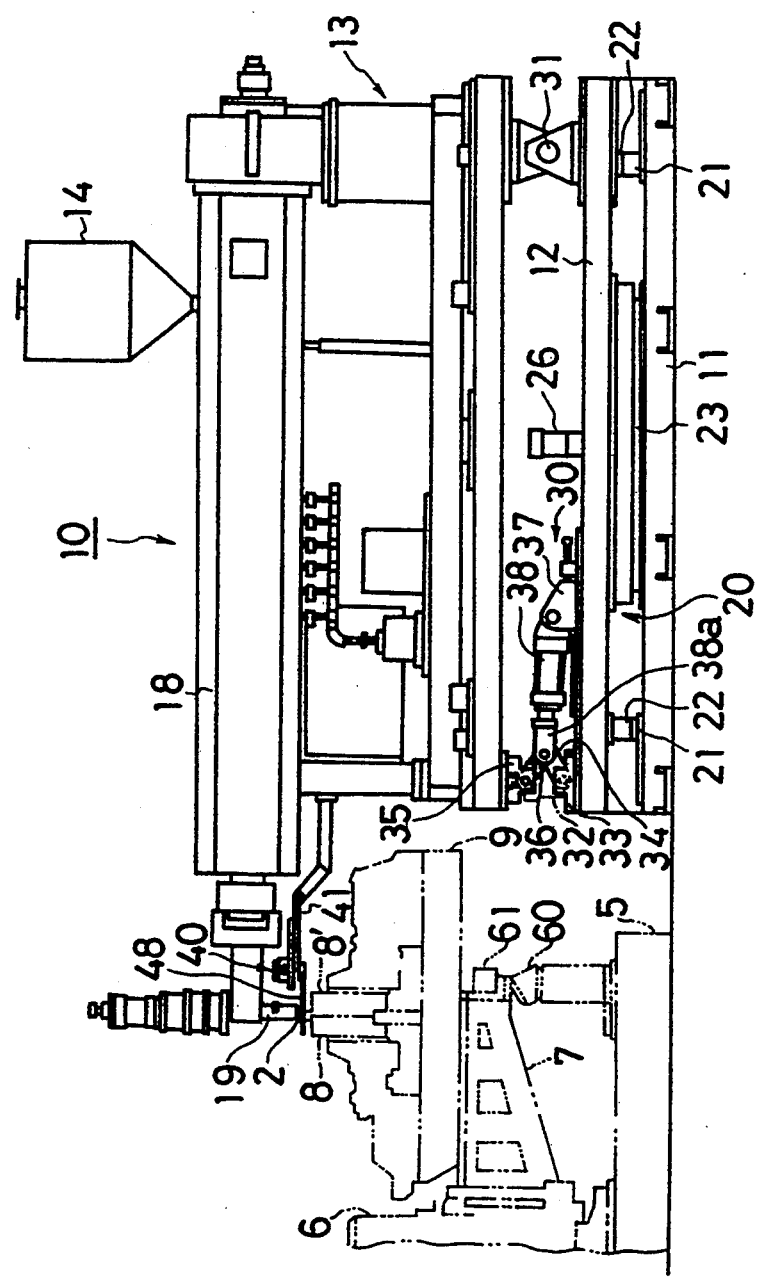
Figure 3:
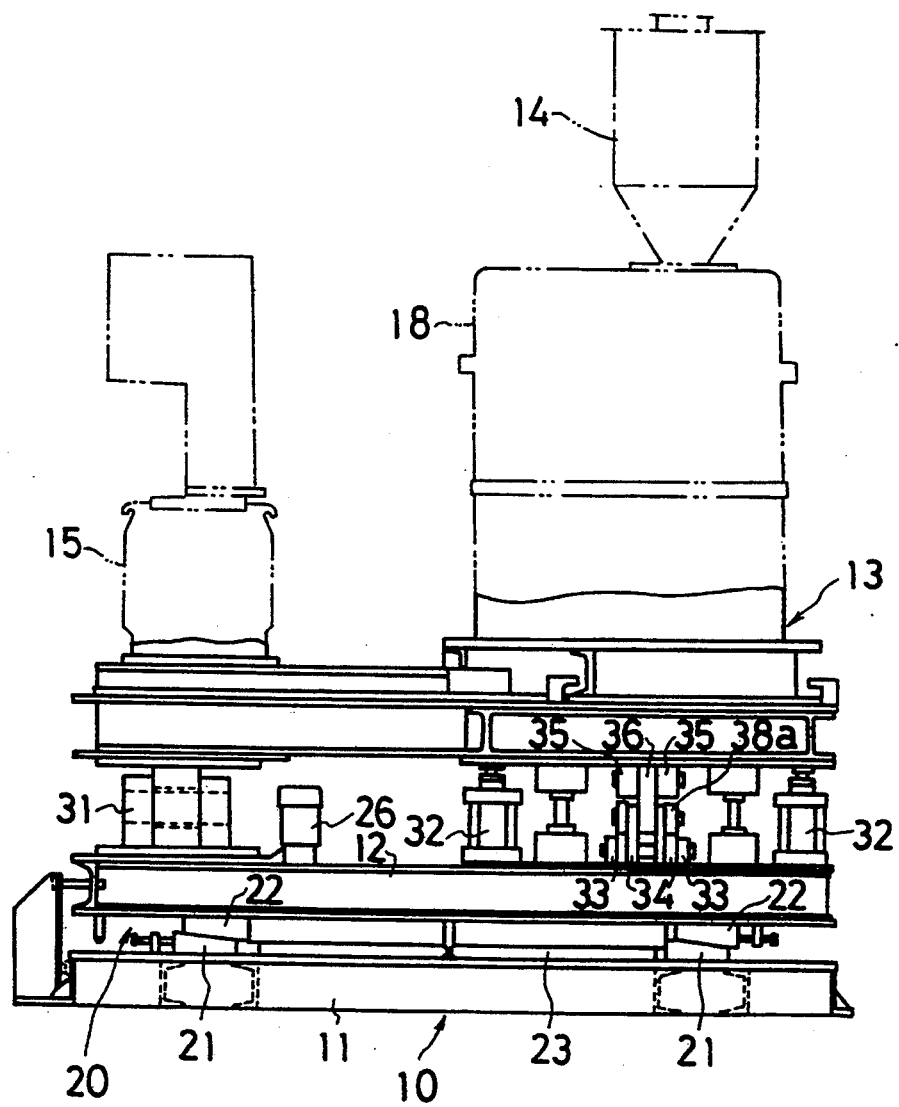
Figure 4:
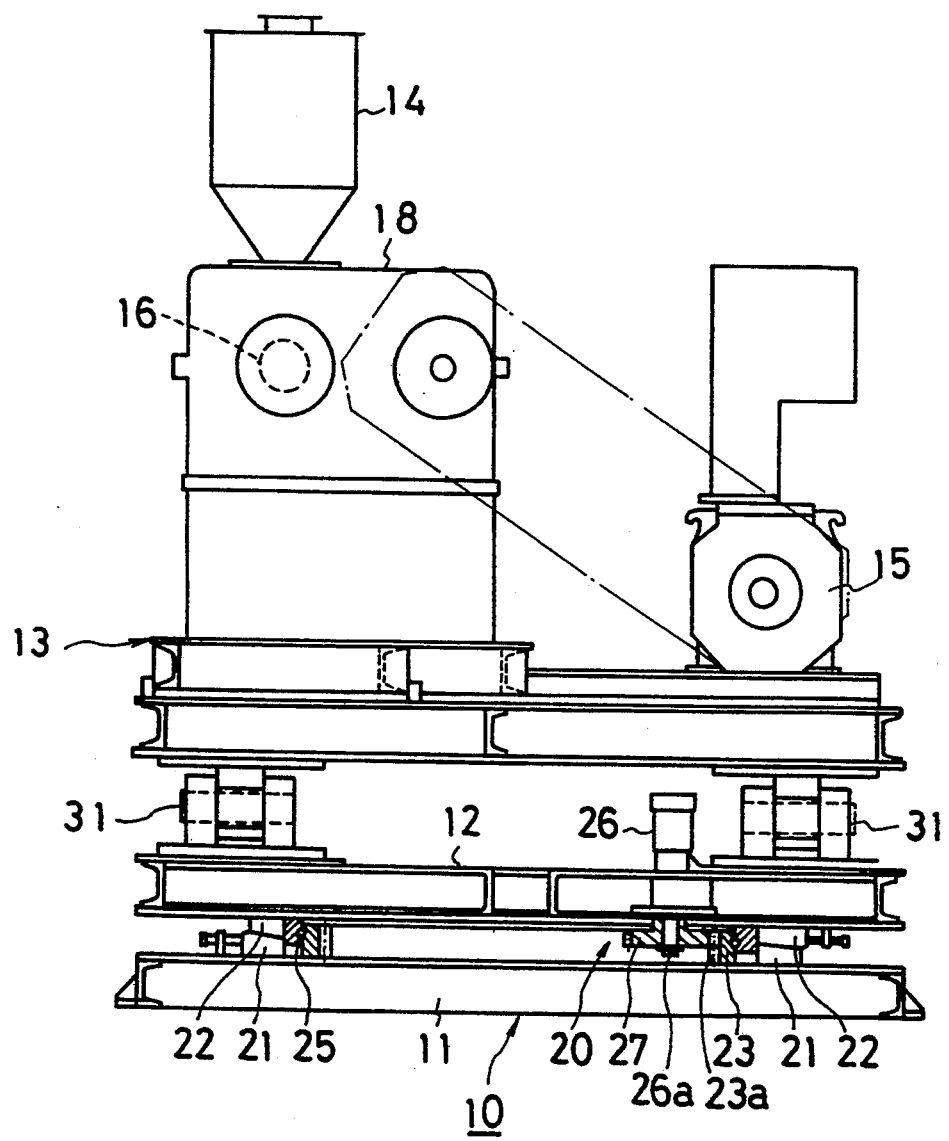
Figure 5:
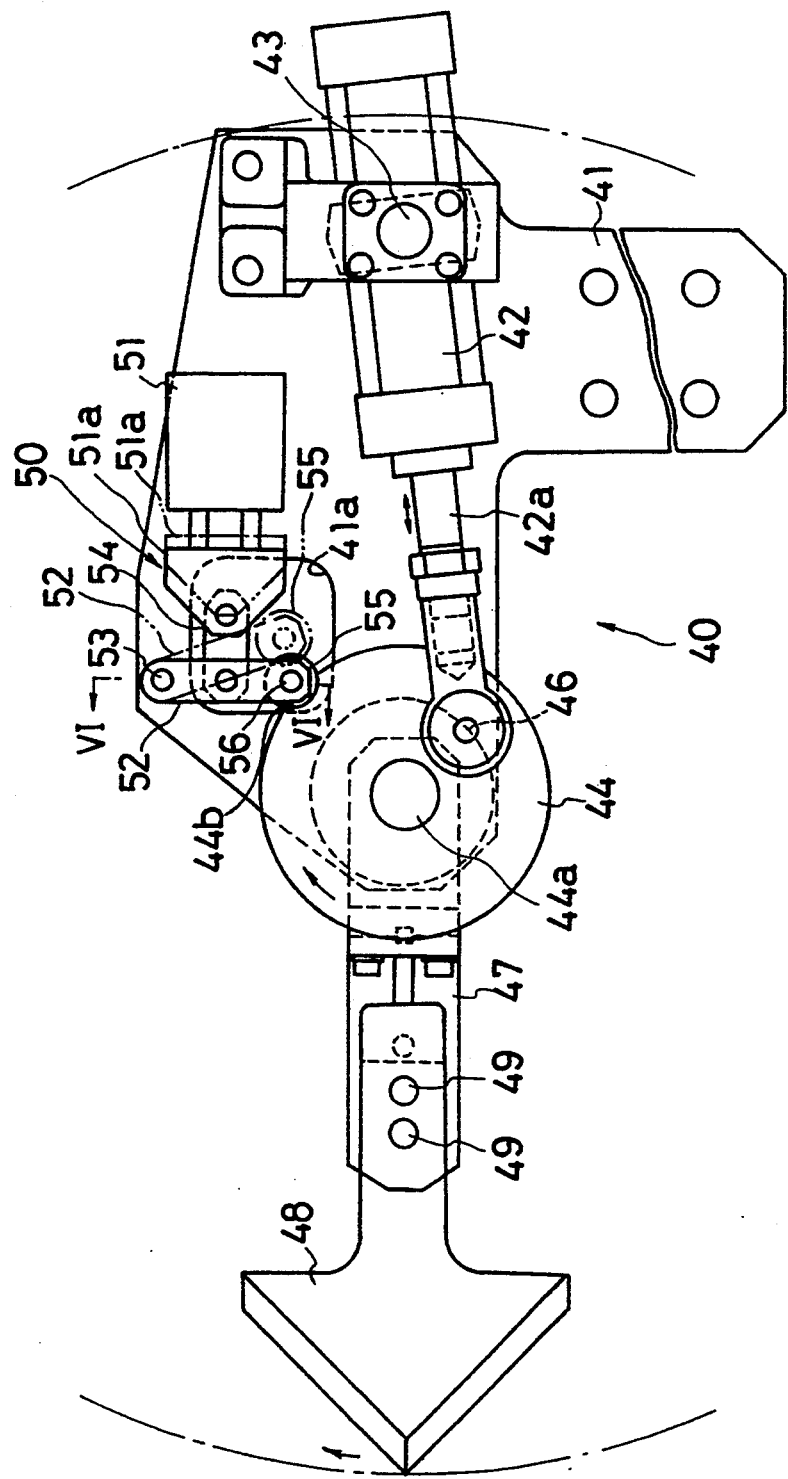
Figure 6:
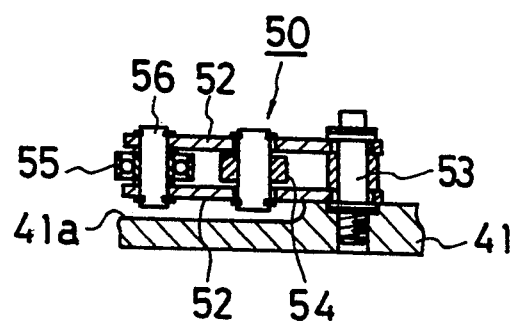
Figure 7:
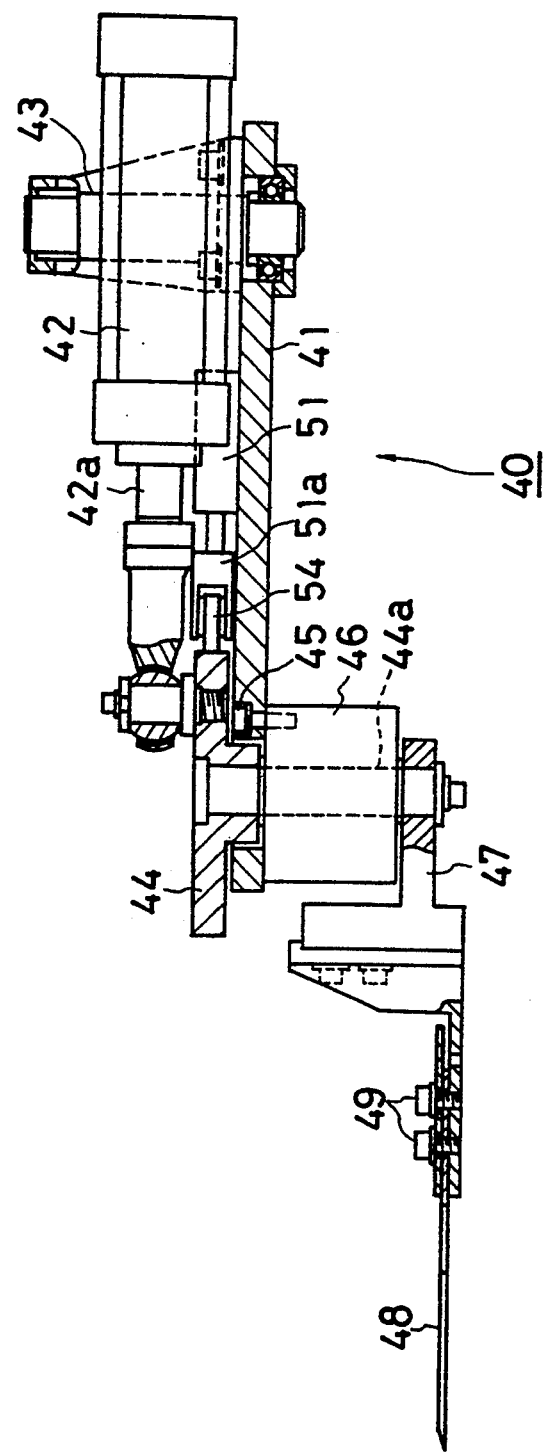
Figure 8:
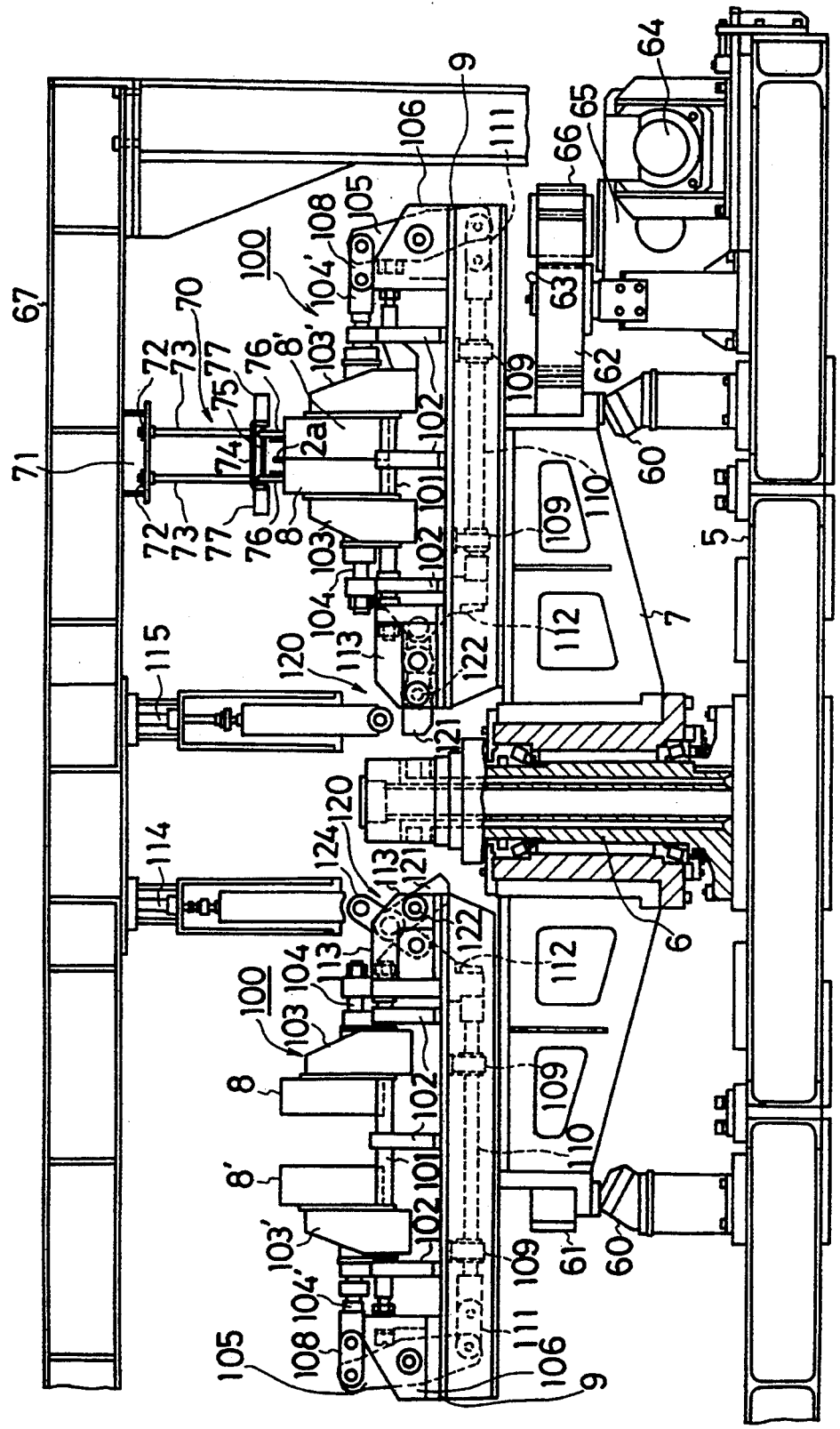
Figure 9:
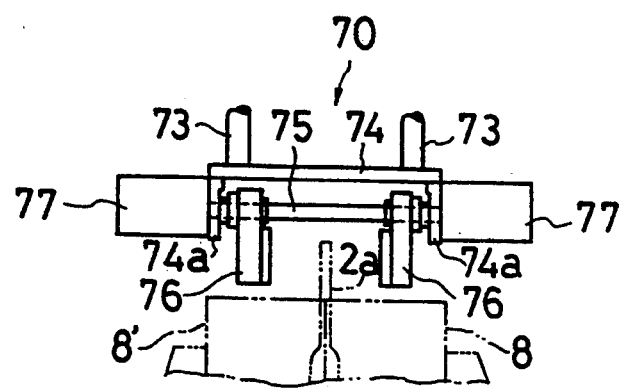
Figure 10:
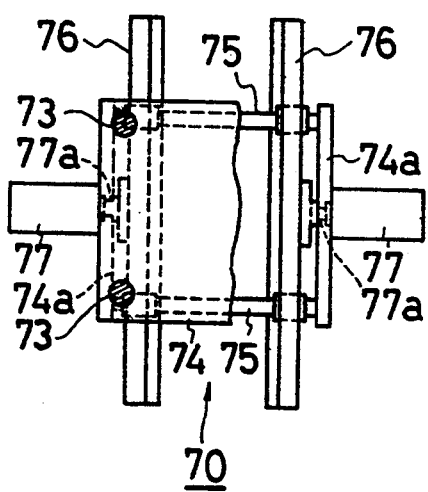
Figure 11:
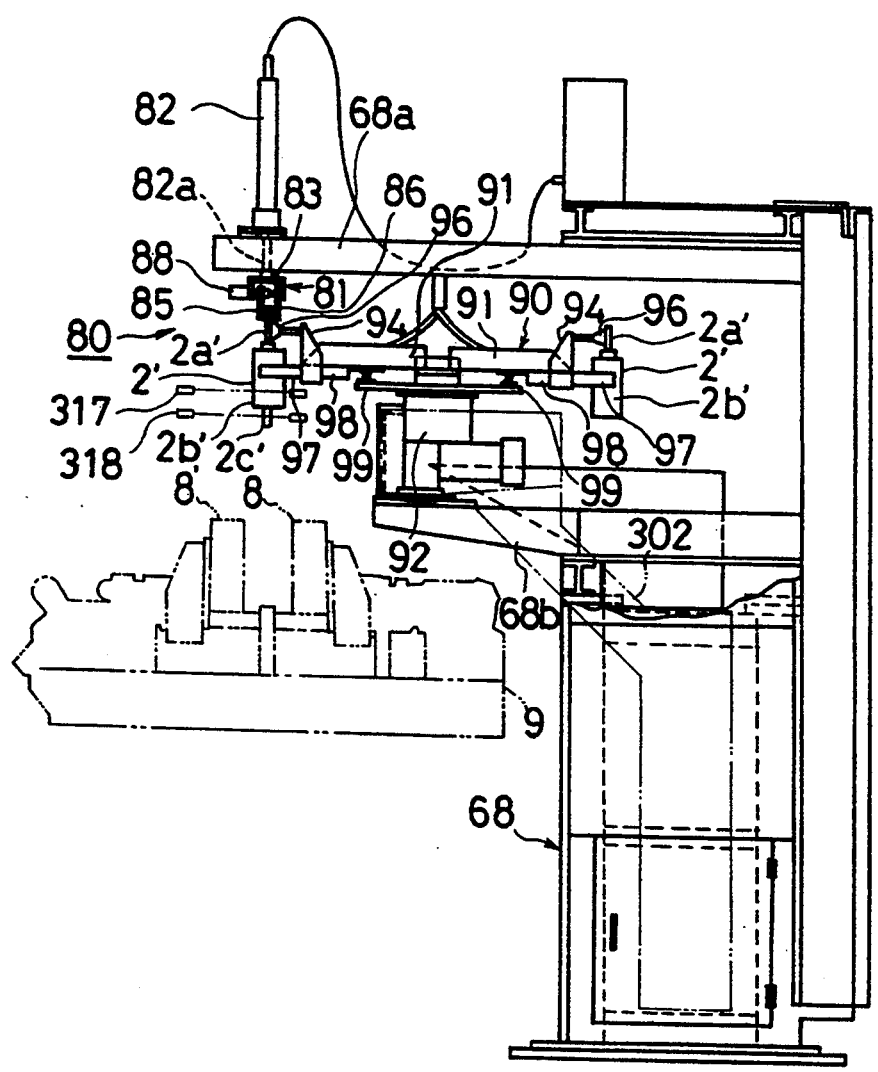
Figure 12:
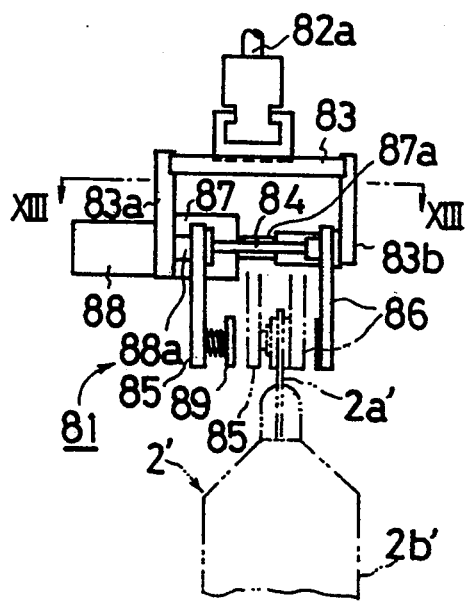
Figure 13:
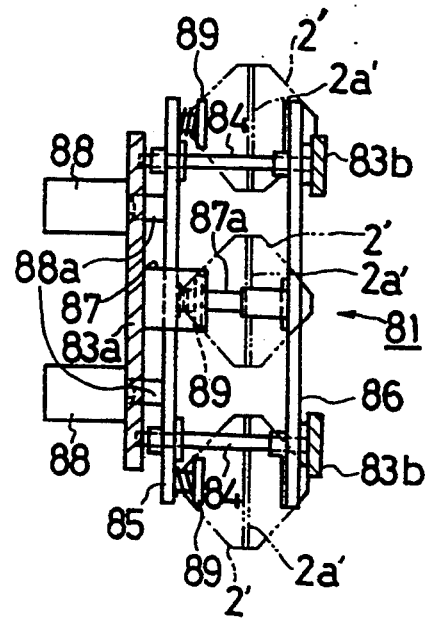
Figure 14:
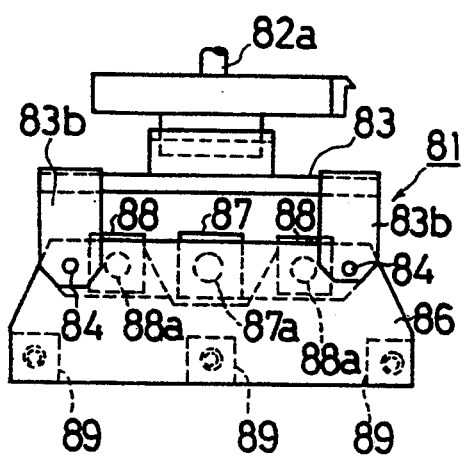
Figure 15:
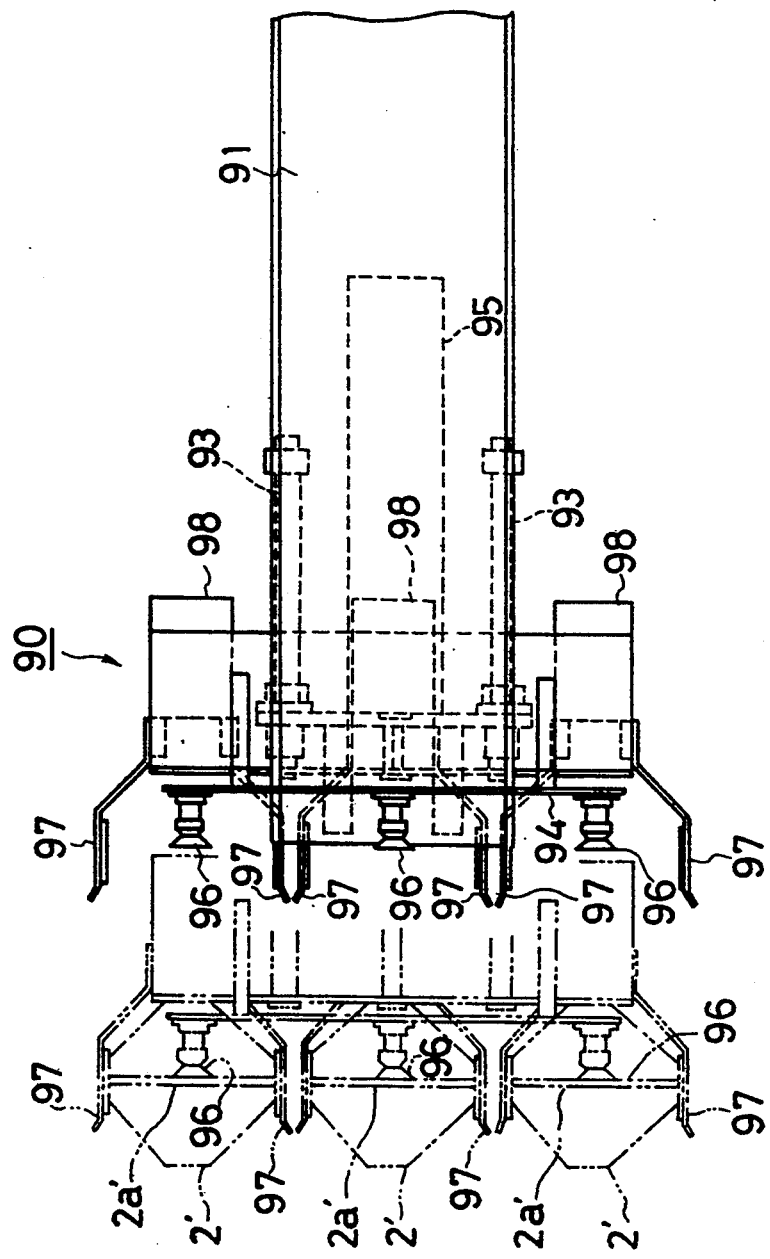
Figure 16:
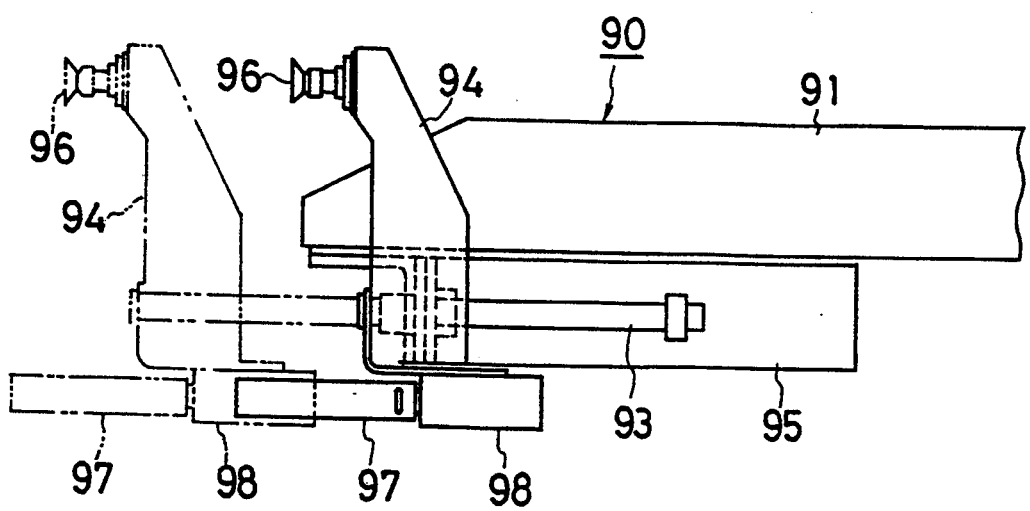
Figure 17:
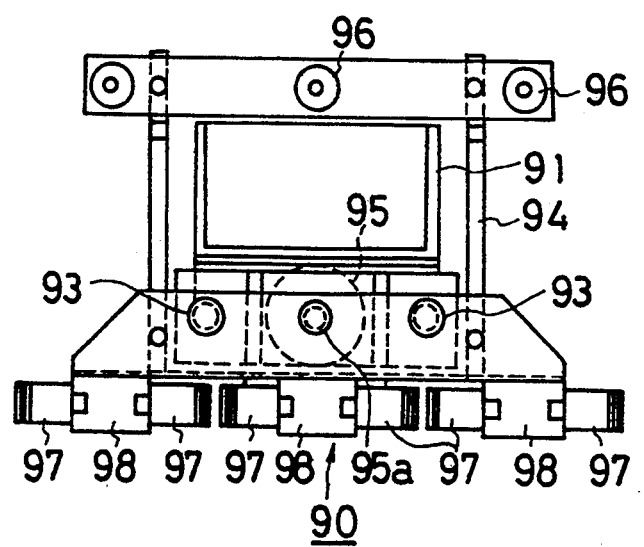
Figure 18:
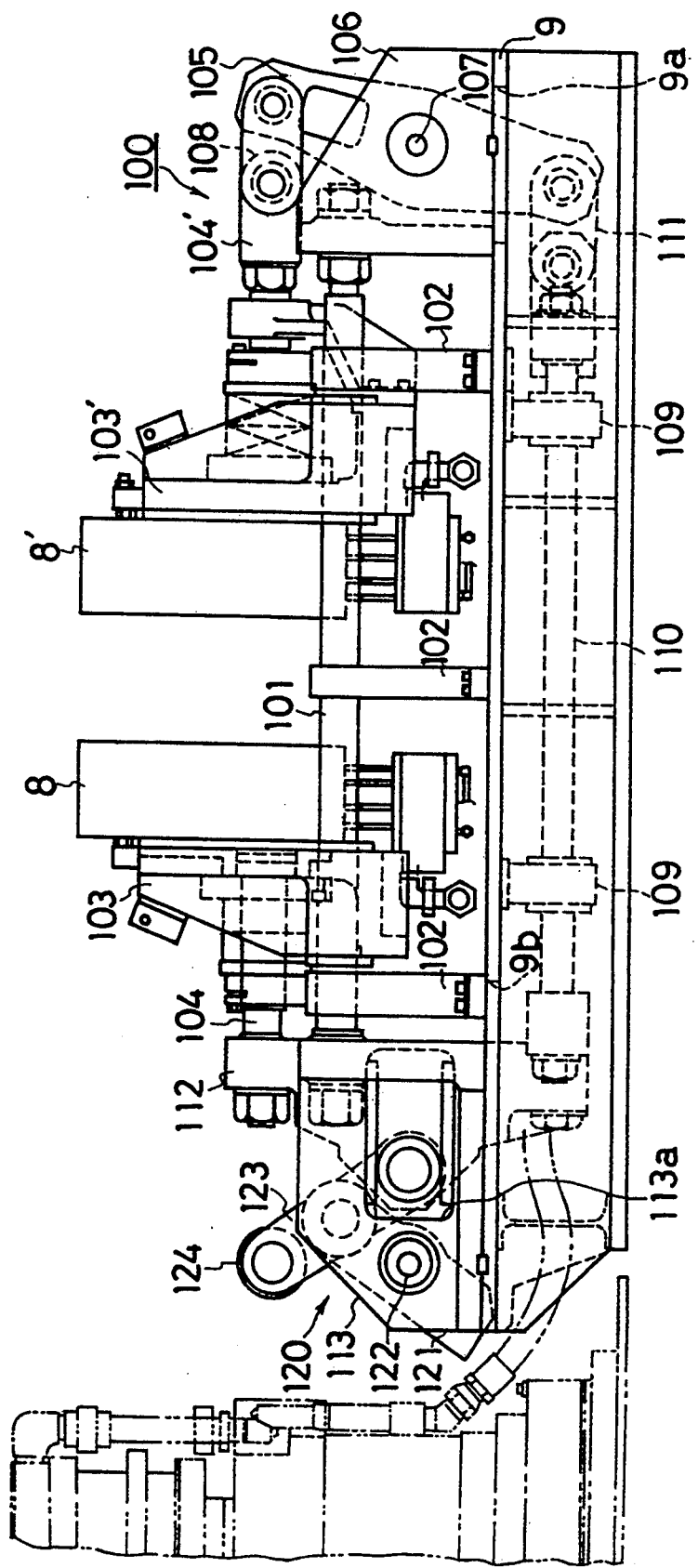
Figure 20A:
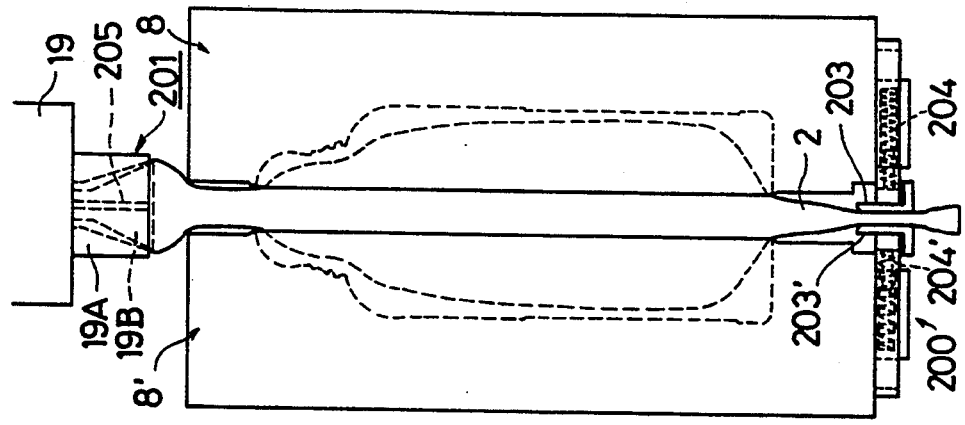
Figure 20B:
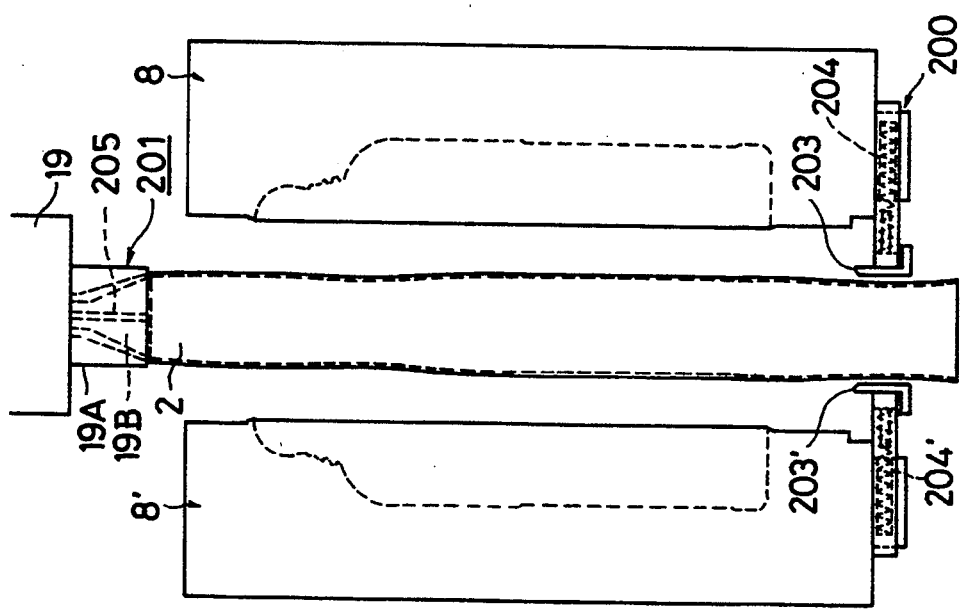
Figure 21A:
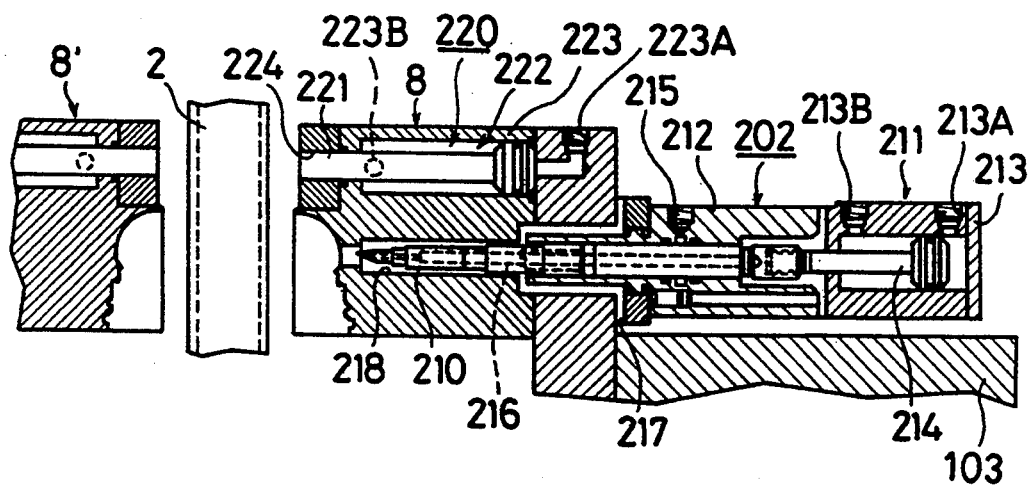
Figure 21B:
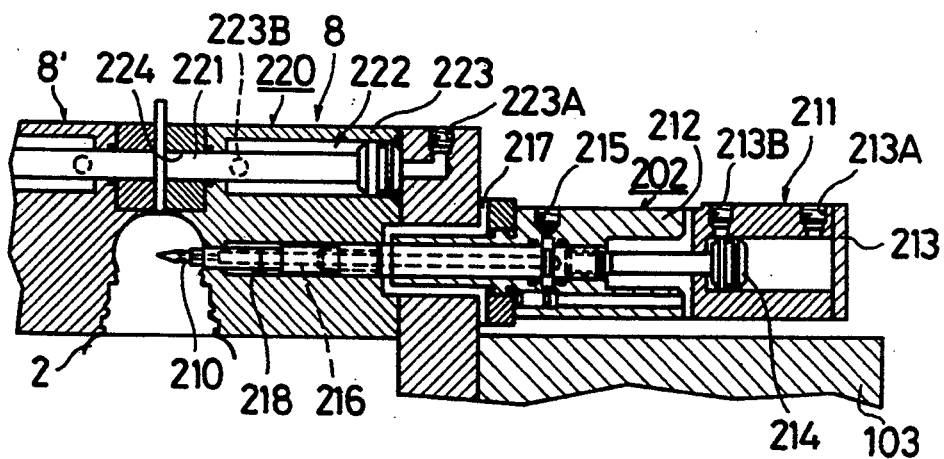
Figure 21C:
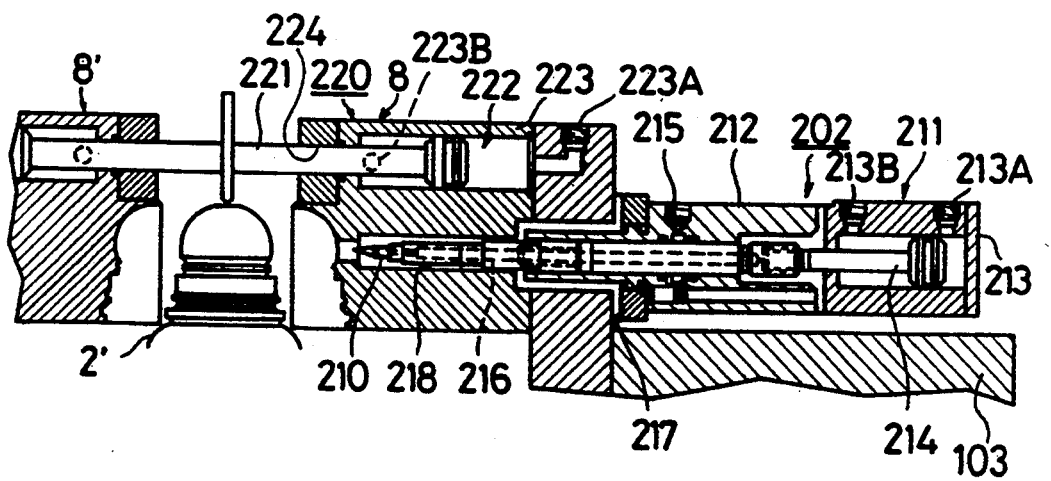
Figure 22:
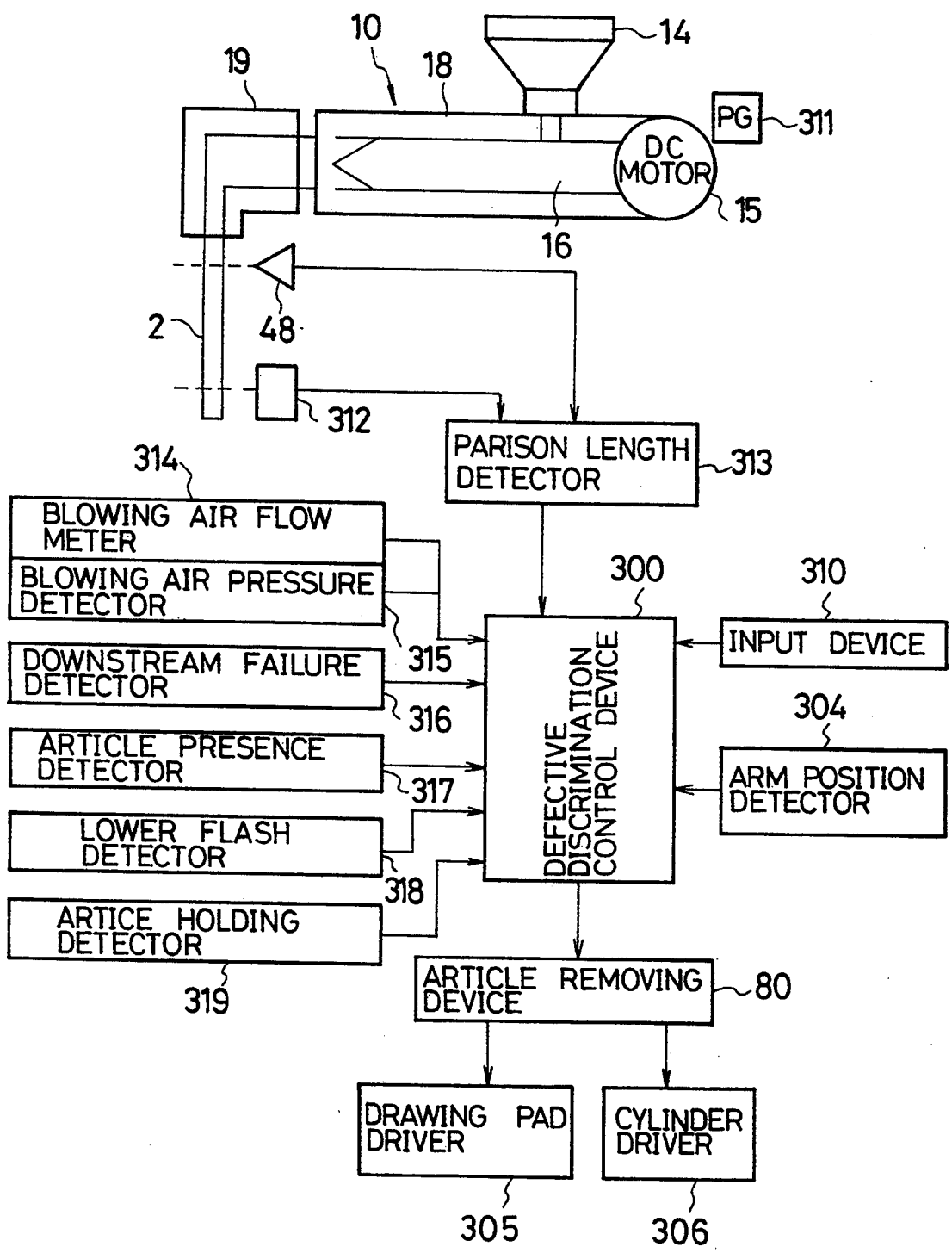
Figure 23:
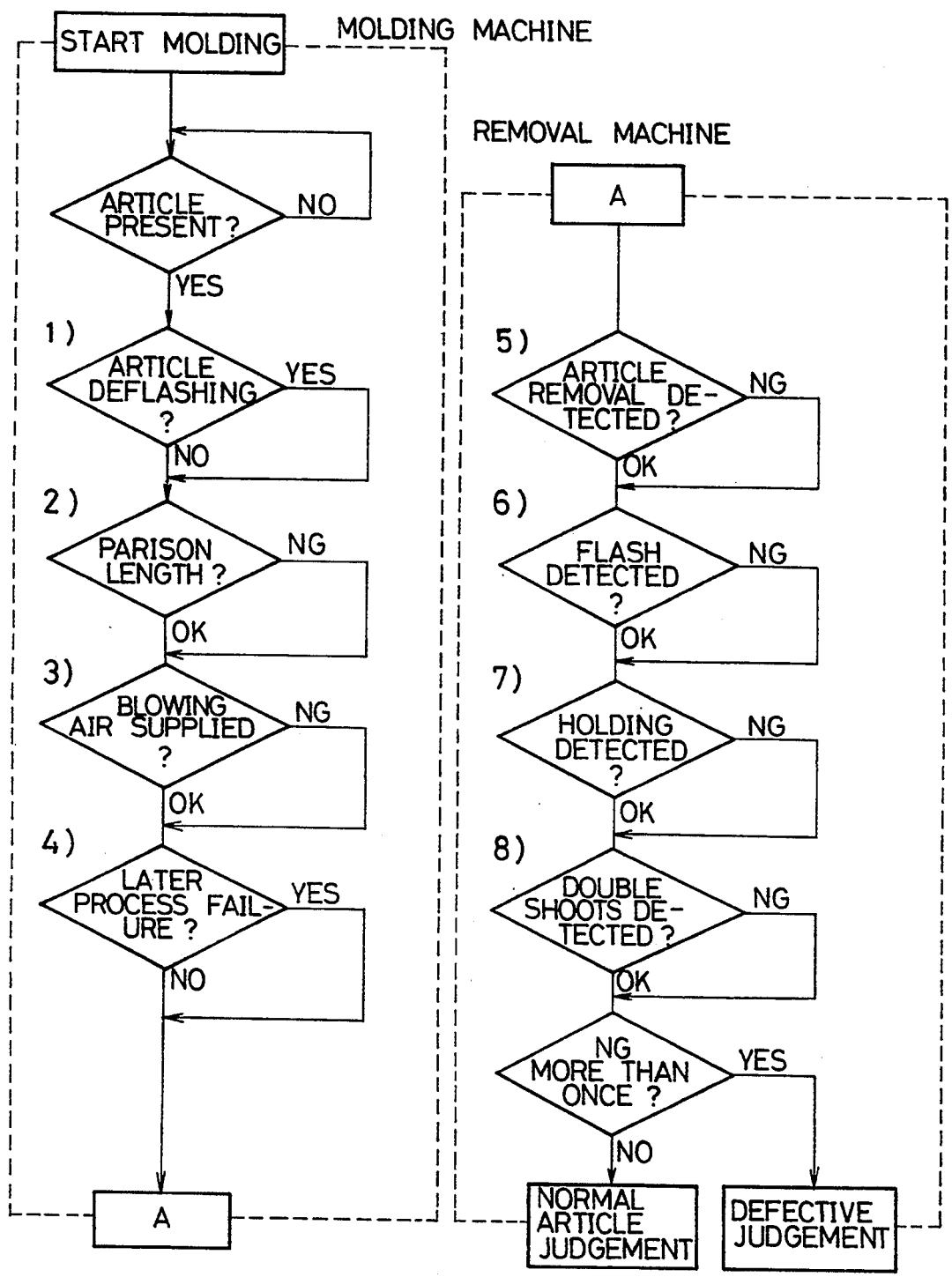
Figure 24:
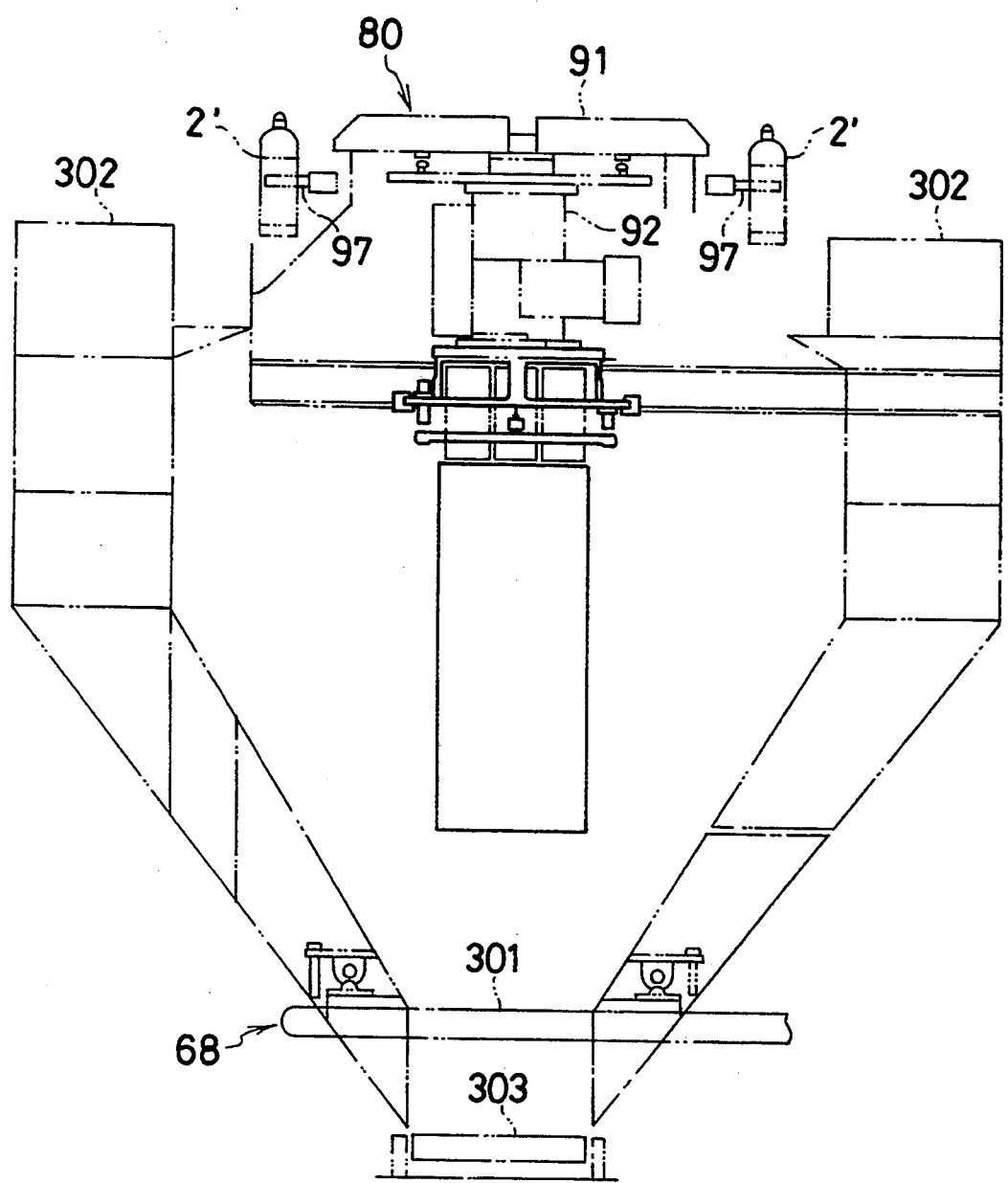
Figure 25:
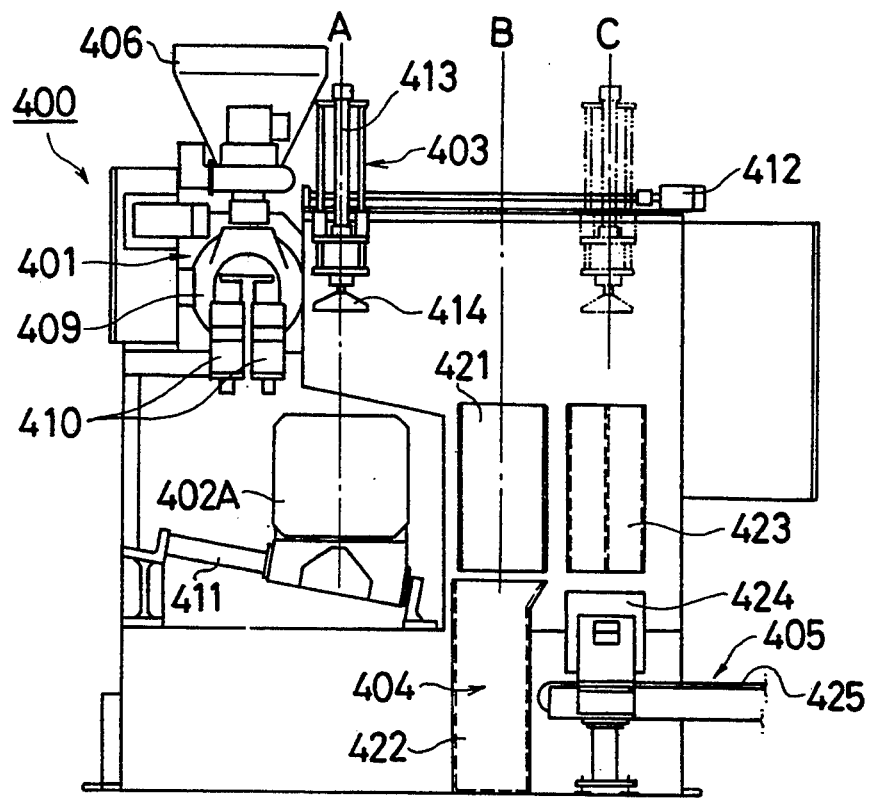
Figure 26:
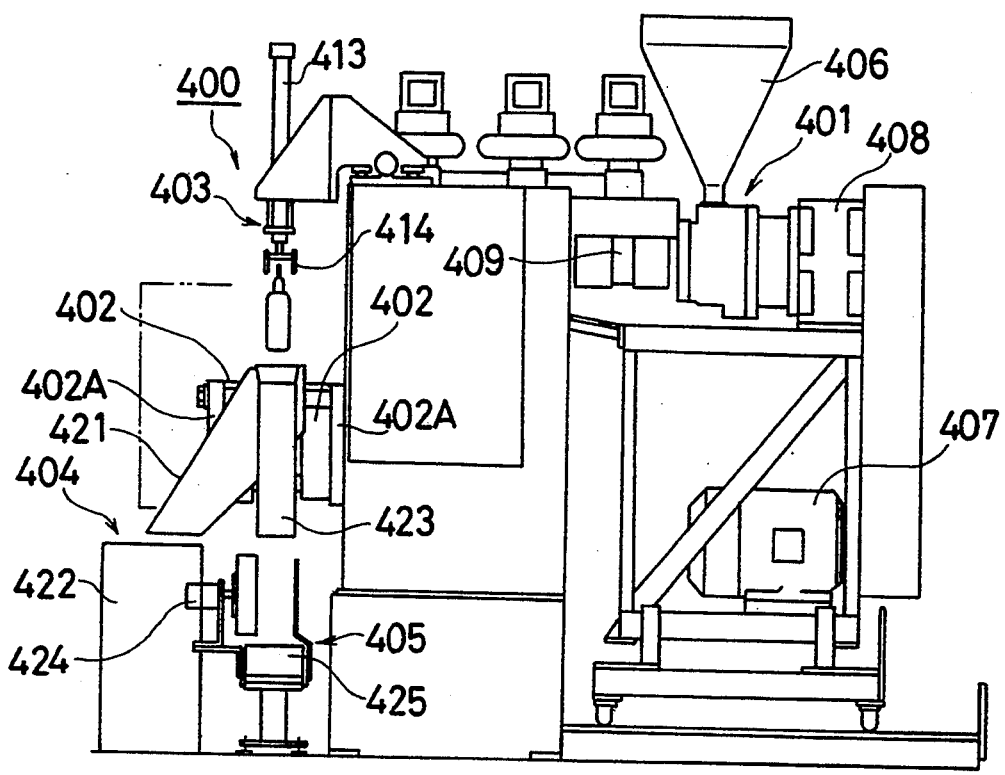

FIG. 1 is a plan view of one embodiment of a rotary blow molding machine according to the present invention;

FIG. 2 is a side elevation of an extruder of the blow molding machine;

FIG. 3 is a front elevation of the extruder;

FIG. 4 is a back elevation of the extruder;

FIG. 5 is a plan view of a parison cutting device of the blow molding machine;

FIG. 6 is a section taken along line VI—VI of FIG. 5;

FIG. 7 is a partially sectioned side elevation of the parison cutting device;

FIG. 8 is a side elevation of a mold lock device of the blow molding machine;

FIG. 9 is a front elevation of a flash configuration correcting mechanism of the block molding machine;

FIG. 10 is a plan view of the flash configuration correcting mechanism;

FIG. 11 is a side elevation of an article removing device of the block molding machine;

FIG. 12 is a side elevation of an upper flash chucking removal mechanism of the article removing device of the blow molding machine;

FIG. 13 is a section taken along line XIII—XIII of FIG. 12;

FIG. 14 is a front elevation of the upper flash chucking removal mechanism;

FIG. 15 is a plan view of a draw-holding transportation mechanism of the article removing device;

FIG. 16 is a side elevation of the draw-holding transportation mechanism;

FIG. 17 is a front elevation of the draw-holding transportation mechanism;

FIG. 18 is an enlarged side elevation of the mold lock device;

FIG. 19 is a side elevation of another embodiment of an extruder;

FIGS. 20A and 20B are side elevations of a mold with a pre-sealing device;

FIGS. 21A, 21B and 21C are of the mold incorporating a blowing device and an ejector device;

FIG. 22 is a diagrammatic illustration showing an article removal control circuit;

FIG. 23 is a flowchart showing process of an article removal control;

FIG. 24 is a diagrammatic illustration showing an article discharging route;

FIG. 25 is a front elevation of another embodiment of a reciprocation type block molding machine;

FIG. 26 is a side elevation of the block molding machine;

(B) Parison Length Control Method

Figure 27:
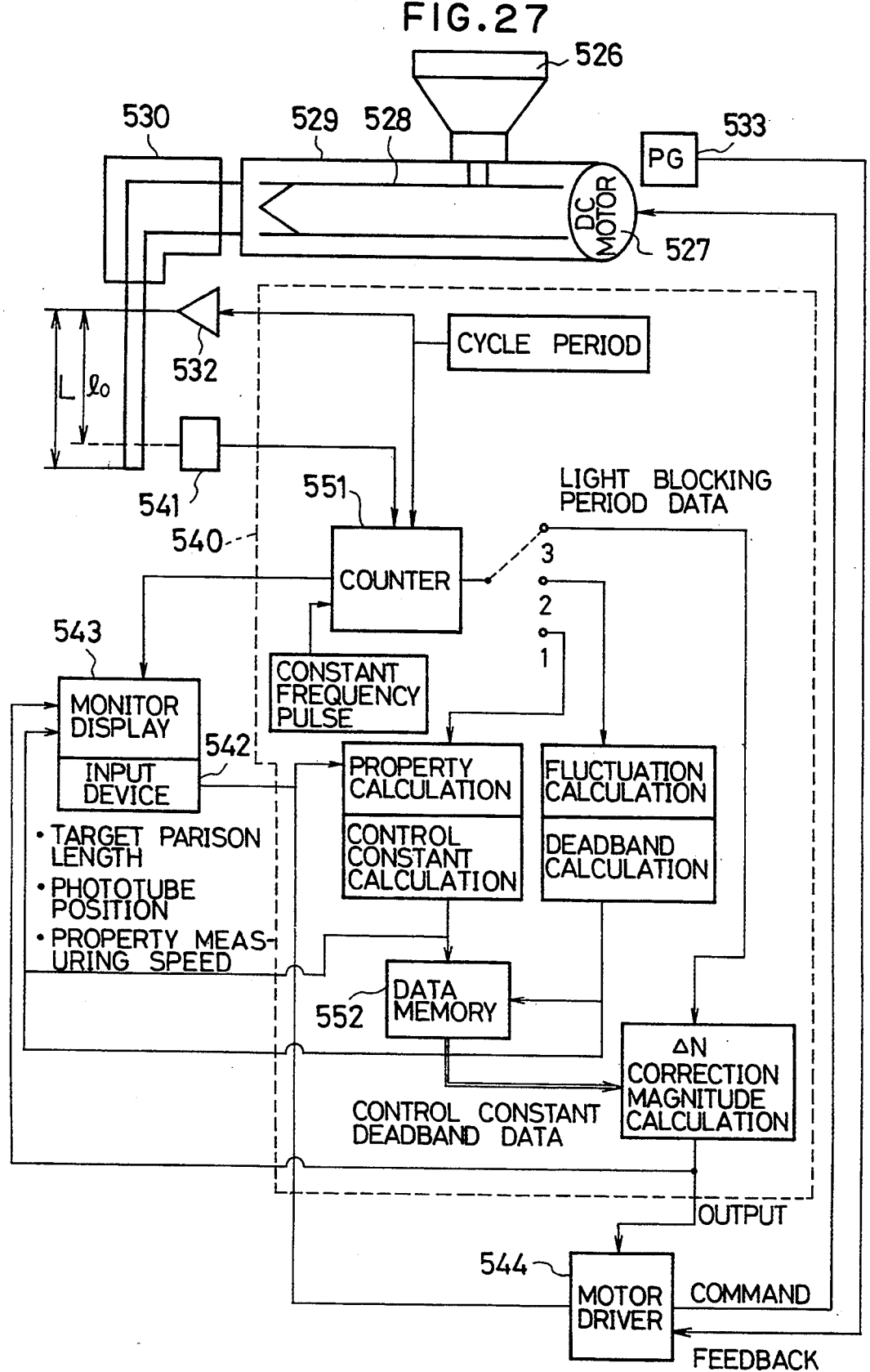
Figure 28:
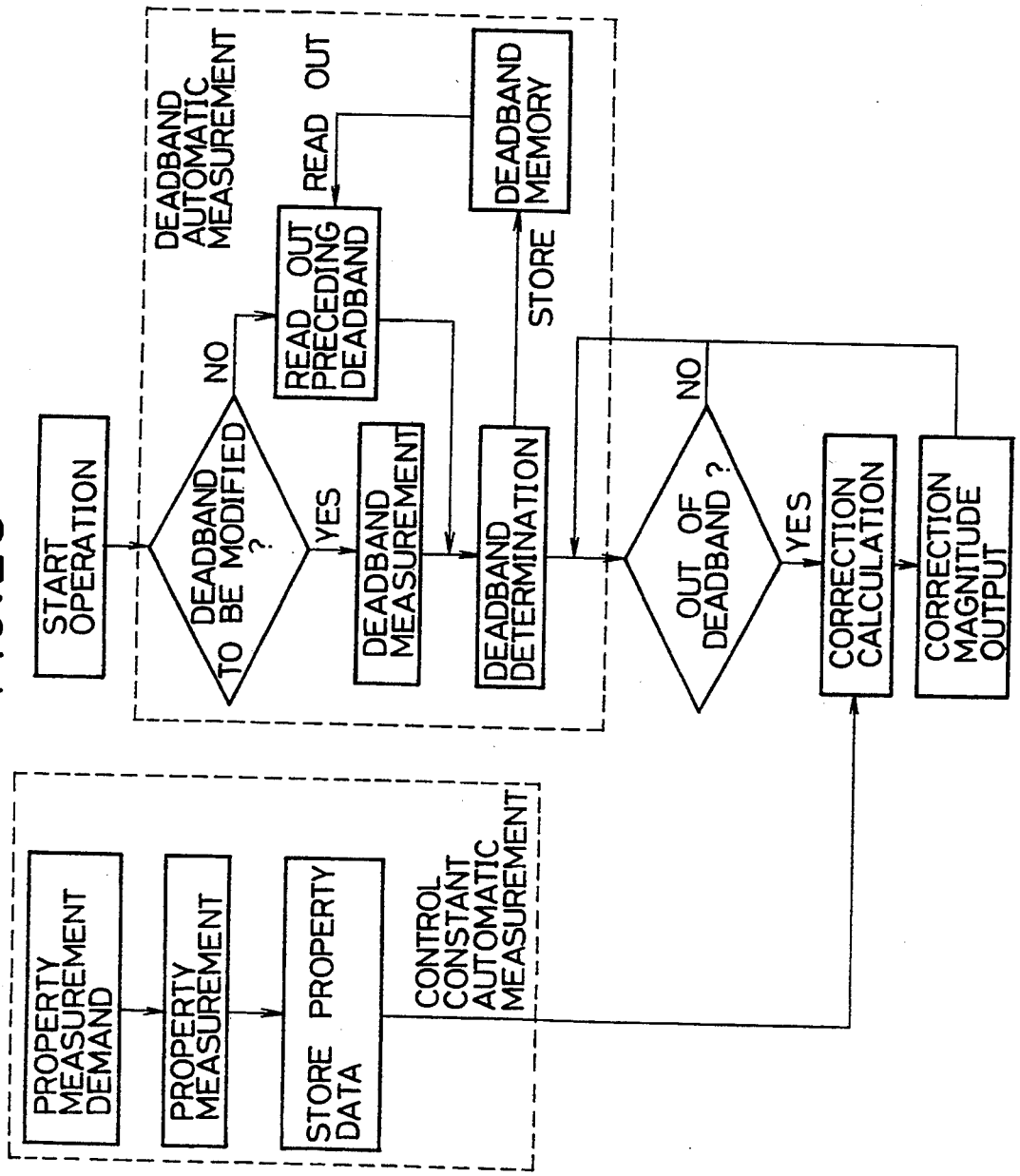
Figure 29:
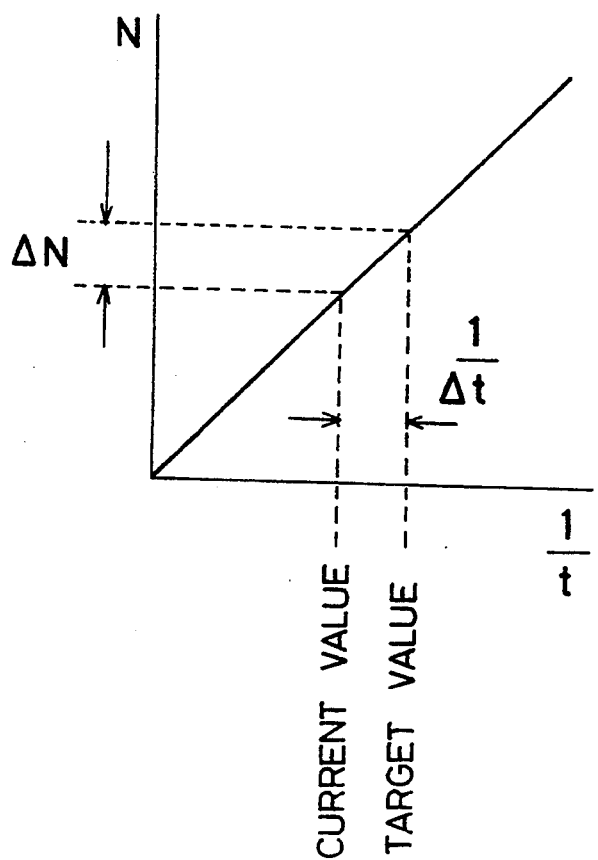
Figure 30:
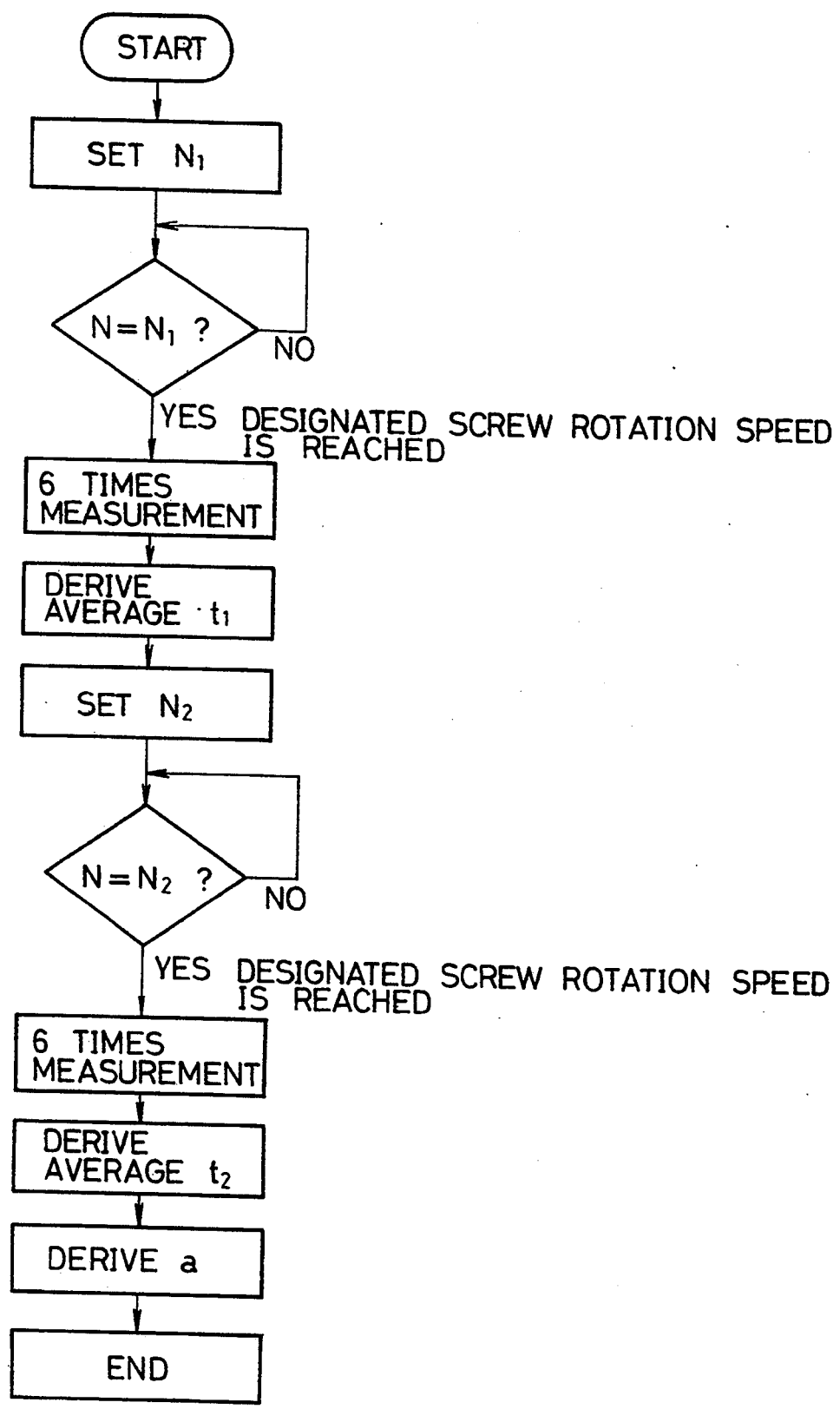
Figure 31A:
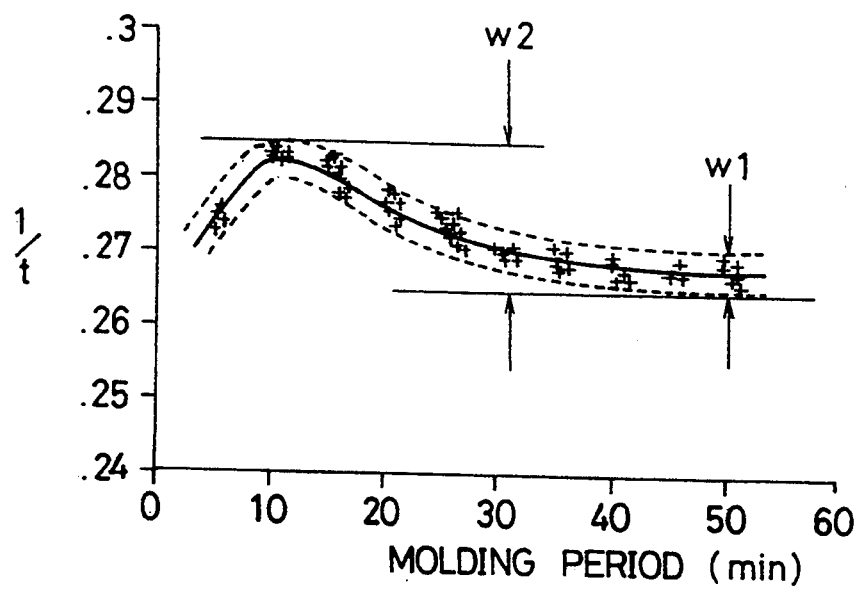
Figure 31B:
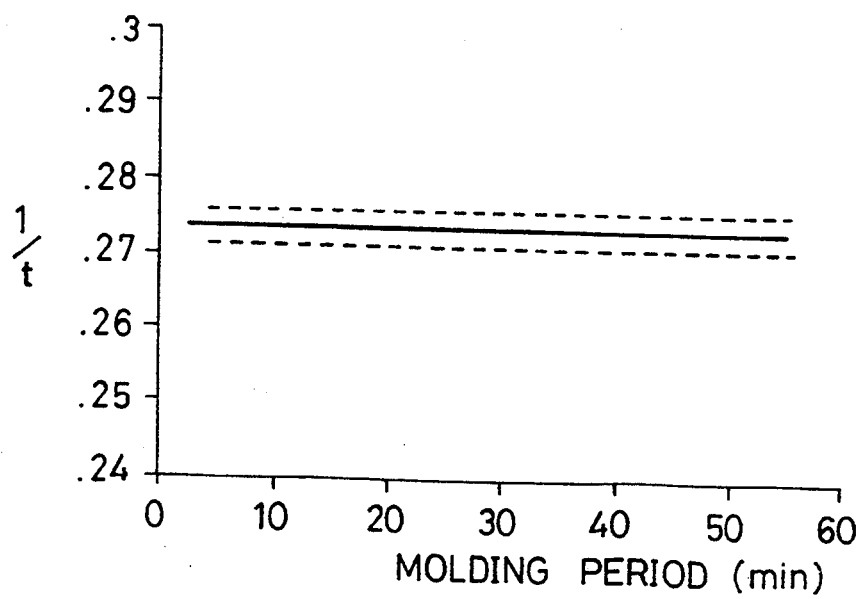
Figure 32A:
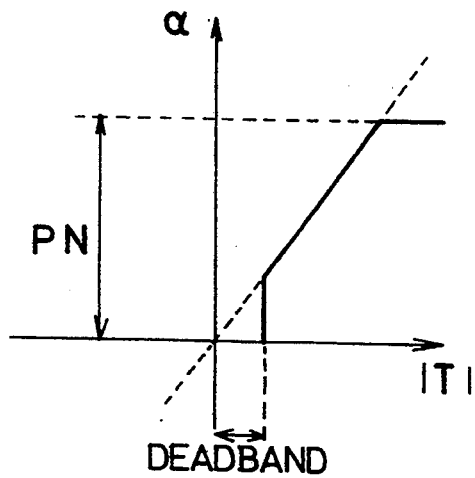
Figure 32B:
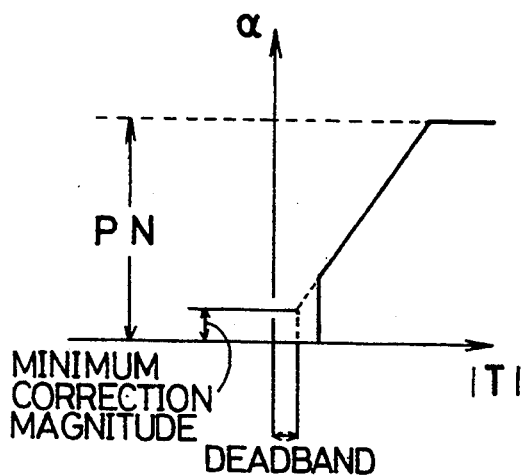
Figure 32C:
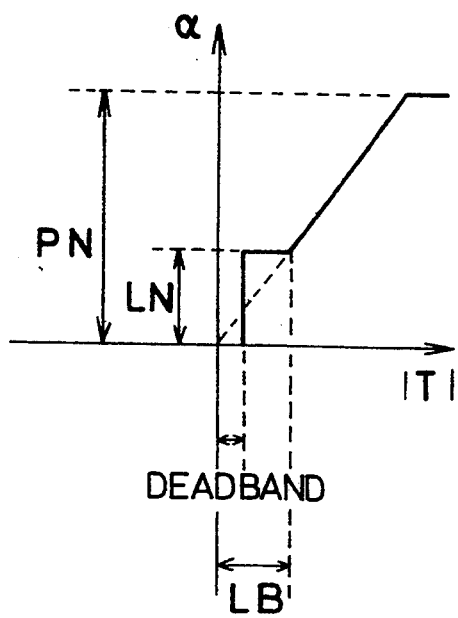
Figure 33:
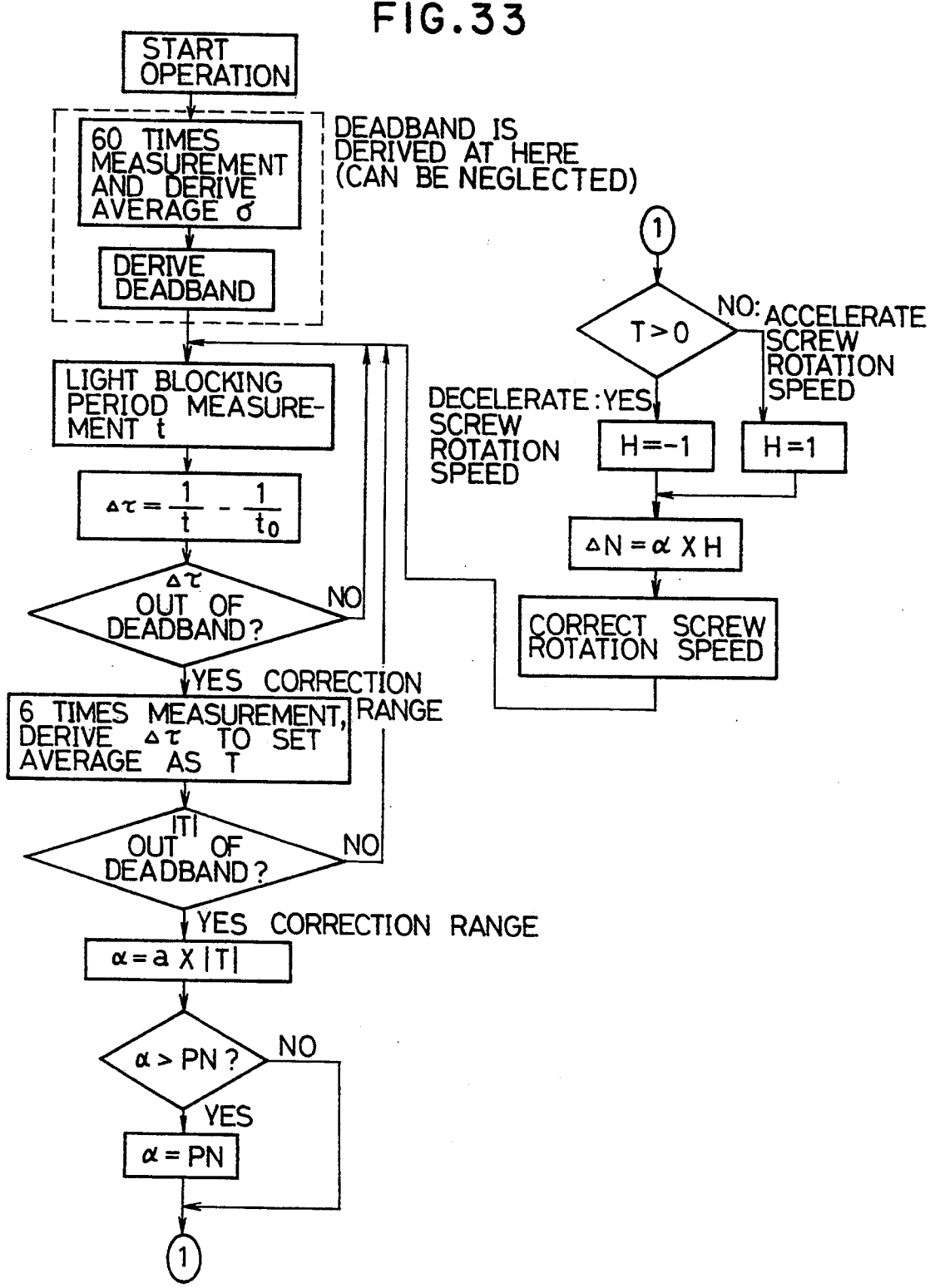
Figure 34:
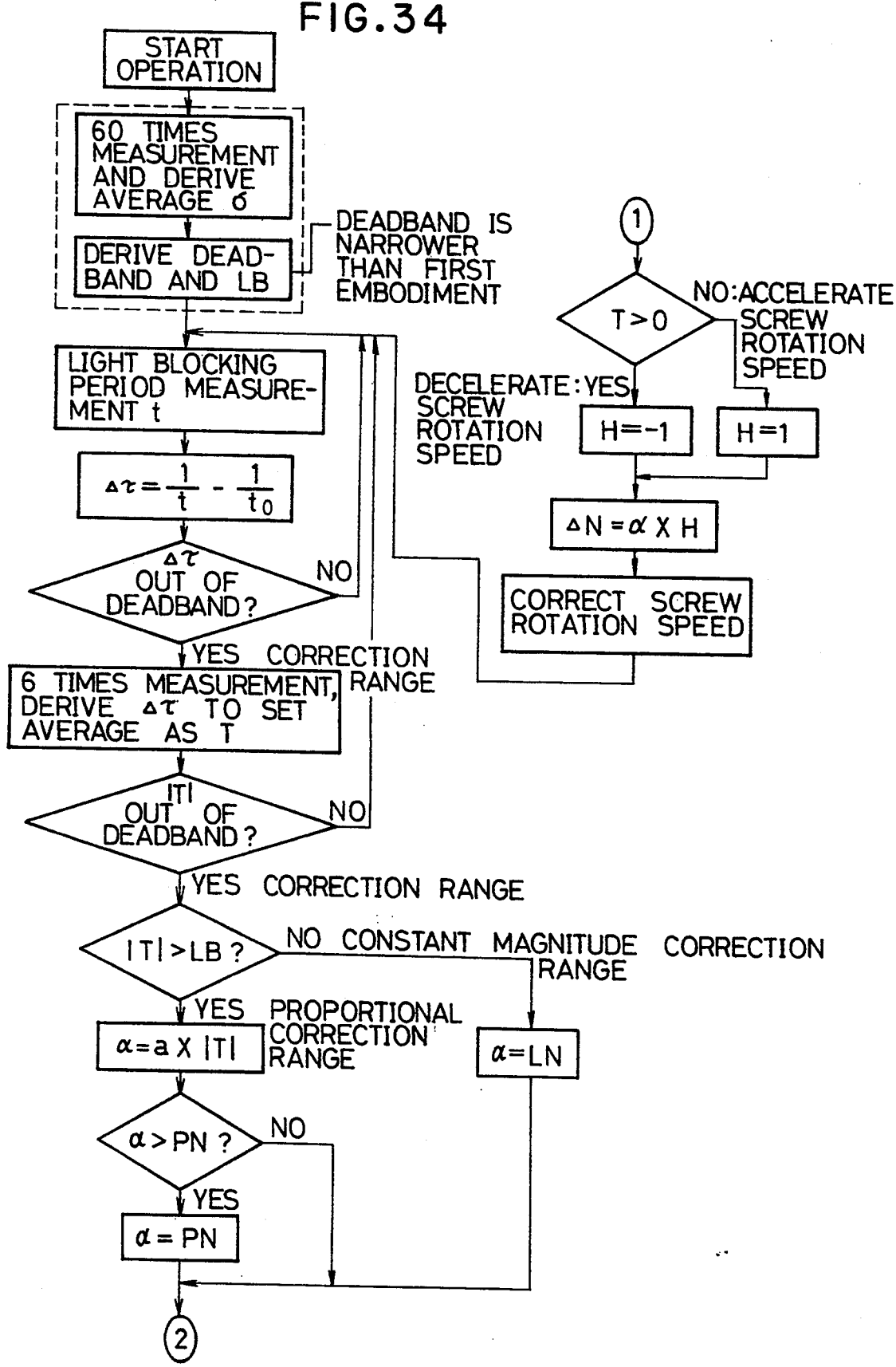
Figure 35:
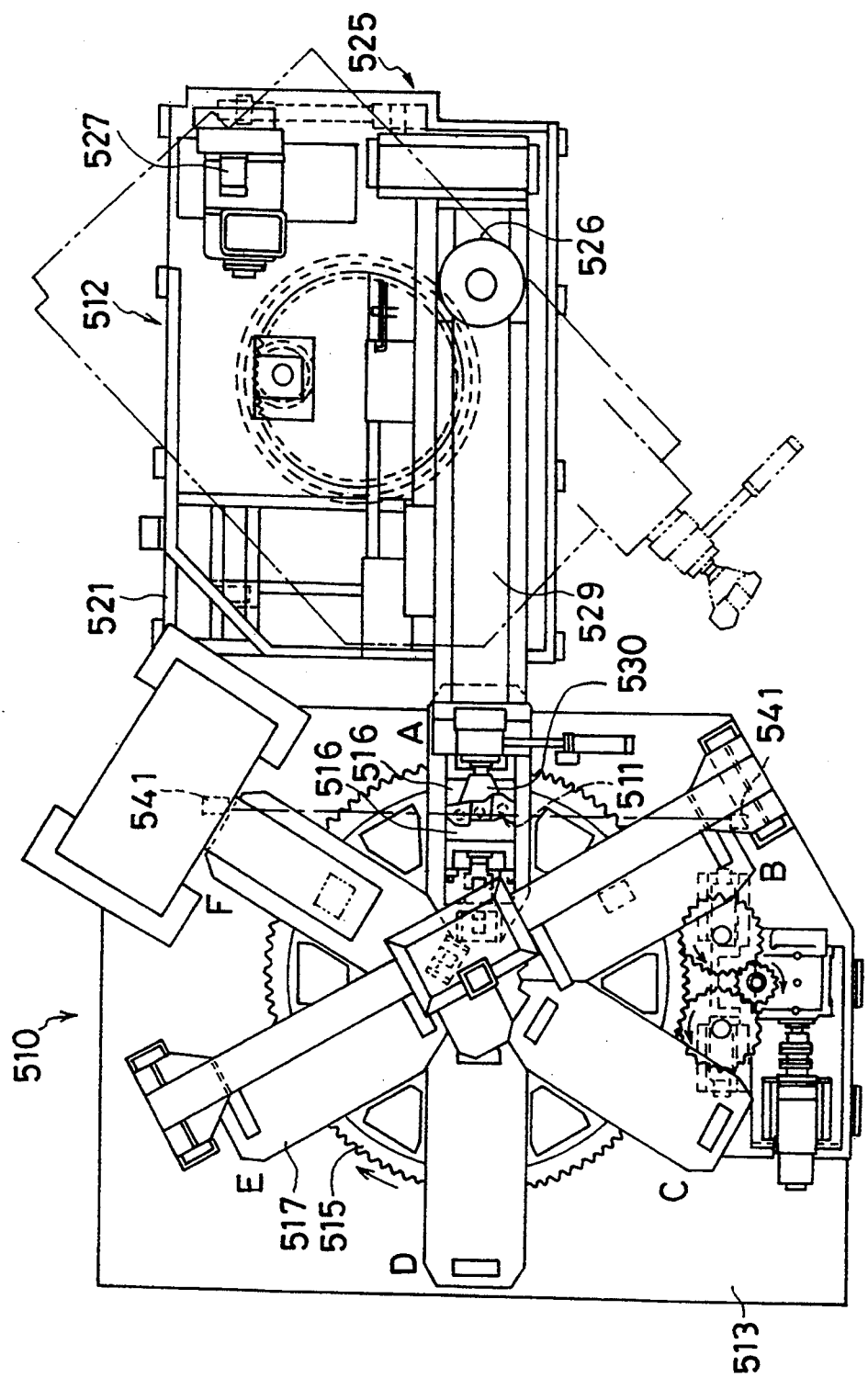
Figure 36:
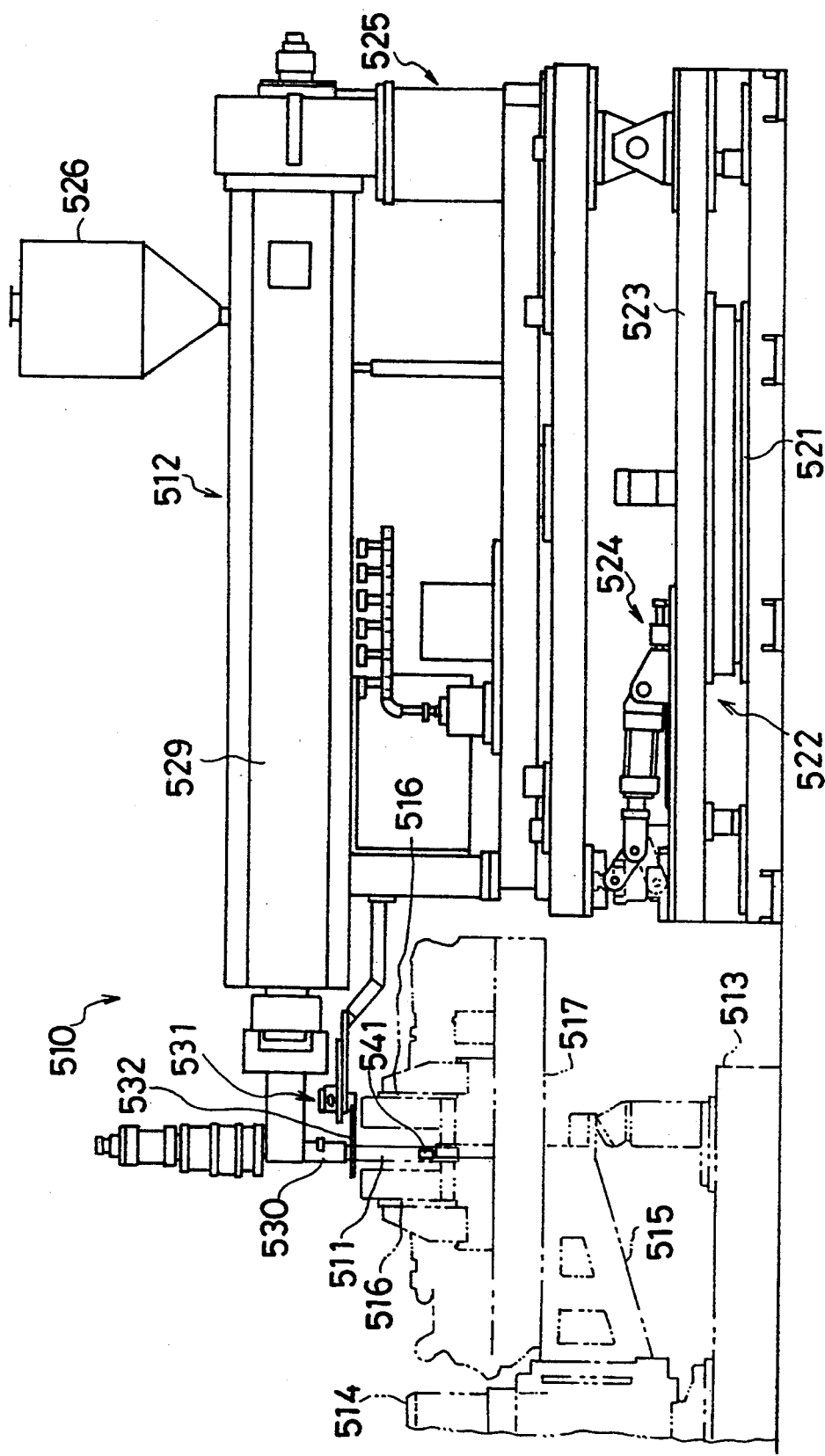
Figure 37:
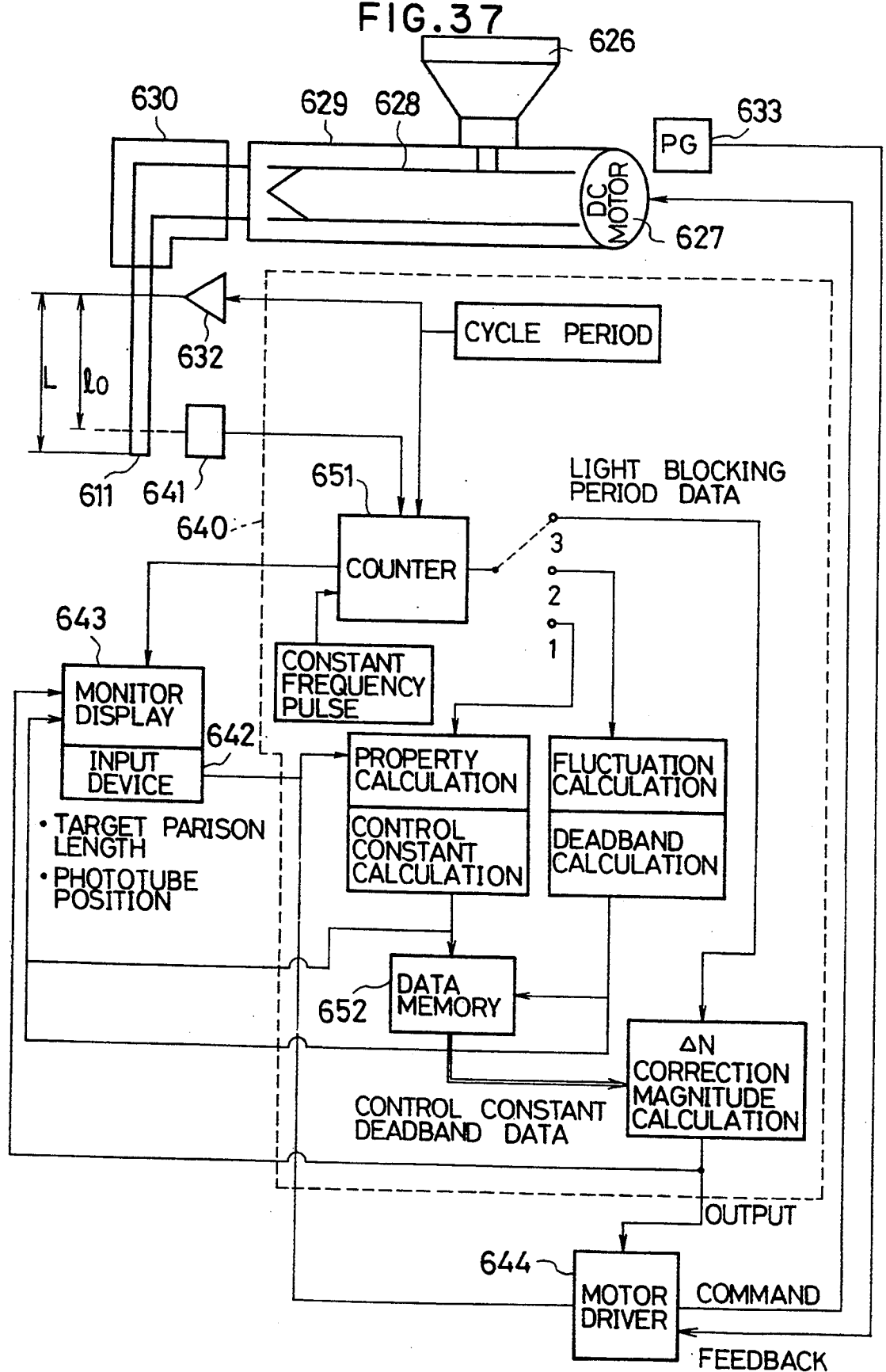
Figure 38:
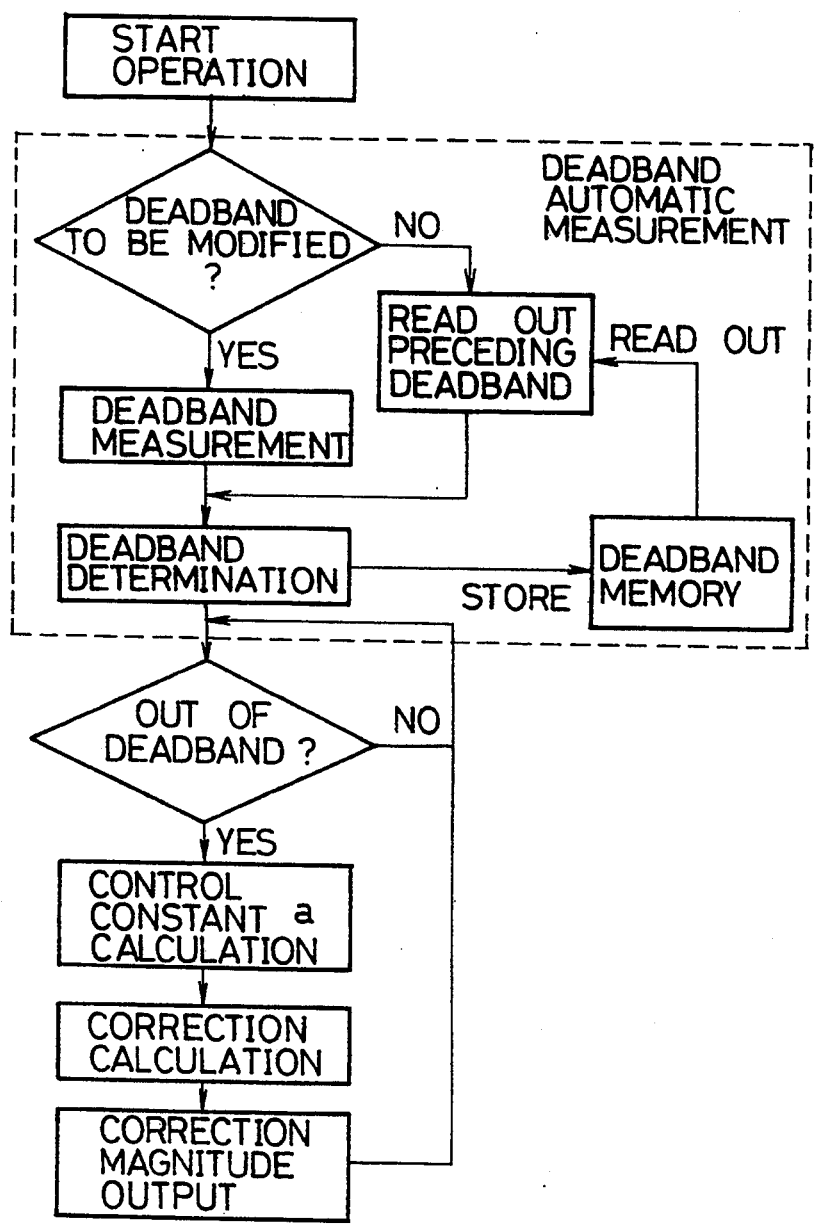
Figure 39:
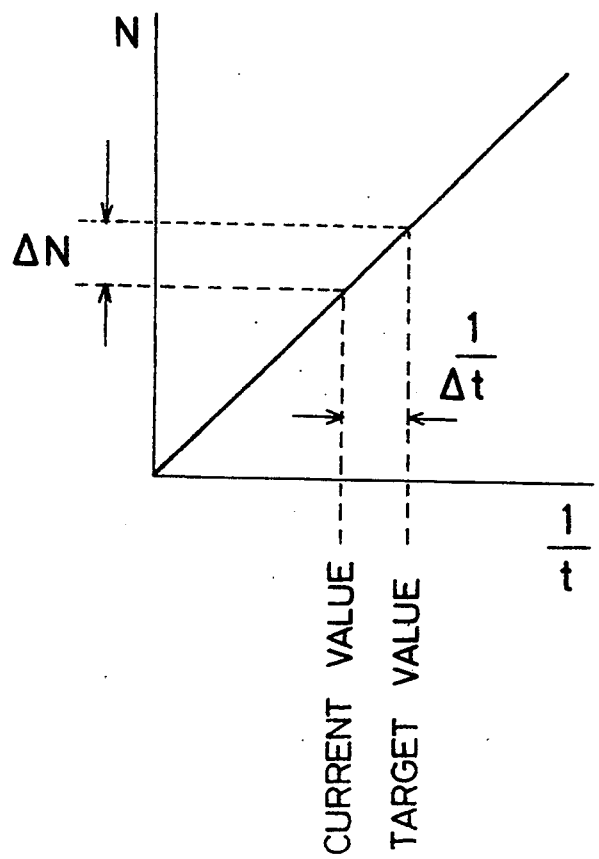
Figure 40A:
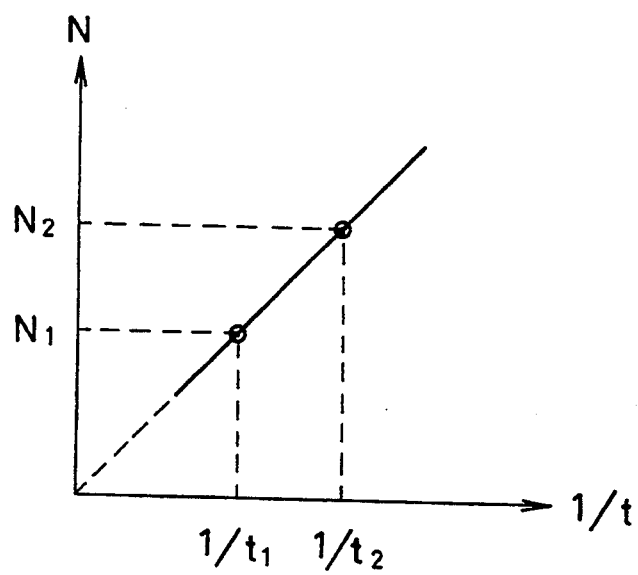
Figure 40B:
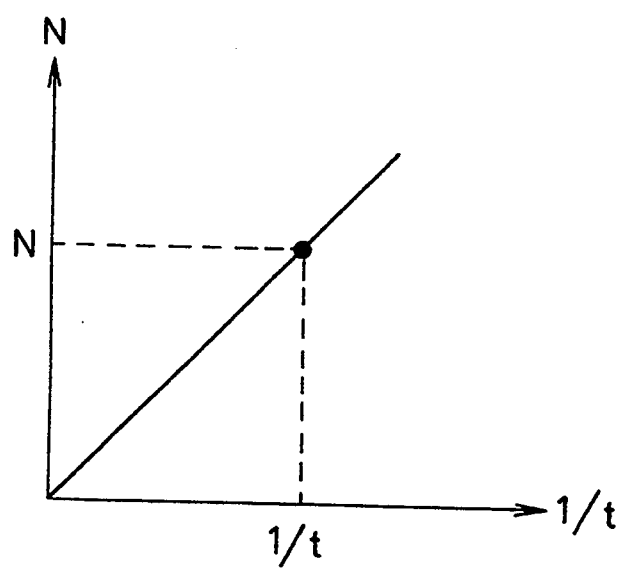
Figure 41A:
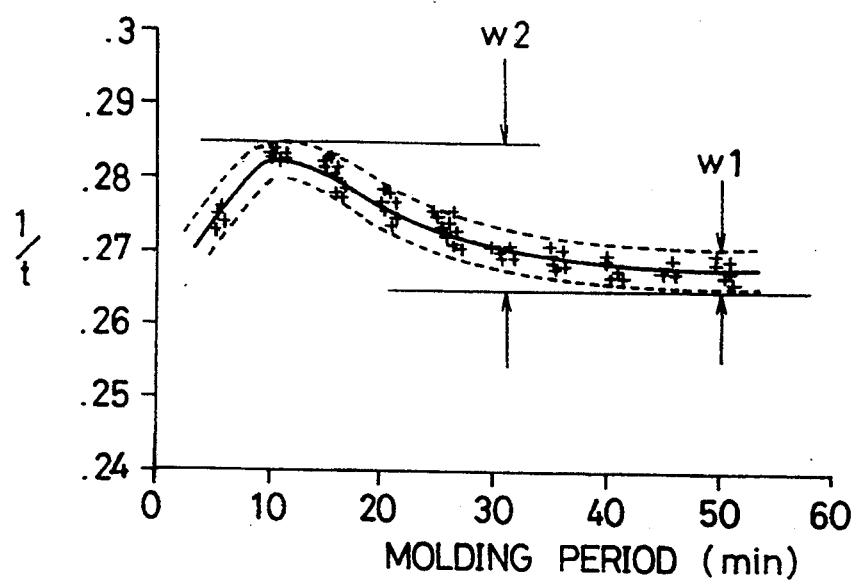
Figure 41B:
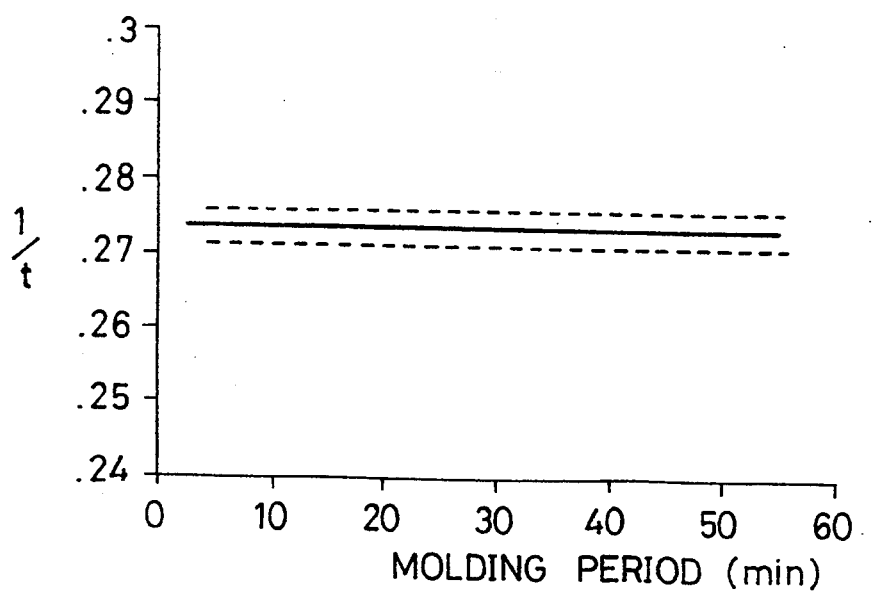
Figure 42A:
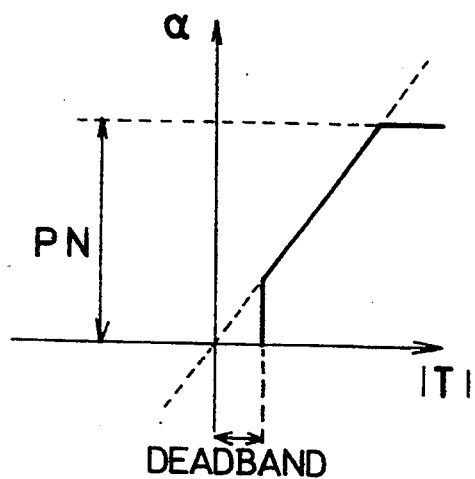
Figure 42B:
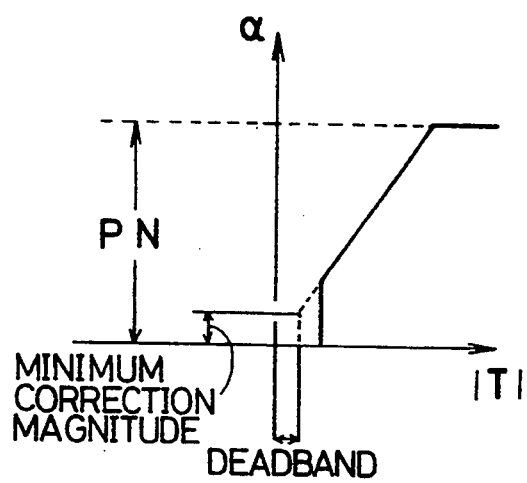
Figure 42C:
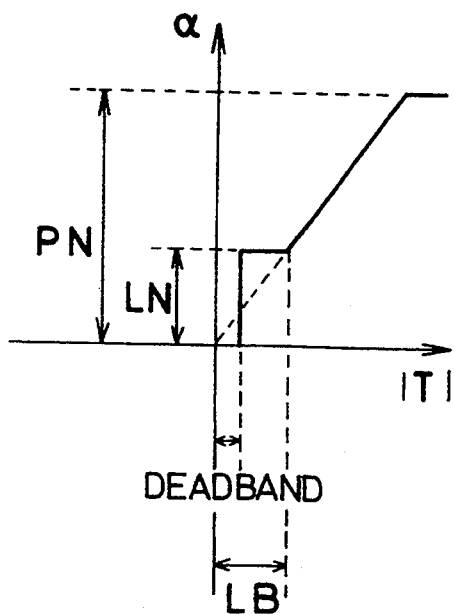
Figure 43:
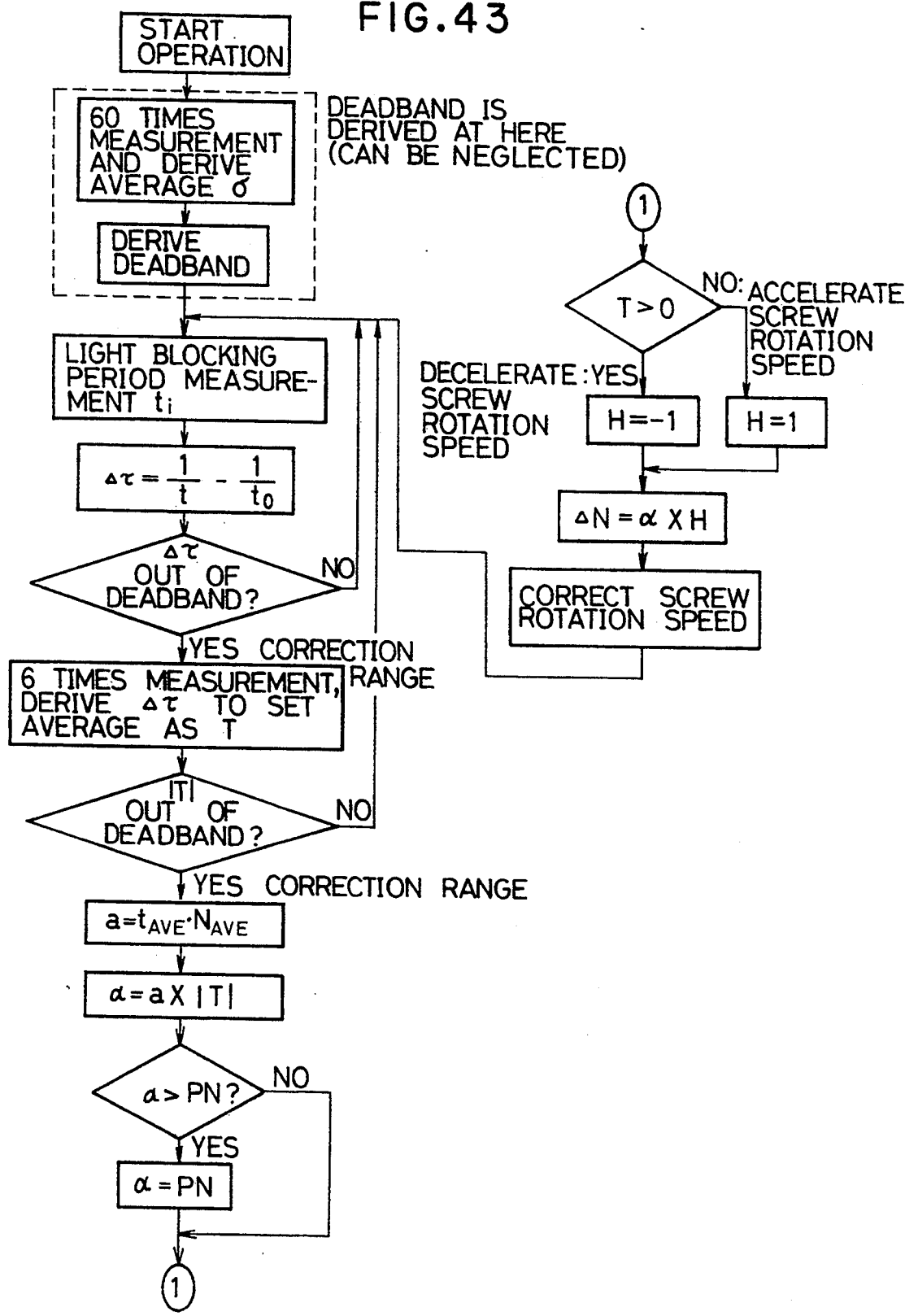
Figure 44:
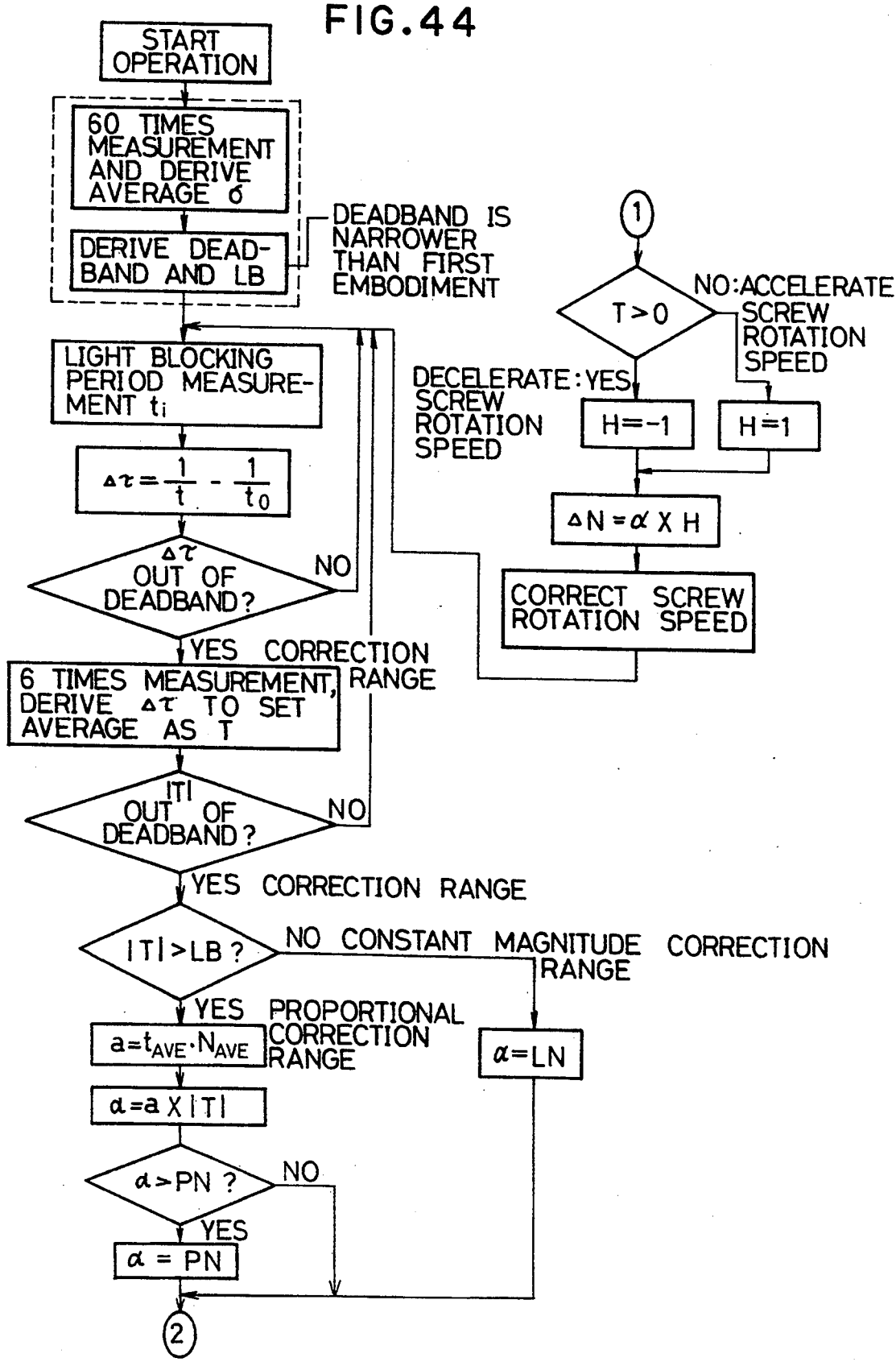
Figure 45:
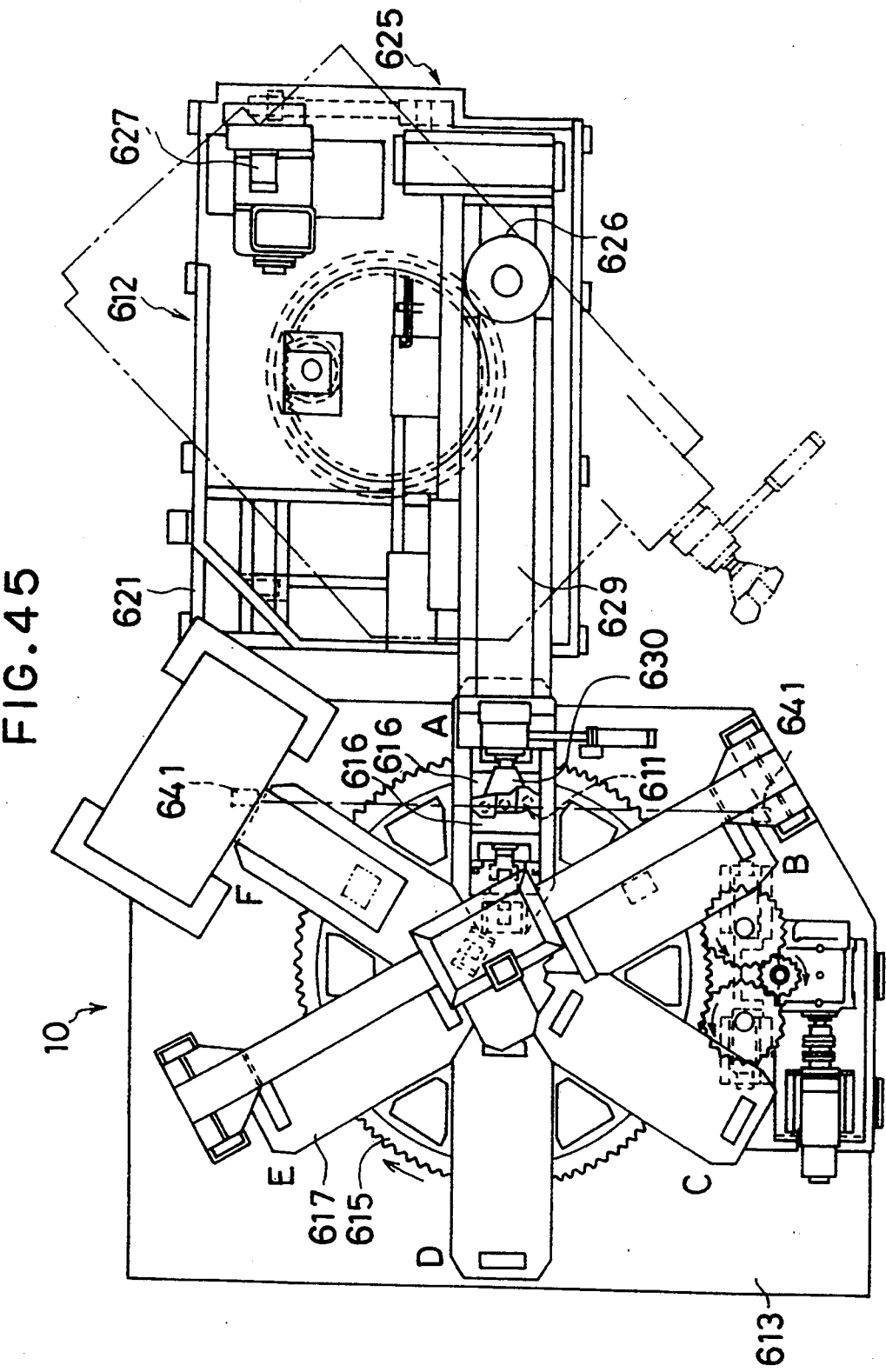

FIG. 27 is a block diagram showing one embodiment of a parison length control system according to the present invention;

FIG. 28 is a flowchart showing a basic control process of the present invention;

FIG. 29 is a chart showing a relationship between a light blocking period of a parison and a rotation speed of a screw;

FIG. 30 is a flowchart for a process for determining a control constant representative of the relationship between a light blocking period of the parison and the screw rotation speed;

FIGS. 31A and 31B are charts showing a deadband;

FIGS. 32A 32B and 32C are control charts showing a process for deriving a correction amount for the screw rotation speed based on the light blocking period of the parison;

FIG. 33 is a flowchart showing a process for deriving a correction amount for the screw rotation speed based on the light blocking period of the parison;

FIG. 34 is a flowchart showing another process for deriving a correction amount for the screw rotation speed based on the light blocking period of the parison;

FIG. 35 is a front elevation of a blow molding machine;

FIG. 36 is a side elevation of the blow molding machine;

FIG. 37 is a block diagram of one embodiment of a parison length control system according to the present invention;

FIG. 38 is a flowchart showing a basic control process of the present invention;

FIG. 39 is a chart showing a relationship between a light blocking period of a parison and a rotation speed of a screw;

FIGS. 40A and 40B are flowcharts for a process for determining a control constant representative of the relationship between a light blocking period of the parison and the screw rotation speed;

FIGS. 41A and 41B are charts showing a deadband;

FIGS. 42A, 42B and 42C are control charts showing a process for deriving a correction amount for the screw rotation speed based on the light blocking period of the parison;

FIG. 43 is a flowchart showing a process for deriving a correction amount for the screw rotation speed based on the light blocking period of the parison;

FIG. 44 is a flowchart showing another process for deriving a correction amount for the screw rotation speed based on the light blocking period of the parison;

FIG. 45 is a front elevation of a blow molding machine; and

Figure 46:
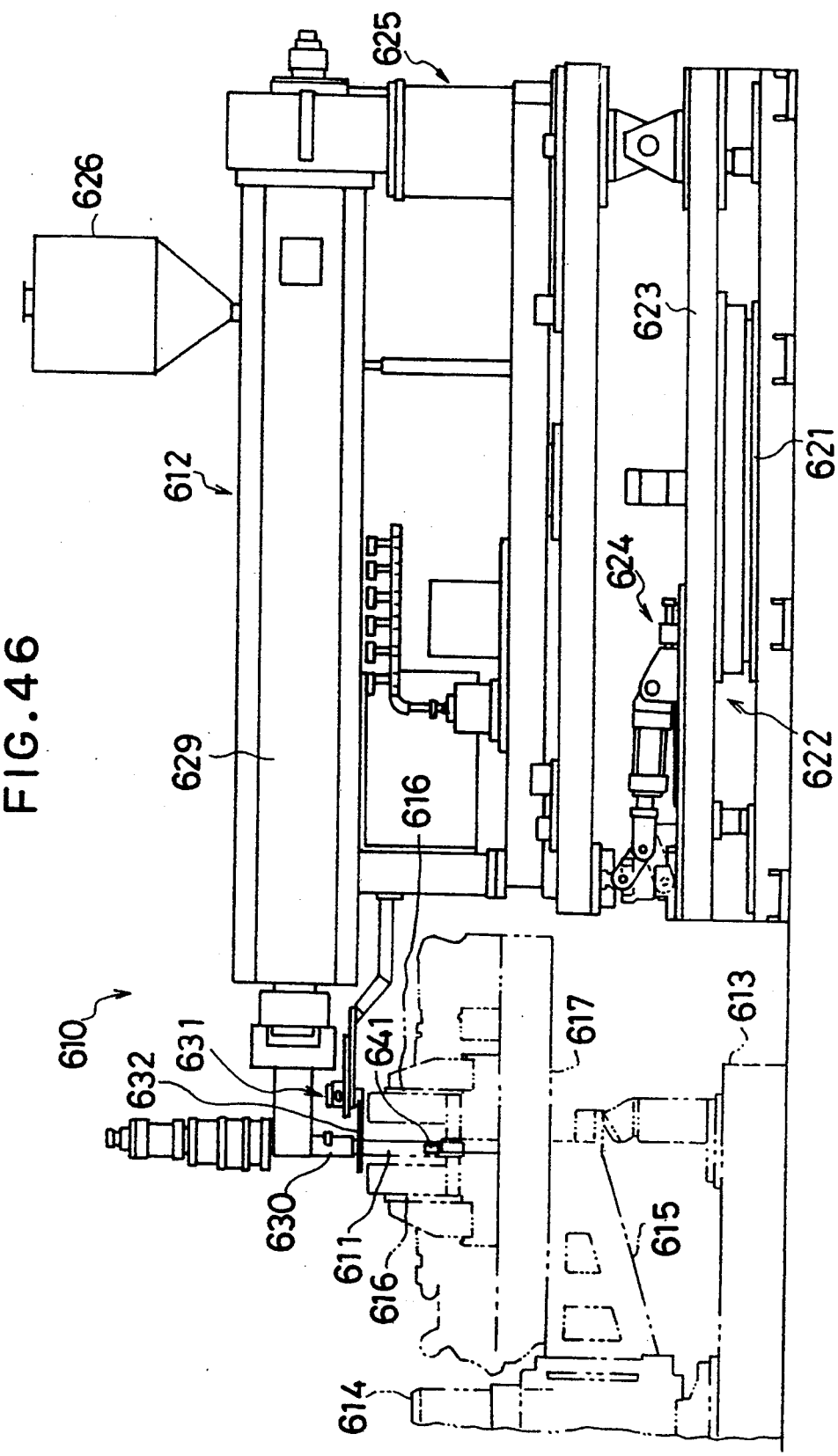

FIG. 46 is a side elevation of the blow molding machine.

DESCRIPTION OF THE PREFERRED EMBODIMENT

In FIG. 1, the reference numeral 1 denotes a rotary type blow molding apparatus which includes an extruder 10 for extruding a tubular molten parison 2 of thermoplastic resin downwardly in vertical direction. A base 5 is provided in parallel to the extruder 10. Six pairs of molds 8 and 8' for performing blow molding by clamping the molten parison 2 are mounted on a turntable 7 via mounting plates 9, which turntable 7 is, in turn, rotatably mounted on the base 5 for rotation about a support shaft 6 (see FIG. 8). Each of the six pairs of the molds 8 and 8' are designed to be intermittently moved in the circumferential direction in order through stations A to F shown in FIG. 1, so that blow molding is sequentially performed for forming the molten parison 2 into an article 2' such as a detergent container, decorative bottles or so forth, for example, during one cycle of circumferential movement around to the stations A to F (see FIG. 11).

As shown in FIGS. 1 to 4, the extruder 10 essentially comprises a lower base 11, an upper base 12 provided above the lower base 11 to be driven to rotate in horizontal direction relative to the lower base 11 by means of a rotatingly driving mechanism 20, and an extruder body 13 provided above the upper base 12 and being adapted to be driven in vertical direction by means of a vertical driving mechanism 30 so as to supply the molten parison 2 to the pair of molds 8 and 8' at the lowered position.

As shown in FIGS. 1 to 4, the extruder body 13 has a hopper 14 at the upper feed side thereof for supplying a pellet form thermoplastic resin (material). A screw 16 driven to rotate by a motor 15 or so forth is incorporated at the lower portion of the hopper 14. The hopper 14 is also provided with a cylinder 18 which is adapted to be heated by a heating device (not shown). The thermoplastic resin molten in the cylinder 18 is simultaneously extruded downwardly as three tubular molten parisons 2, 2 and 2 into cavities defined in the pair of molds 8 and 8' with mutually identical configuration, through a tubular extruding die heads 19 provided at the tip end of the cylinder 18. It should be noted that the number of molten parisons to be extruded from the extruder body is not necessarily limited to three, but can be one, two or four, for example.

As shown in FIGS. 1 to 4, the rotating driving mechanism 20 comprises guides 21 respectively fixed at the four corners of the upper surface of the lower base 11, guides 22 fixed at four corners of the lower surface of the upper base 12 and slidable relative to the guides 21, rotary ring bearing (inner bearing) 23 fixed to the upper surface of the lower base 11 and having internal teeth 23a, and a motor 26 having a motor shaft 26a, on which a drive gear 27 meshing with the internal teeth 23a of the inner bearing 23 is fixed.

As shown in FIGS. 2 to 4, the vertical driving mechanism 30 essentially comprises a pair of hinges 31, 31 provided between the rear portion of the upper base 12 and the rear portion of the extruder body 13, a pair of shock absorbers 32, 32 disposed between the front portion of the upper base 12 and the front portion of the extruder body 13, a pair of links 34, 34 pivoted at respective ends to a pair of brackets 33, 33 vertically extending from the front side of the upper surface of the upper base 12, a link 36 pivoted at one end on a pair of brackets 35, 35 downwardly extended from the front side of the lower surface of the extruder body 13, and a hydraulic cylinder 38 supported on a bracket 37 extending from the upper surface of the upper base 12 in vertically rockable fashion and having a rod 38a with a channel shaped tip end receiving the other ends of the links 34, 34 and the other end of the link 36 for pivoting about a pivot pin.

As shown in FIGS. 5 and 7, a parison cutting device 40 is adapted to cut the three molten parisons 2, 2, 2 supplied to the pair of molds 8 and 8' arranged below the die head 19 into a predetermined constant length so that the upper ends 2a, 2a, 2a slightly extend from the upper surface of the pair of molds 8 and 8'. The parison cutting device 40 has a base plate 41 which is fixed to the extruder body 13 and extends horizontally below the front portion of the cylinder 18, an air cylinder (actuator) 42 supported on the base portion of the base plate 41 in rockable fashion in the lateral direction by a support shaft 43 or so forth, a rotary plate 44 having a shaft portion 44a engaged with a one-way clutch 46 fixed to the lower surface of the tip end of the base plate 41 by a bolt 45 and receiving the tip end of the rod 42a of the air cylinder 42 for pivoting about a pin so as to be driven in one direction (clockwise direction) by reciprocating movement of the rod 42a toward and way therefrom, a mounting plate 47 fixed to the lower end of the shaft portion 44a of the rotary plate 44, a triangular cutter 48 mounted at the tip end thereof on the front portion of the upper surface of the mounting plate 47 by means of a plurality of bolts 49 or so forth, and a cutter positioning mechanism 50 provided on the base plate 41 together with the air cylinder 42 and the rotary plate 44 for determining a cutting start position (rotation start position). The cutter 48 is adapted to rotate in one direction instead of in reciprocation for cutting the upper ends 2a, 2a, 2a of the molten parisons 2, 2, 2. Therefore, the molten parisons 2, 2, 2 can always be cut in a constant condition, e.g. at the constant length. It should be noted that the upper ends 2a of the molten parison 2 are adapted to be left as an upper flash 2a'(flash at the open end) at the upper portion of the molded article 2' after blow molding.

As shown in FIGS. 5 and 6, the cutter positioning mechanism 50 comprises a small size air cylinder 51 fixed on the base plate 41 in substantially parallel relationship with the air cylinder 42, a pair of links 52, 52 supported in a recessed portion 41a of the base plate 41 on the base plate 41 in rockable fashion about a support shaft 53, an intermediate link 54 pivotally connected at both ends to the central portion of the pair of links 52, 52 and the tip end 51a of the rod of the air cylinder 51 for pivotal movement about pivot pins, and a roller 55 rotatably supported between tip ends of the pair of links 52, 52 via a support shaft 56 and freely contacting to and releasing from an arc shaped cut-out 44b formed on the outer circumference of the rotary plate 44 for determining the cutting start position (rotation start position) of the cutter 48.

The outer circumference of the lower surface of the turntable 7 which is rotatably on the base 5 via the support shaft 6 is mounted on a plurality of bearings 60 provided on the base 5. Also, on the outer circumference of the turntable 7, an annular driven gear 61 is fixed. A pair of idler gears 62, 62 rotatably supported on the base 5 via support shafts 63 are meshed with the driven gear 61. The pair of idler gears 62, 62 are meshed with a drive gear 66 mounted on a reduction gear assembly 65 of an AC servo-motor 64 on the base 5. The since the pair of idler gears 62, 62 are interposed between the drive gear 66 and the driven gear 61 of the turntable 7, it becomes possible to remove backlash between the meshing gears so as to permit intermittent rotation and positioning upon stopping with high precision of the turntable 7.

As shown in FIGS. 1 and 8, a gate-like frame 67 is provided over the turntable 7 on the base 5 between the stations B and E on the turntable 7 on the base 5. An article discharging device 68 for discharging the molded article 2' removed from the molds is provided at the station F of the turntable 7 on the base 5. At the position in the station B of the gate-like frame 67 of the turntable 7, a flash configuration correcting mechanism 70 for correcting the upper end 2a of the molten parison 2 projecting from the upper surface of the pair of molds 8 and 8' into the flat and vertically extending configuration before solidifying. An article removing device 80 is provided between upper frame 68a and an intermediate frame 68b of the article discharging device 68 projecting above the turntable 7 therefrom, which article removing device 80 is adapted to remove the molded article 2' upon opening of the pair of molds 8, 8' after blow molding by lifting the article 2' while chucking the upper flash 2a', and subsequently by drawing the upper flash 2a' and holding the body 2b'.

As shown in FIGS. 8 to 10, the flash configuration correction mechanism 70 comprises four guide bolts 73 ... fixed on brackets 71 by means of nuts 72 at the tip ends thereof. The brackets 71 are fixed on the gate-like frame 67 at the position above the position between the pair of molds 8, 8' at the station B of the turntable 7. The flash configuration correction mechanism 70 also includes a channel-shaped mounting plate 74 mounted on the lower ends of the guide bolts 73, and a pair of clampers 76, 76 extending through a pair of guide bars 75, 75 and sliding thereon to shape the upper ends 2a, 2a, 2a of the molten parisons 2, 2, 2 projecting upwardly from the upper surface of the pair of molds 8, 8' into the flat and vertically extending configuration before solidifying. The flash configuration correcting device 70 is further includes a pair of air cylinders 77, 77 mounted at the center of the outer sides at both sides 74a, 74a of the mounting plates 74. The air cylinders 77, 77 have rods 77a fixed to the center of respective clampers 76 for operating the latter toward and away from each other. Cooling means may be provided on the pair of clampers 76, 76 for promoting solidification of the upper end 2a of the molten parison 2.

As shown in FIG. 11, the article removing device 80 is arranged on the upper frame 68a of the article discharging device 68. The article removing deice 80 comprises an upper flash chucking removal mechanism 81 for lifting with chucking the upper flash 2a' of the article 2' upon opening of the pair of molds 8, 8', and a drawing and holding transportation mechanism 90 for drawing the upper flash 2a' and holding the body 2b' of the article 2' removed by the upper flash chucking removal mechanism 81, and rotating for 180° to transfer the article 2' to the article discharging device 68.

As shown in FIGS. 11 to 14, the flash chucking removal mechanism 81 includes an air cylinder 82 extending from the tip end of the upper frame 68a of the article discharging device 68. A mounting plate 83 is fixed to the tip end of a rod 82a of the air cylinder 82 for vertical movement according to expansion and contraction of the rod 82a. The mounting plate 82 is formed into an essentially channel shaped configuration. A pair of chucks 85, 86 extend through a pair of guide shafts 84, 84 extended over both ends 83a, 83b of the mounting plate 83 and slide therethrough for chucking the upper flash 2a' of the article 2' for removing the same from the pair of molds 8, 8' opened. An air cylinder 87 has a rod 87a with the tip end fixed to the center of one of the chucks 86. A pair of air cylinders 88, 88 are mounted on both sides of the outer surface of one side portion 83a of the mounting plate 83 and have rods 88a fixed to both sides of the other chuck 86 so as to contact and release three chucking pieces 89 of the other chuck 86 to and from the one chuck 85. By movement of the rods 87a, 88a of respective of the air cylinders 87, 88, the upper flash 2a' of the article 2' is chucked to remove the article 2' upon opening of the pair of molds 8, 8' by the action of the rod 82a of the air cylinder 82, to lift the article to the predetermined position beneath the upper frame 68a of the article discharging device. It should be noted that cooling means may be provided on the chucks 85, 86.

As shown in FIGS. 11 and 15 to 17, the drawing and holding transportation mechanism 90 includes a pair of arms 91, 91 to be driven to rotate over 180° by a motor 92 provided on the intermediate frame 68b of the article discharging device 68, a sliding frame 94 slidable in the longitudinal direction along a pair of guide shafts 93, 93 provided at both side portions of the front ends of the arms 91, an air cylinder 95 having a rod 95a fixed to the slide frame 84 at the tip end to drive the slide frame 94 in the longitudinal direction by expansion and contraction of the rod 95a, three drawing pads 96 mounted on the front surface of the upper portion of the slide frame 94 with a regular interval and adapted to draw the upper flash 2a' of the article 2', three pairs of gripping pieces 97, 97 mounted on the front surface of the lower portion of the sliding frame 94 for holding and releasing the body 2b' of the article 2' by means of an air cylinder 98. It should be noted that, in FIG. 11, the reference numeral 99 denotes a proximity switch. By the proximity switch 99, the angular positions of the pair of arms 91, 91 can be controlled so that they are placed in relation to the drawing pads 96 and the pairs of the gripping pieces 97, 97 provided on the respective front ends of the arms 91, 91 above the opened molds 8, 8' and above the article discharge device 68.

The six pairs of molds 8, 8' arranged on the turntable 7 via six base plates 9 with an internal of 60° can be opened and closed by means of a mold lock device 100 as shown in FIGS. 8, 18. The mold lock device 100 comprises a pair of guide shafts 101, 101 fixed by three support blocks 102 extending from the center portion of the base plate 9 with a regular interval in horizontally parallel relationship to each other, a pair of movable plates 103, 103' provided slidably along the pair of guide shafts 101, 101 and fixed thereon the pair of molds 8, 8' on the mutually opposing surfaces, a pair of clamping rods 104, 104' connected to the back sides of the movable plates 103, 103' for driving the molds toward and away from each other, a rockable lever 105 rockably supported on a bracket 106 extending from one end (outer side) of the base plate 9 for rocking about a pivot 107 provided at the lower elevation than the height of the guide shafts 101, 101, having an upper end, to which the other end of one clamp rod 104' is pivotally connected via an intermediate link 108 and a lower end extending downwardly from the upper surface of the base plate 9 through an opening portion 9a, a slide rod 110 supported slidably below the base plate via a pair of blocks 109, 109 and connected at one end to the lower end of the rockable lever 105 distanced from the pivot shaft 107 equal to a distance between the pivot shaft 107 and the intermediate link 108 pivoted at the other end of the clamping rod 104', a connecting plate 112 connected to the respective ends to the ends of the slide rod 110 and the other clamping rod 104 through the opening portion 9b of the base plate 9 and slidable along a bracket extending from the other end (inner side) of the base plate 9, and a toggle mechanism 120 reciprocally driving the connecting plate 112 by means a pair of hydraulic cylinders (actuators) 114, 115 downwardly provided at the positions of the gate-like frame 67 corresponding to the stations A and F so that the connecting plate 112 is driven forward by one of the hydraulic cylinders 114 to close the pair of molds 8, 8' and hold in place and the connecting plate is driven backward by the other hydraulic cylinder 115 to open the pair of molds 8, 8' and hold in place.

The toggle mechanism 120 comprises a first link 121 supported by the bracket 113 extending from the other end (inner side) of the base plate 9 via a support shaft 122 for pivotal movement in the vertical direction and being urged by the other hydraulic cylinder 115 at one end to kick the other end upwardly, and a second link 123 pivoted at the other end of the first link 121 at the intermediate portion, pivoted to the connecting plate 112 and slidable along an opening portion 113a of the bracket 113 so as to drive the connecting plate 112 backward when the other end of the first link 121 is kicked up, and carrying a roller 124 rotatably supported on one end so as to be depressed onto the hydraulic cylinder when the other end of the first link is kicked up.

Turning now to the process of operation of the shown embodiment, the rotary type blow molding machine 1 is provided for performing blow molding with the molten parison 2 while the pair of molds 8, 8' are driven to intermittently rotate from the station A to the station F.

At first, the pair of molds 8, 8' which is opened to allow removal of the articles 2' by the article removing device 80 at the station F, as shown in FIG. 18, are rotated to rotate to reach the station A. The AC servomotor 64 is stopped to stop the pair of molds 8, 8' at the station A. The molds 8, 8' are locked with clamping relative to the molten parisons 2, 2, 2 which have already been extruded to a given length, by means of the mold lock device 100. Namely, the roller 124 of the second link 123 of the mold lock device 100 is depressed downwardly by means of the hydraulic cylinder 114 to move (forward) the connecting plate 112 outwardly (radially outward of the turntable 7) on the base plat 9. Then, the connecting plate 112 is moved (forward) toward the outside (radially outside of the turntable 7). By the forward movement of the connecting plate 112, one clamping rod 104 depresses one mold 8 toward the closing direction. At the same time, the clamping rod 104' is driven to move in the opposite direction to that of the one clamping rod 104 via the slide rod 110, the intermediate link 111, the rockable lever 105 and the intermediate link 108 to depress the other mold 8' toward the closing direction. By this, the pair of molds 8, 8' are momentarily closed with clamping of three molten parisons 2, 2, 2. At substantially the same timing as the locking the pair of molds 8, 8', the cutter 48 is driven to rotate at high speed in one direction (clockwise direction) as indicated by the arrow in FIG. 5, by reciprocal movement of the rod 42a of the air cylinder 42 of the parison cutting device 40 to cut the parisons 2, 2, 2. Since the cutter 48 is pivoted in one direction by a one-way clutch 46 to cut the parisons 2, 2, 2, the parisons 2, 2, 2 can always be cut at a constant condition, for example at a constant length. Thus, monitoring of the cut length of the molten parisons 2, 2, 2 and a feedback control through processing of the monitored data can be facilitated. Also, the cutting start position of the cutter 48 can always be positioned at the position indicated by solid lines in FIG. 5 by the cutter positioning mechanism 50, the effect of cutting the molten parison 2, 2, 2 at the constant length can be enhanced.

At substantially the same timing, the extruder body 13 of the extruder 10 at the side of the die head 19 is pivoted upwardly about the hinge 31, 31 by the vertical drive mechanism, as shown in FIG. 2. By this, when the pair of molds 8, 8' are rotated to move to the next station B, interference will never been caused between the pair of molds 8, 8' and the molten parisons 2, 2, 2 being extruded from the die head 19. When the pair of molds 8, 8' are rotated to the position where no interference with the molten parisons 2, 2, 2 may be caused, the rod 38a of the hydraulic cylinder 38 of the vertical drive mechanism 30 is retracted to pivot the extruder body 13 of the extruder 10 at the side of the die head 19 downwardly by the action of rod 38a of the hydraulic cylinder 38 of the vertical drive mechanism 30 about the pair of hinges 31, 31 as shown in FIG. 2. Extrusion of the molten parisons 2, 2, 2 is maintained so as to provide the given length of the molten parisons 2, 2, 2 extruded when the next pair of the molds 8, 8' is stopped at the station A.

Then, by driving the AC servo-motor 64 while maintaining the pair of molds 8, 8' at locked position, the molds 8, 8' are transferred from the station B to the station E through intermittent rotation over 60° and stopping at respective stations. During this, compressed air is blown into the molten parisons 2 clamped within the pair of molds 8, 8' through the blow needles incorporated in the molds 8, 8' to blow mold the desired configuration of the hollow articles, After forming, the articles 2' are cured or cooled within the pair of molds 8, 8'.

In such pair of molds 8, 8', since blow needles instead of blow pins are employed in the compressed air blowing device, it is not possible to remove the articles 2' from molds 8, 8' with the blow pins after molding. Therefore, at the station B, the upper ends 2a, 2a, 2a of the molten parisons 2, 2, 2 slightly extending from the upper surface of the pair of mold 8, 8' are modified in configuration to be a flat and vertically extending configuration by the flash configuration correcting mechanism 70 by clamping the upper ends 2a, 2a, 2a of the molten parisons 2, 2, 2 with a pair of clampers 76, 76. This facilitates removal of the article 2' from the pair of molds 8, 8' by the later-mentioned article removing device 80.

The turntable having a large diameter (such as 2700 mm) and heavy weight (such as 10 tons) can be driven through each of the zones between the stations A to F at high speed (e.g. 2.5 sec) for intermittent rotation (e.g. 1.6 sec. for rotation over each 60° zone and for 0.9 sec. for stopping at each respective station), by the turntable drive device comprising the AC servo-motor 64, the drive gear 66, the pair of idler gears 62, 62, the driven gear 61 and so forth. Thus, the pair of molds 8, 8' are intermittently rotated to stop at the respective stations in order. Since the pair of idler gears 62, 62 are interposed between the annular driven gear 61 fixed to the outer periphery of the turntable 7 and the drive gear 66 to transmit the rotation of the AC servo-motor 64, backlash between the gears can be eliminated. By this, rotation and positioning upon stopping of the turntable can be done with high precision.

When the pair of molds 8, 8' reaches the station F, the pair of chucks 85 and 86 of the flash chucking removal mechanism 81 of the article removing device 80 are already placed at the lowered position. The upper flash 2a' of the article 2' which is shaped into the flat and vertically extending configuration by the flash configuration correcting mechanism 70 and projected from the upper surface of the pair of molds 8, 8' can be chucked by each of the chucking pieces 89 and the chuck 86. Substantially in conjunction with chucking, the mold lock device 100 is actuated by the hydraulic cylinder 115 to open the molds 8, 8'. Then, by retracting the rod 82a of the air cylinder 82 of the flash chucking removal mechanism 81, the pair of chucks 85, 86 are lifted up to the drawing and holding transportation mechanism 90. By lifting of the articles 2' by the flash chucking removal mechanism 81, then the drawing pads 96 provided on one arm 91 of the drawing and holding transportation mechanism 90 catch with certainly the upper flashes 2a' of the articles at the position immediately below the chucks 85, 86 with vacuum, as shown in FIG. 11. Also, the body 2b' of the articles 2' are held by the pair of gripping pieces 97, 97 without causing vibration of the articles 2'. Then, the arms 91 are driven to pivot over 180° by the motor 92. Thereafter, releasing drawing and holding condition, the completed articles 2' can be discharged into the article discharging device 68.

Opening of the pair of molds 8, 8' by the mold lock device is achieved by moving (backward) the connecting plate 112 in the opposite direction to the locking direction. The pivot shaft 107 of the rockable lever 105 of the mold lock device 100 is positioned below the pair of guide shafts 101, 101. The distance from this pivot shaft 107 to the pivot point of the intermediate link 108 at the other end of the clamping rod 104' is set to be equal to the distance between the pivot shaft 107 to the pivot point of the intermediate link 111 of the slid block 110. The pivot shaft 107 is positioned at the intermediate position between the positions of the pair of guide shafts 101 and the upper surface of the base plate 9, the locking force of the mold lock device 100 can be equally distributed to the pair of guide shafts 101, 101 and the base plate 9. Therefore, no excessive load will be applied to the base plate 9 or so forth. In addition, the pair of molds 8.8' can be held at the open and closed positions by the simple construction of the toggle mechanism 120 comprising the first link 121 and the second link 123.

On the other hand, when the screw 16 of the extruder 10 is to be withdrawn for the purpose of cleaning after completion of the blow molding by the rotary type blow molding machine 1, the extruder body 13 of the extruder 10 can be pivoted over a given angle by the pivoting drive mechanism 20 with respect to the turntable 7 as shown by the two dotted line of FIG. 1. By this, the extruder body 13 may not interfere with the mold lock device 100 or so forth so as to facilitate cleaning of the screw 16 or so forth. Furthermore, since the extruder body 13 is pivotable, the installation space for the rotary type blow molding machine 1 can be reduced.

It should be noted that, although the extruder 10 of the rotary type blow molding machine 1 is adapted to pivot in a vertical direction about the hinges 31, 31 by the vertical drive mechanism 30 in the shown embodiment, the extruder 10 is not limited to the shown construction. In the extruder 10' in another embodiment of FIG. 19, the position of the pair of hinges 31', 31' may be set substantially equal to the height of the die head 19 via the reversed V-shaped frame 3 (on the same horizontal plane). By this, the problem of variation of the die head 19 and the centering error of the parison 2 can be successfully avoided. It should be noted that, since other constructions of FIG. 19 are identical to those of the former embodiment, the same components are represented by the same reference numerals and detailed discussion therefor is unnecessary.

Next, the blow molding process to be performed by the above-mentioned blow molding machine will be discussed herebelow.

The blow molding machine 1 includes the extruder 10 for extruding the parison 2 downwardly, a pre-sealing device 200 for pre-sealing one end portion of the parison 2, a pre-blowing device 201 incorporated within the die head 19 of the extruder 10 for pre-blowing the compressed air into the pre-sealed parison 2, the pair of molds 8, 8' for clamping the parison and closing both ends of the parison 2, and a blowing device 202 incorporated in the mold 8 for blowing the compressed air into the parison 2 closed in the molds 8, 8' until the parison becomes shaped to a consistent configuration with the cavity of the molds 8, 8'.

In the blow molding machine 1, the parison 2 extruded from the extruder 10 is hung downwardly. One end of the parison 2 is clamped by the pre-sealing device 200 for pre-sealing. Then, the compressed air is pre-blown into the parison 2 by the pre-blowing device 201. Subsequently, by clamping the parison 2 by the pair of molds 8, 8', both ends of the parison are closed. The compressed air is blown into the closed parison 2 until the configuration becomes coincident with the cavity of the pair of molds 8, 8' to blow mold the article 2'. The molded article 2' is cooled within the molds 8, 8'. In FIG. 21, the reference numeral 230 denotes a cooling water passage defined within the molds 8, 8'.

As shown in FIGS. 20(a) and 20(B), the blow molding machine is provided with the pre-sealing device 200 at the lower ends of the pair of molds 8, 8'. The pre-sealing device 200 has a pair of pre-sealing plates 203, 203' arranged projecting frontwardly from the mating surfaces of the molds 8, 8' and compression springs 204, 204' resiliently supporting the back of the pre-sealing plates 203, 203'. By this, the pre-sealing device 200 clamps one end of the parison 2 with the pre-sealing plates 203, 203' at the intermediate timing in the closing process of the molds 8, 8' for pre-sealing. On the other hand, the blow molding machine defines the compressed air discharge opening 205 of the pre-blowing device 201 at the center of the die head 19 of the extruder 10 to normally discharge the compressed air through the compressed air discharge opening 205. Therefore, when one end of the parison 2 is pre-sealed by the pre-sealing device 200 as set forth above, the compressed air supplied by the pre-blowing device 201 expands the entire body of the parison 2 to form a space between two parison skin. The space prevents the blowing needle 210 of the blowing device 202 from passing through both parison skins in the cavity of the molds 8, 8' to make blow molding impossible in the subsequent process.

Namely, in the blow molding machine, the pre-sealing of the parison 2 is to be done at the lower portion of the molds 8, 8', namely at the position most distanced from the extruder 10. Accordingly, the parison 2 will not be subjected to a strong bending effect at the position immediately below a die 19a and a core 19B of the die head 19 of the extruder upon pre-sealing so that a ring mark will never be formed. Therefore, the lower flash to be cut at the lower end of the parison 2 can be made smaller to improve yield.

On the other hand, in the blow molding machine, the parison 2 is extruded in a length corresponding to the overall length of the article to be molded upon performing pre-sealing for the parison 2. The parison 2 is expanded uniformly through the entire body by the pre-blowing of the compressed air. Therefore, the pre-blow can be performed throughout all processes of the extrusion of the parison 2. Before pre-sealing, the pre-blown compressed air passes the entire length of the parison and is discharged therefrom. On the other hand, once the parison 2 is pre-sealed, the pre-blown compressed air serves for expanding the entire body of the parison. Accordingly, it becomes unnecessary to monitor the timing for starting pre-blow to permit simplified pre-blow control.

Furthermore, as shown in FIGS. 21(A), 21(B), 21(C), the blow molding machine 1 incorporates the blow needle 210 and a blow needle drive section 211 in the mold 8 mounted on the movable plate 103 serving as a mold mounting plate. Namely, the guide block 212 is integrally provided at the back side portion corresponding to respective cavities of the mold 8. The blow needle drive section 211 is integrated with the guide block 212. The blow needle drive section 211 includes an air cylinder 213 and a piston rod 214. The base end of the blow needle 210 is connected to the piston rod 214. The blow needle drive section 211 is designed to switch the position of the blow needle 210 between a projected position (see FIG. 21(B)) projecting into the cavity and a retracted position (see FIGS. 21(A) and 21(C)) retracted from the cavity by selectively switching the compressed air supply through a needle projecting port 213a and a needle retracting port 213b of the air cylinder. When the blow needle 210 is set at the projected position, an air induction port 215 defined in the guide block 212 communicates with an air passage 216 defined at the center portion of the blow needle 210. When the blow needle 210 is set at the retracted position, an air discharge port 217 defined in the guide block 212 communicates with the cavity space via a needle hole 218 defined in the mold 8.

Accordingly, in the shown construction of the blow molding machine, (1) when the molds 8, 8' are open and the parison 2 is inserted between the mating surfaces of the molds 8, 8', the blow needle drive section 211 sets the blow needle 210 at the retracted position, (2) when the pair of molds 8, 8' are locked, the blow needle drive section 211 sets the blow needle 210 at the projected position of Fig. 21(B) so that the blow needle 210 pierces one of the parison skins of the pre-blown parison 2 by the tip end thereof to introduce the compressed air supplied through the air induction port 215 into the parison 2. Blowing of the compressed air by means of the blow needle 210 is continued until the configuration of the parison 2 becomes coincident with the cavity of the molds 8, 8' and further until the formed parison is cooled. (3) Immediately before opening of the mold 8, 8', the blow needle drive section 211 moves the blow needle 210 to its retracted position so as to discharge the high pressure air in the molded article through the hole formed by piercing the needle, and through the needle guide hole 218 (FIG. 21(C)) and the air discharge port 217 to prevent deformation of the molded article 2' due to high pressure air in the article 2' upon opening of the molds 8, 8'.

On the other hand, as shown in FIGS. 21(A), 21(B) and 21(C), the blow molding machine incorporates an ejector pin 221 of an ejector device 220 and an ejector pin drive section 222 in the molds 8, 8'. Namely, at both of upper and lower ends of the molds 8, 8', air cylinders 223 of the ejector drive section 222 are incorporated. The piston rods of the air cylinders 223 form ejector pins 221. The ejector drive section 222 switches the position of the ejector pins 221 between a stand-by position (see FIGS. 21(A) and 21(B)) retracted from the upper and lower mating surfaces of the molds 8, 8' and an active position (see FIG. 21(C)) projected from the mating surfaces of the molds 8, 8' by selectively supplying the compressed air through a pin projecting port 223a and a pin retracting port 223b of the air cylinder 223. The reference numeral 224 denotes a guide pin hole defined in the molds 8, 8'.

By this, in the blow molding machine 1, upon removal of the article with opening the pair of molds 8.8', the ejector drive section 225 drives the ejector pin 221 to project from the mating surfaces of the molds 8, 8' to hold the upper flash of the article 2' with the pair of ejector pins 221 provided at the upper end side of the molds 8, 8', and a lower flash of the article 2' is held between the pair of ejector pins 221 provided at the lower end side of the molds 8, 8' to enable removal of the article 2' from the molds 8, 8', as shown in FIG. 21(C).

The shown embodiment of the blow molding machine is further provided with a defective discrimination control device 300, as shown in FIG. 22. The defective discrimination control device 300 performs quality discrimination of the articles 2' during the process from starting of extrusion of the parison by the extruder 10 to removal of the article by the article removing device 80. The defective discrimination control device 300 controls the article removing device 80 at the article removing stage so as to drop the normal articles to a discharge conveyer 301 of the article discharging device 68 and to direct the defective articles to the defective discharge conveyer 303 via a defective discharge chute 302 of the article discharge device 68.

The layout of the normal article discharging conveyer 301 of the article discharging device 68, the defective articles discharging chute 302 and the defective articles discharging conveyer 303 may be as illustrated in FIG. 24. The defective articles discrimination control device 300 monitors the instantaneous position of the arm 91 detected by an arm position detector 304 during pivotal movement of the arm 91 with the drawing pads 96 and the gripping pieces 97 by the motor 92 of the drawing and holding transportation mechanism 90 forming the article removing device 80 to selectively feed that articles in such a manner that, ① when the article 2' is a normal product, the defective discrimination control device 300 controls a drawing pad driver 305 to release drawing of the drawing pads 96 of the upper flash 2a' on the article 2' and controls a cylinder driver 306 for the air cylinder 98 of the gripping pieces 97 to release gripping of the gripping pieces of the body 2b' of the article 2' at a timing where the drawing pads 96 and the gripping pieces 97 reach the position above the normal article discharging conveyer 301 through 180° of pivotal movement, to discharge to the normal article discharging conveyer 301 and ② when the article 2' is defective, the defective discrimination control device 300 controls the drawing pad driver 305 to releasing drawing of the drawing pads 96 for the upper flash 2a' of the article 2' and controls the cylinder driver 306 to release gripping of the body 2b' of the article 2' by the gripping pieces 97 at a specific timing mid-way of pivotal movement through 180° of the drawing pad 96 and the gripping pieces 97 to divert the defective articles into a defective articles receptacle port 302 of the defective articles discharging chute by centrifugal force on the defective articles.

Here, in the shown embodiment, the defective articles discrimination control device 300 discriminates between the normal products and the defective products with respect to the following items (a) through (h).

(a) Item to detect that Parison 2 is Defective upon Initiation of Molding Operation Upon initiation of molding operation, until the extruder screw rotation speed of the extruder 10 driven by the motor 15 is sufficiently accelerated and becomes constant, the length of the parison 2 extruded by the die head 19 at the locking timing should be shorter than the proper length. An article 2' molded with such a parison is defective.

The defective discrimination control device 300 receives an output from the screw rotation speed detector 311 for detecting the rotation speed of the motor 15. The defective discrimination control device 300 continuously outputs a defective indicative signal until the extruder screw rotation speed represented by the screw rotation speed detector 311 reaches a target speed preset through an input device 310.

(b) Item to detect that Parison 2 is Defective When Length Thereof is outside the Target Length Range The thickness of the parison extruded from the extruder 10 is cyclically controlled with respect to a target parison length in order to provide a desired thickness distribution in the article after blow molding. Accordingly, in order to obtain high precision of the article thickness distribution by the cyclically activated parison thickness control, it is essential to maintain a constant parison length at the locking timing of the molds. On the other hand, if the parison length is excessive, the length of the lower end extending from the molds 8, 8' to become the flash becomes excessive and this causes substantial wasting of the material, When the parison length is too short, the lower end of the parison cannot be clamped by the molds 8, 8' and this makes blow molding impossible.

Therefore, in the shown embodiment of the blow molding machine 1, a phototube 312 is arranged beneath the die head 19 of the extruder 22 (see FIGS. 1 and 10) to enable detection of the timing of blocking a light beam by the parison 2. Signals indicating the cutting timing of the parison 2 by the cutter 48 of the parison cutting device 40 and the light beam blocking timing by the parison 2 passing across the phototube 312 are supplied to a parison length detector 313. The parison length detector 313 derives a difference of the parison cutting timing and the light blocking timing of the parison as a light blocking period and derives the length of the parison 2 upon locking of the molds based on the light blocking period of the parison 2. The defective article discrimination control device 300 receives the result of this detection by the parison length detector 313 to output a defective article indicative signal when the parison length is outside the target length range preset through the input device 310.

(c) Item to Make Judgment of Blowing Gas Supply Failure during Parison Blowing

When the pair of molds 8, 8' are closed and the compressed air is blown into the parison 2 by the blow needle 210, the article 2' is judged as defective due to formation of a hole in the parison 2 if the compressed air is blown over an excessive period or the air pressure drops below a predetermined pressure.

The defective article discrimination control device 300 is associated with a blowing air flow meter 314 and a blow air pressure detector 315 within an air supply path. The defective article discrimination control device 300 is responsive to the result of detection of the blow air flow meter 314 to output the defective article indicative signal when the blowing air flow meter continues detection of air flow beyond a given period or when the blowing air pressure is lower than a preset pressure of the input device 310.

(d) Item to detect Failure of Downstream Facility following the Blow Molding Machine 1

When the article 2' is removed by the article removing device 80 and discharged to the downstream process and when the downstream facility, such as deflashing machine or so forth, is not operating in the normal state, secondary trouble may be caused by discharging the article 2' to the downstream process.

Therefore, the defective article discrimination control device 300 receives an output of a downstream facility failure detector 316 to output the defective indicative signal irrespective of the quality, normal or defective, of the article 2' per se if an abnormality is detected in the downstream process upon discharging the article 2' removed by the article removing device 80.

(e) Item to Make Judgement of Failure for Absence of Article 2' at Article Removing Station The blow molding machine 1 includes an article detector 317 comprising a phototube or so forth, at a station to remove the article 2' from the molds 8, 8' by the article removing device 80 (see FIG. 11).

The defective article discrimination control device 300 issues the defective article indicative signal when the article 2' which should be present, is absent when the article detector 317 fails to detect the presence of the article 2' at a timing where the article removing device 80 removes the molded article.

(f) Item to detect of Defective Article When Lower Flash 2c' of Article 2' is not Present at Predetermined Position at Article Removing Station The blow molding machine 1 includes a lower flash detector 318 comprising a phototube or so forth at the article removing station where the article 2' is removed from the molds 8, 8' by the article removing device 80 (see FIG. 11).

The defective article discrimination control device 300 issues the defective article indicative signal when the lower flash detector 318 detects absence of the lower flash 2c' at the predetermined position at the timing of removal of the article by the article removing device 80. When the lower flash 2c' of the article 2' is not present at the predetermined position due to swaying or so forth, such lower flash 2c' tends to be a cause of abnormality by blocking of the discharge path by falling down in the downstream process.

(g) Item to detect for Abnormality When Article Removing Device 80 Abnormally Holds Body 2b' of Article 2'

The article removing device 80 is provided with an article holding detector 319 on the air cylinder 98 for detecting opening and closing positions of the pair of gripping pieces 97 driven by the air cylinder 98 for holding the body 2b'. The article holding detector 319 detects the opening and closing angle of the gripping pieces 97 by detecting the stroke position of the air cylinder 98 for detecting abnormal holding of the body 2b' based on whether the gripping pieces 97 are, or are not, at the proper position at the cylinder stroke position to hold the body 2b'.

The defective article discrimination control device 300 obtains the result of detection by the article holding detector 319 at the article removing timing to make judgement that part of the body 2' of the article 2' is crushed when the gripping pieces 97 holds the body 2b' at a position at the closing side out of the proper position to issue the defective indicative signal.

(h) Item to detect Absence of Article 2' in the above-mentioned Item (e) in Preceding Cycle When the article 2' is not present at the article removing station in the above-mentioned item (e), there is a possibility that the article 2' was left un-removed from the corresponding molds 8, 8' to enter into the next cycle of process.

Therefore, the defective article discrimination control device 300 makes judgement of the possibility of producing redundantly molded articles with respect to the article 2' molded in the next molding cycle of the same molds 8, 8' and serves to output the defective article indicative signal.

Namely, in the defective article discrimination control device 300, discrimination for normal articles and defective articles is made for all items of (a) to (h) through the overall process from starting of extrusion of the parison to the stage of the removing the article. Based on the results of discrimination studies, the defective article discrimination control device 300 controls the article removing device 80 at a timing of arrival of the molded article 2' to the article removing station to feed the normal articles to the normal article discharging conveyer 301 and to put the defectives to the defective discharging conveyer 303 through the defective discharging shoot 302.

The effect of the shown embodiment will be discussed herebelow.

(1) Since the shown embodiment shapes the upper end of the parison extending upwardly from the upper surface of the molds 8, 8' into a flat and vertically extending configuration before solidification, the upper flash 2a' can be certainly and readily chucked. Accordingly, removal of the articles 2' can be assured in the continuous operation performed without stopping the operation throughout initiation of molding to the normal operating condition.

(2) By discriminating the articles 2' between normal and defective during starting of extrusion of the parison to the stage of removal of the finished article, the normal article is discharged to a destination for the normal product (normal article discharging conveyer) and the defective article is discharged to the destination for the defective articles (defective article discharging conveyer). Accordingly, not only in the molding process, but also in the article removing process, quality discrimination for the normal articles and defective articles can be performed to accurately discharge the normal articles and the defective articles in separated fashion.

(3) By the above-mentioned (1), the defective articles upon initiation of molding operation can be automatically discharged without stopping the machine to enable automating initial operation.

(4) By the above-mentioned (1) and (2), the defective articles in normal operation can be automatically taken out without stopping the machine to eliminate the necessity of re-starting the operation associated with stopping of the machine with avoiding discharging of the defective articles to the downstream processes. Therefore, sequential molding can be achieved.

It should be noted that, in the shown embodiment of the invention, the item for discriminating the defective articles can be at least one of the above-mentioned items (a) to (h). Also, it is possible to employ items other than the foregoing (a) to (h).

In FIGS. 25 and 26, the reference numeral 400 denotes a reciprocation type blow molding machine which includes an extruder 401, a mold 402, an article removing device 403, a defective discharging device 404 and a normal article discharging device 405.

The extruder 401 includes a hopper 406. The extruder also includes a cylinder 409 incorporating a screw to be driven to rotate by a motor 407 via a gear case 408 for extruding a tubular molten parison of a thermoplastic resin through an extrusion head 410.

The mold 402 can be open and closed with a support provided by a mold lock device 402A. The mold 402 is reciprocated obliquely in an up and down direction by a tilted guide rod 411 provided between a position immediately below the extrusion head 410 and a position immediately below an article removing station A employing the article removing device 403. The mold 400 is adapted to clamp the parison extruded from the extrusion head 410 at a position immediately below the extrusion head 410, to be moved to the position immediately below the article removing station A by the article removing device 403, to perform blow molding of the parison by the operation of a blowing device (not shown), and to eject the article to discharge by the action of the ejector device (incorporated in the mold 402 in the shown embodiment). It should be noted that the portion of the parison extending upwardly from the upper surface of the mold 402 is cut by a cutter (not shown) at the stage arranged below the extrusion head 410.

The article removing device 403 is movable between an article removing position A, a defective article discharging position B and a normal article discharging position C by a motor 412. The article removing device 403 is adapted to be driven up and down by a lifting cylinder 413 and carries a pair of chucks 414 which can be driven to open and close by means of an air cylinder (not shown). The article removing device 403 provides (a) a flash configuration correcting function for clamping the upper end of the molten parison projecting from the upper surface of the mold 402 set up the article removing position A by the chucks 414 before solidification to shape the same into a flat and vertically extending configuration. The article removing device 403 also provides (b) an article removing function for clamping the upper flash formed through the abovementioned (a) with the chuck 414 to remove the article from the mold 402 after blow molding within the mold 402.

The defective discharge device 404 comprises a defective discharging chute 421 arranged below the defective article discharging position B and a defective article receptacle 422 for receiving the defective articles released from clamping of the chucks 414 of the article removing device 403.

The normal article discharging device 405 includes a normal article discharging chute 423, an orienting device 424 and a normal article discharging conveyer 425 arranged below the normal article discharging position C for discharging the normal articles released from clamping by the chucks 414 of the article removing device 403 to the downstream processes.

Furthermore, the blow molding machine 400 is provided with a defective discrimination control device 300 similarly to the foregoing blow molding machine 1. The blow molding machine 400 makes quality discrimination for the normal articles and defective articles during the process from the stage of initiation of extrusion of the parison by the extruder to the stage of removing the articles by the article removing device 403, and, at the article removing stage, controls the article removing device 403 to discharge the normal articles to the normal article discharging device 405 and the defective articles to the defective article discharging device 404.

Accordingly, in the blow molding machine 400 of FIGS. 25 and 26, the operations as set out in the following paragraphs (1) to (5) are performed.

(1) The mold 402 is lifted up at the position immediately below the extrusion head 410 and locked for clamping the molten parison. Thereafter, the portion of the molten parison projecting upwardly from the upper surface of the mold 402 is cut.

(2) The mold 402 is moved down to the position immediately below the article removing position A, or during downward movement, blow molding of the parison is performed by the blowing device.

(3) Simultaneously with starting blow molding in the foregoing (2), the chucks 414 of the article removing device 403 are lowered to the article removing position a to clamp the cut upper end to hold the upper flash in a flat and vertically extending configuration.

(4) Opening the mold 402, the chucks 414 of the article removing device 403 are moved upwardly at the article removing position A to remove the article.

It should be noted that the defective article discrimination control device 300 performs discrimination during the period from the stage of initiation of extrusion of parison to the stage of removal of the article by the article removing device 403.

(5) The defective discrimination control device 300 controls the article removing device 403 on the basis of discrimination between the normal articles and the defective articles for discharging the normal articles to the normal article discharging device 405 and discharging the defective articles to the defective article discharging device 404.

It should be noted that, in the shown embodiment of the invention, it is possible to employ the article removing device having the flash configuration correcting function and the article removing function even for the rotary type blow molding machine.

Also, in the shown embodiment of the invention, it is possible to provide the flash configuration correcting device and the article removing device having the flash configuration correcting function and the article removing function independently of the other.

As set forth, according to the present invention, it becomes possible to remove, with certainty the molded article and to separately discharge the normal articles and the defective articles in a continuous operation without stopping operation at any operating condition from initiation of molding operation to normal operating state.

(B) Parison Length Control Method (First Embodiment) (FIGS. 27 to 36)

As shown in FIGS. 35 and 36, a rotary type blow molding apparatus 510 includes an extruder 512 for extruding a tubular molten parison 511 hanging downwardly in a vertical direction. The blow molding machine 510 is provided with six pairs of molds 516 for clamping and closing both end of the parison. The six pairs of molds 516 are mounted on a turntable 515 via mounting plates 517, which turntable 515 is, in turn, rotatably mounted on a base 513 arranged in front of the extruder 512, for rotation about a support shaft 514. Each of the six pairs of the molds 516 are designed to be intermittently moved in the circumferential direction in order through stations A to F shown in FIG. 35, so that blow molding is sequentially performed for forming the molten parison 511 by blowing the blowing gas into the parison while closed by the molds 516 to expand the latter until the configuration thereof becomes coincident with that of the cavity of the molds 516 during one cycle of circumferential movement through the stations A to F.

The extruder 512 comprises a lower base 521, an upper base 523 provided above the lower base 521 to be driven to rotate in a horizontal direction relative to the lower base 521 by means of a rotatingly driving mechanism 522, and an extruder body 525 provided above the upper base 523 and adapted to be driven in a vertical direction by means of a vertical driving mechanism 524 so as to supply the molten parison 511 to the pair of molds 516 at the lowered position.

The extruder body 525 has a hopper 526 for supplying a pellet form thermoplastic resin. A screw 528 is driven to rotate by a motor 527 or so forth and is incorporated at the lower portion of the hopper 526. The hopper 526 is also provided with a cylinder 529 which is adapted to be heated by a heating device not shown. The thermoplastic resin molten in the cylinder 529 is supplied to one pair of the molds 516 as a tubular molten parison 511 through tubular extruding die heads 530 provided at the tip end of the cylinder 529. A parison cutting device 531 is provided below the die head 530. A cutter 532 of the parison cutting device 531 is adapted to cut the parison so that the upper end of the parison 511 supplied in the pair of molds 516 is slightly projected from the upper surface of the pair of molds 516.

The blow molding machine 510 is provided with a controller 540 as shown in FIG. 27 to obtain the given length of the parison (the target parison length: it is a parison length measured by the cutter 532 in this embodiment) so that the lower end of the parison 511 supplied into the mold slightly protrudes from the lower surface of the pair of molds 516 at the locking timing of the pair of molds 516, to perform the parison length control as illustrated in FIG. 28.

The blow molding machine 510 has a phototube 541 arranged below the die head 530 of the extruder 512 for enabling detection of a light blocking timing of the parison. Also, a controller 540 optionally includes an input device 542, a monitor device 543 and a motor driver 544.

The controller 540 operates in (A) control constant calculation mode, (B) deadband calculation mode and (C) normal operation mode which will be discussed in further detail hereinafter.

(A) Control Constant Calculation Mode (see FIGS. 27 to 31A & B)

This mode is performed for preliminarily deriving a relationship between the parison length of the resin to be used (the light blocking period) and the extruder screw rotation speed N, during a test molding process.

At this time, a counter 551 of the controller 540 obtains the cutting timing of the parison 511 by the parison cutting device 531 and the light blocking time by the parison 511 passing across the phototube 541 for deriving the difference of the timings as the light blocking period t and uses this light blocking period t at the time of locking the parison 511 as a value corresponding to the parison length (current parison length).

The relationship between the light blocking period t and the screw rotation speed N can be determined through the following equations (1) to (6). Namely, assuming that the resin extrusion amount (weight of the resin extruded within a unit time) is Q, the resin pressure (at the tip end of the screw) is P, the parison weight is M, and constants are A, B, C, D and E, by removing $p^n$ from an equation (1) expressing the screw characteristics and an equation (2) expressing the die characteristics, the following equation (3) can be obtained.

$$Q = A \times N - B \times P^n \quad (1)$$

$$Q = C \times P^n \quad (2)$$

$$Q = D \times N \text{ (relationship between extrusion amount and the screw rotation speed)} \quad (3)$$

$$D = A \times C/(C+B)$$

The relationship between the extrusion amount and the light blocking period can be expressed by the following equation (4). Since what are actually measured are N and t, by removing Q from the equations (3) and (4), the following equation (5) can be obtained $$Q = M/t \quad (4)$$

$$N = a \times (1/t) \quad (5)$$

From the foregoing equation (5), 1/t and N are proportional. As shown in FIG. 29, by adjusting the screw rotation speed in a magnitude of $\Delta N$ relative to a fluctuation magnitude $\Delta t$ of the light blocking period, the target parison length can be accurately obtained.

A control constant "a" of the equation (5) can be derived through the following equation (6) by obtaining the light blocking periods $t_1$, $t_2$ corresponding to two screw rotation speeds $N_1$, $N_2$. It should be noted that determination of a is normally performed once upon changing of the resin.

By replacing two points $(1/t_1, N_1)$ and $(1/t_2, N_2)$ to a general equation $Y = aX + b$ of a linear function, the equation is modified to $N_1 = a \times (1/t_1) + b$, $N_2 = a \times (1/t^2) + b$. As a result, the following equation (6) can be obtained.

$$a = \frac{t_1 \times t_2 \times (N_1 - N_2)}{(t_2 - t_1)} \quad (6)$$

Accordingly, the controller 540 generates a property measuring demand during the test molding process, as shown in FIGS. 27 and 28 so as to receive the property measuring screw rotation speeds $N_1$ and $N_2$ through the input device 542 and drive the motor 527 of the screw 528 at one of two speeds $N_1$ and $N_2$ through a motor driver 544. It should be noted that the motor speed of the motor 527 is detected by a pulse generator 533 and fed back to the motor driver 544. The controller 540 connects the output of the counter 551 to a control constant calculation circuit "1" (see FIG. 27) to derive the light blocking period $t_1$ and $t_2$ corresponding to two speeds $N_1$, $N_2$. Furthermore, the controller 540 derives the control constant "a" applying the property indicative values $N_1$, $N_2$, $t_1$ and $t_2$ to the foregoing equation (6). The control constant "a" thus derived is stored in a data memory 552.

In summary, the controller 540 sets the screw rotation speed $N_1$ and measures the light blocking period $t_1$ six times after the speed of the screw 528 reaches the speed $N_1$ for setting an average value as the light blocking period $t_1$ as shown in FIG. 30. Also, the controller 540 sets the screw rotation speed $N_2$ and measures the light blocking period $t_2$ six times after the speed of the screw 528 reaches the speed $N_2$ for setting an average value as the light blocking period $t_2$. The reason for measuring the light blocking period for deriving $t_1$ and $t_2$ six times (n times) is to cancel fluctuation of the measured value within the later-mentioned deadband.

(B) Deadband Calculation Mode (see FIGS. 27, 28 and 31A & B)

This mode is adapted to set the width of the deadband, in which the correction for the extruder screw rotation speed is not performed, by detecting fluctuation of the current parison length (light blocking period t) with a relatively short period and by setting the width corresponding to the magnitude of the detected fluctuation.

In general, the parison length may fluctuate according to elapsed time while the average value fluctuates moderately as illustrated in FIG. 31(A). Respective fluctuation at respective measuring timing fluctuate about the average value within a relatively small range. Such small fluctuation is caused due to fluctuation of the cut edge configuration cut by the cutter 532 or vibration of the parison, and may not be considered as the fluctuation of the extrusion amount per se. Namely, the object for control is substantial variation of the parison length (shown by solid line). The small fluctuation (shown by broken line) is preferably ignored because of the possibility of causing hunting. Therefore, according to the present invention, the width of the small fluctuation (broken line) is measured automatically for setting the deadband. The parison length control is performed to obtain the result as illustrated in FIG. 31(B).

In summary, since the parison length fluctuates as shown in FIG. 31(A), the overall fluctuation width $W_2$ can be obtained by obtaining data every hour. However, through measurement over a substantially shorter interval (approximately 1 to 5 minutes) in which the substantially large and moderate variations are not affected, only $W_1$ can be obtained. Therefore, by obtaining this data before obtaining the normal article, the deadband can be set for the subsequent molding operation utilizing this data.

The fluctuation of the parison length may be applied for a statistical standard deviation $\sigma$. By setting the deadband to a width of $3\sigma$, theoretically 99.7% of small fluctuations can be ignored so that the control for correcting the extruder screw rotation speed is performed only when a fluctuation in excess of the deadband is caused.

Accordingly, the controller 540 generates a deadband automatic measurement demand after initiation of molding, as shown in FIGS. 27 and 28 and connects the output of the counter 551 to a deadband calculation circuit "2" (see FIG. 27) to measure the light blocking period t many times (e.g. 60 times) to derive the average $\sigma$ and set the deadband based on the $\sigma$. The deadband width thus derived is stored in the data memory 52.

(C) Normal Operation Mode (see FIGS. 27, 28, 32-A,B and C to 34)

This mode is performed during normal molding operation to detect the current parison length (light blocking period t), to derive a parison length difference (light blocking period difference T) between the current parison length (the reciprocal of the light blocking period t) and the target parison length (the reciprocal of the target light blocking period), to control the extruder screw rotation speed (N) by calculating the correction value ($\Delta N$) of the extruder screw rotation speed corresponding to the parison length difference (light blocking period difference) while employing the preliminarily set control constant of the mode (a), and thus to obtain the target parison length. It should be noted that the target light blocking period $t_0$ can be obtained through $l_0/L = t_0/$molding cycle ($l_0$: the parison length from the cutter 532 to the phototube 541, L is the target parison length; see FIG. 27).

Accordingly, as shown in FIGS. 27 and 28, the controller 540, in the normal molding process, reads out the control constant "a" and the deadband width from the data memory 552, connects the output of the counter 551 to a correction amount calculation circuit "3" (see FIG. 27), derives a difference T between the reciprocal of the light blocking period t and the reciprocal $t_0$ of the target light blocking period, and calculates the correction magnitude $\Delta N$ of the extruder screw rotation speed corresponding to the light blocking period difference T employing the control constant "a" when the light blocking period different T is out of the deadband. Then, the controller 540 controls driving of the motor 527 of the screw 528 through the motor driver 544 to attain the target parison length.

It should be noted that the controller 540 may employ the following control architectures of (C-1) to (C-3), in practice.

(C-1) Control Architecture of FIG. 32(A)

In this control architecture, control is performed by following three ranges depending upon light blocking period difference T:
① deadband;
② proportional correction range; and
③ abnormality correction range.

In FIG. 32(A), PN denotes an upper limit of the correction magnitude for the extruder screw rotation speed. When the calculated correction magnitude $\alpha$ exceeds PN, the correction magnitude is limited to PN. In concrete, the following control is performed (see FIG. 33).

(1) After initiation of molding operation, the light blocking period t is measured for 60 times to derive the average $\sigma$. Then, the deadband is set to a width corresponding to $3\sigma$. The process of this (1) can be neglected.

(2) By measuring the light blocking period t, $\Delta \tau = 1/t - 1/t_0$ relative to the target light blocking period $t_0$ is derived.

(3) At every extrusion chute, $\Delta \tau$ is monitored. When the $\Delta \tau$ becomes outside of the deadband, an average light blocking period difference T is taken for $\Delta \tau_1$ to $\Delta \tau_6$ of the subsequent six extrusion chutes. If $|T|$ becomes outside of the deadband, correction of the extruder screw rotation speed is initiated. Here, the reason to judge whether the correction is to be performed or not by obtaining the average T of $\Delta \tau_1$ to $\Delta \tau_6$ is to avoid initiation of correction in response to a temporary fluctuation (measurement error) for only one chute.

(4) Utilizing the foregoing (3), and absolute value of the extruder screw rotation speed correction magnitude $a = a \times |T|$ is derived.

(5) If $\alpha > PN$, judgment within the proportional correction range is made so that the screw rotation speed is accelerated for $\Delta N = \alpha$ when $T < 0$, the screw rotation speed is decelerated for $\Delta N = -\alpha$ when $T > 0$.

(6) If $\alpha > PN$, judgment within the abnormality correction range is made, so that the screw rotation speed is accelerated for ΔN=PN when T<0, the screw rotation speed is decelerated for ΔN=−PN when T>0.

(C-2) Control Architecture of FIG. 32(B)

This control architecture narrows the deadband (for instance, the width of the deadband is set at 2σ) and expand the proportional correction range for control.

Even in this control architecture, control is performed by following three ranges depending upon light blocking period difference T:
① deadband;
② proportional correction range; and
③ abnormality correction range.

The concrete operation is the same as that illustrated in FIG. 33.

(C-3) Control Architecture of FIG. 32(C)

This architecture is established by expanding the minimum correction magnitude in the proportional correction range by narrowing the deadband (C-2) similarly to (C-2).

This control architecture is effective in the following case. Namely, in case the resolution is rough in the extruder screw rotation speed control, the minimum correction magnitude cannot be made smaller. In such case, the deadband can not be narrowed beyond the possible minimum correction magnitude in case of the control architecture of FIG. 32(B). In contrast, in case of the control architecture of FIG. 32(C), the deadband can be narrowed beyond the range where the correction magnitude in the proportional correction range becomes a possible minimum value. In such case, by constant magnitude correction, greater correction than that of FIG. 32(B) is provided to overrun the target value. While such control architecture thus tends to cause difficulty to precisely correct the screw rotation speed at the target value, it may be possible to make adjustment not to exceed the deadband so as to permit narrowing of the deadband.

Even in this control architecture, control is performed by following three ranges depending upon light blocking period differnce T:
① deadband;
② constant magnitude correction range;
③ proportional correction range; and
③ abnormality correction range.

In FIG. 32(C), LB represents the range of fluctuation of the light blocking period difference T in the constant magnitude correction, LN represents an absolute value of the correction magnitude in the constant magnitude correction. Also, PN represents an upper limit of the correction magnitude for the extruder screw rotation speed. When the correction magnitude α is calculated and exceeds PN, the correction magnitude is limited to PN. In summary, the control is performed through the following processes of (1) to (7) (see FIG. 34)

(1) The light blocking period t is measured 60 times to derive the average σ. Then, the deadband is set to a width corresponding to 2σ and LB.

(2) By measuring the light blocking period t, $\Delta\tau = 1/t - 1/t_0$ relative to the target light blocking period $t_0$ is derived.

(3) At every extrusion chute, Δτ is monitored. When the Δτ is outside of the deadband, an average light blocking period difference T of $\Delta\tau_1$ to $\Delta\tau_6$ of the subsequent six extrusion chute is taken. If |T| becomes outside of the deadband, correction of the extruder screw rotation speed is initiated. Here, the reason to judge whether correction is to be performed or not is made by obtaining the average T of $\Delta\tau_1$ to $\Delta\tau_6$ after $\Delta\tau_0$ to avoid initiation of correction in response to a temporary fluctuation (measurement error) for only one chute.

(4) Though the foregoing (3), if |T|>LB, judgment within the constant magnitude correction range is made so that the absolute value α of the extruder screw rotation speed correction magnitude is set at LN to accelerate the screw rotation speed by ΔN=LN when T<0, to decelerate the screw rotation speed by ΔN=−LN when T>0.

(5) Through the foregoing (3), if |T|>LB, the absolute value α=a×|T| of the extruder screw rotation speed correction magnitude is derived.

(6) If not α>PN, judgment within the proportional correction range is made, so that the screw rotation speed is accelerated for ΔN=α when T<0, the screw rotation speed is decelerated for ΔN=−α when T>0.

(7) If α>PN, judgment within the abnormality correction range is made, so that the screw rotation speed is accelerated for ΔN=PN when T<0, the screw rotation speed is decelerated for ΔN=−PN when T>0.

The effects of the shown embodiment will be discussed herebelow:

(1) The control constant "a" is calculated automatically. Accordingly, the control constant "a" can be derived quickly without relying on the operator's trial and error, and thus provides high reproducing ability of the control.

(2) Since the control constant "a" can be derived corresponding to the resin, it may provide high precision of control.

(3) Since the parison length is controlled on the basis of the error (parison length difference) between the current parison length and the target parison length, high precision can be provided for control. Also, since the control is performed depending upon the parison length difference, possibility of causing hunting can be reduced and the converging period can be shortened.

(4) Since the object of control is the extruder screw rotation speed and not to modify the timing of locking of the molds, synchronization to the parison thickness control which is performed cyclically with a constant interval can be facilitated. In addition, since the parison length can be controlled to be constant, the thickness distribution of the article can be controlled with high precision.

(5) Since the locking timing of the molds is not modified, it is unnecessary to adjust the operation timing and the operation speed of the mechanical system to permit adaptation for high speed molding.

(6) The deadband can be set on the basis of the data reflecting the fluctuation of the current parison length with respect to the molding device to be actually used. Therefore, the deadband can be set at a proper range to successfully avoid hunting.

(7) The deadband can be calculated automatically. Accordingly, the deadband can be set quickly without requiring trial and error of the operator. Also, high reproducing ability can be achieved.

(8) Since the current parison length is calculated from the light blocking period, it becomes possible to accurately and easily derive the parison length.

(9) The items which the operator enters through the input device 542 are only the target parison length and the mounting position of the phototube 541.

Therefore, the control precision is not affected by the particular ability of the operators.

(10) Since the controller 540 monitors the parison length difference, an alarm function for sensing abnormal parison length can be provided by setting an allowable range of the parison length.

(11) Even when the screw rotation speed can be set in an arbitrary manner, the parison length can be automatically controlled at the target length. Namely, even when arbitrarily set the screw rotation speed may quickly converge to the desired speed. Therefore, setting of the screw rotation speed is significantly facilitated.

(12) It has been commonly performed in practical operation that during the period from initiation of the molding operation to stabilizing of the parison, one can effect concentration of the parison, stacking of the parison on the guide pin of the molds or so forth by driving the screw at lower speed than the normal speed, and accelerating the screw rotation speed to the normal speed after stabilization of the parison. However, by employing the present invention the molding operation is initiated by setting the screw rotation speed at a low speed, and the foregoing problem can be successfully avoided to permit smooth take-up of the molding operation.

It should be noted that, in the shown embodiment of the invention, the current parison length measurement may not be specified to the light blocking period measurement by the phototube, but can be done by various other means, such as an image processing camera, or the like.

As set forth above, according to the present invention, the control constant can be determined with respect to the resin to be used. Also, with the present invention, the parison length can be controlled with high precision so as to permit high precision control of the thickness distribution of the article. In addition, the present invention can be well adapted to high speed molding.

(Second Embodiment) (FIGS. 37 to 46)

As shown in FIGS. 45 and 46, a rotary type blow molding apparatus 610 includes an extruder 612 for extruding a tubular molten parison 611 hanging downwardly in a vertical direction. The blow molding machine 610 is provided with six pairs of molds 616 for clamping and closing both end of the parison. The six pairs of molds 516 are mounted on a turntable 615 via mounting plates 617, which turntable 615 is, in turn, rotatably mounted on a base 613 arranged in front of the extruder 612, for rotation about a support shaft 614. Each of the six pairs of the molds 616 are designed to be intermittently moved in the circumferential direction in order through stations A to F shown in FIG. 45, so that blow molding is sequentially performed for forming the molten parison 611 by blowing the blowing gas into the parison while closed by the molds 616 to expand the latter until the configuration thereof becomes coincident with that of the cavity of the molds 616 during one cycle of circumferential movement through the stations A to F.

The extruder 612 comprises a lower base 621, an upper base 623 provided above the lower base 621 to be driven to rotate in a horizontal direction relative to the lower base 621 by means of a rotatingly driving mechanism 622, and an extruder body 625 provided above the upper base 623 and adapted to be driven in a vertical direction by means of a vertical driving mechanism 624 so as to supply the molten parison 611 to the pair of molds 616 at the lowered position.

The extruder body 625 has a hopper 626 for supplying a pellet form thermoplastic resin. A screw 628 is driven to rotate by a motor 627 or so forth and is incorporated at the lower portion of the hopper 626. The hopper 626 is also provided with a cylinder 629 which is adapted to be heated by a heating device not shown. The thermoplastic resin molten in the cylinder 629 is supplied to one pair of the molds 616 as a tubular molten parison 611 through tubular extruding die heads 630 provided at the tip end of the cylinder 629. A parison cutting device 631 is provided below the die head 630. A cutter 632 of the parison cutting device 631 is adapted to cut the parison so that the upper end of the parison 611 supplied in the pair of molds 616 is slightly projected from the upper surface of the pair of molds 616.

The blow molding machine 610 is provided with a controller 640 as shown in FIG. 37 to obtain the given length of the parison (the target parison length: it is a parison length measured by the cutter 632 in this embodiment) so that the lower end of the parison 611 supplied into the mold slightly protrudes from the lower surface of the pair of molds 616 at the locking timing of the pair of molds 616, to perform the parison length control as illustrated in FIG. 38.

The blow molding machine 610 has a phototube 641 arranged below the die head 630 of the extruder 612 for enabling detection of a light blocking timing of the parison. Also, a controller 640 optionally includes an input device 642, a monitor device 643 and a motor driver 644.

The controller 640 operates in (A) deadband calculation mode, (B) control constant calculation mode, and (C) correction calculation mode as will be discussed hereinafter.

(A) Deadband Calculation Mode (see FIGS. 37, 38, 41A & B)

This mode is performed at the initial stage of the normal molding process for detecting fluctuation of the current parison length (light blocking period t) over a relatively short period and setting the deadband, in which the correction of the extruder screw rotation speed N is based on the magnitude of the fluctuation.

In general, the parison length may fluctuate according to elapsed time while the average value fluctuates moderately as illustrated in FIG. 41(A). Respective fluctuation at respective measuring timing fluctuates about the average value within a relatively small range. Such small fluctuation is caused due to fluctuation of the cut edge configuration cut by the cutter 632 or vibration of the parison, and may not be considered as the fluctuation of the extrusion amount per se. Namely, the object for control is substantial variation of the parison length (shown by solid line). The small fluctuation (shown by broken line) is preferably ignored because of the possibility of causing hunting. Therefore, according to the present invention, the width of the small fluctuation (broken line) is measured automatically for setting the deadband. The parison length control is performed to obtain the result as illustrated in FIG. 41(B).

In summary, since the parison length fluctuates as shown in FIG. 41(A), the overall fluctuation is over width $W_2$. In practice, as shown in FIG. 41(A), by obtaining data per every hour, $W_2$ can be determined.

However, through measurement within a substantially shorter interval (approximately 1 to 5 minutes) in which the substantially large and moderate variations are not effective, only $W_1$ can be obtained. Therefore, by obtaining this data before obtaining the normal article, the deadband can be set for the subsequent molding operation utilizing this data.

The fluctuation of the parison length may be applied for a statistical standard deviation $\sigma$. By setting the deadband in the width of $3\sigma$, theoretically 99.7% of small fluctuations can be ignored so that the control for correcting the extruder screw rotation speed is performed only when a fluctuation in excess of the deadband is caused.

Accordingly, the controller 640 generates a deadband automatic measurement demand after initiation of normal molding, as shown in FIGS. 37 and 38 and connects the output of the counter 651 to a deadband calculation circuit "2" (see FIG. 37) to measure the light blocking period t for many times (e.g. 60 times) to derive the average $\sigma$ and set the deadband based on the $\sigma$. The deadband width thus derived is stored in the data memory 652.

(B) Control Constant Calculation Mode (see FIGS. 37 to 40A & B)

This mode is adapted to derive a relationship between the parison length of the resin currently used (light blocking period t) and the extruder screw rotation speed N during normal molding operation.

At this time, a counter 651 of the controller 640 obtains the cutting timing of the parison 611 by the parison cutting device 631 and the light blocking timing by the parison 611 passing across the phototube 641 for deriving the difference of the timings as the light blocking period t, and uses this light blocking period t at the time of locking the parison 611 as a value corresponding to the parison length (current parison length).

The relationship between the light blocking period t and the screw rotation speed N can be determined through the following equations (1) to (6). Namely, assuming that the resin extrusion amount (weight of the resin extruded within a unit time) is Q, the resin pressure (at the tip end of the screw) is P, the parison weight is M, and constants are A, B, C, D and E, by removing $p^n$ from the equation (1) expressing the screw characteristics and the equation (2) expressing the die characteristics, the following equation (3) can be obtained.

$$Q = A \times N - B \times P^n \quad (1)$$

$$Q = C \times P^n \quad (2)$$

$Q = D \times N$ (relationship between extrusion amount and the screw rotation speed) $\quad (3)$ $$D = A \times C/(C+B)$$

The relationship between the extrusion amount and the light blocking period can be expressed by the following equation (4). Since what are actually measured are N and t, by removing Q from the equations (3) and (4), the following equation (5) can be obtained $$Q = M/t \quad (4)$$

$$N = \times (1/t) \quad (5)$$

From the foregoing equation (5), 1/t and N are proportional. As shown in FIG. 29, by adjusting the screw rotation speed in a magnitude of $\Delta N$ relative to a fluctuation magnitude $\Delta t$ of the light blocking period, the target parison length can be accurately obtained.

The control constant "a" of the equation (5) can be determined through the following equation (6) based on the current screw rotation speed $N_i$ and the current light blocking period $t_i$ corresponding thereto.

$$a = t_i N_i \quad (6)$$

Accordingly, as shown in FIG. 37, the controller 640, during normal molding process, obtains the screw rotation speed $N_i$ and the light blocking period $t_i$ to derive the light blocking period difference T which will be discussed later, to connect the output of the counter 651 to the control constant calculation circuit "1" as long as the light blocking period difference T is output the deadband stored in the data memory 652 for deriving the control constant "a" employing the foregoing equation (6) with respect to mutually corresponding $N_i$ and $t_i$. The control constant "a" thus derived is stored in the data memory 652. At this time, the revolution speed of the motor 627 driving the screw 628 is detected by the pulse generator 633 and fed back to the motor driver 644. The controller 640 uses the detected value of the pulse generator 633 as the screw rotation speed $N_1$.

It should be noted that the controller 640 in practice calculates $a = T_{AVE} \cdot N_{AVE}$ by measuring the light blocking period $t_i$ ($i = 1$ to 6) to set the average thereof as $t_{AVE}$ by sequentially performing the measurement six times when the light blocking period difference becomes out of the deadband (or normally over six times) and to set the average of the screw rotation speed at the corresponding period as $N_{AVE}$. The reason for six times (n times) measurement and using the average value is to ignore the fluctuations of the measured value.

In calculation of the control constant "a", it is sufficient to have one set of the screw rotation speed N (or $N_{AVE}$) and the light blocking period t (or $t_{AVE}$). Namely, although the control constant "a" can be obtained as a gradient $[N = a \times (1/t)]$ of a linear function passing two points, i.e. $(1/t_1, N_1)$ and $(1/t_2, N_2)$, as shown in FIG. 40(A), it is also possible to derive the control constant can be obtained as a gradient $[N = a \times (1/t)]$ of the linear function extending through origin (0, 0) and one point (1/t, N) as shown in FIG. 40(B). It should be noted that when the control constant "a" is derived from the gradient of the linear function passing two points as shown in FIG. 40(A), the error of the control constant "a" becomes large when the two points are set in too close positions.

(C) Correction Magnitude Calculation Mode (see FIGS. 37, 38, 42A, B & C to 44)

This mode is performed during the normal molding operation to detect the current parison length (light blocking period t), to derive a parison length difference (light blocking period difference T) between the current parison length (the reciprocal of the light blocking period t) and the target parison length (the reciprocal of the target light blocking period), to control the extruder screw rotation speed (N) by calculating the correction value ($\Delta N$) of the extruder screw rotation speed corresponding to the parison length difference (light blocking period difference) with employing the preliminarily set control constant of the mode (a), and thus to obtain the target parison length. It should be noted that the target light blocking period $t_0$ can be obtained through $l_0/L=t_0/$molding cycle ($l_0$: the parison length from the cutter 632 to the phototube 641, L is the target parison length; see FIG. 37).

Accordingly, as shown in FIG. 37, the controller 640, in the normal molding process, reads out the control constant "a" and the deadband width from the data memory 652, connects the output of the counter 651 to a correction amount calculation circuit "3" (see FIG. 37), derives the difference T between the reciprocal of the light blocking period t and the reciprocal of the target light blocking period $t_0$, and calculates the correction magnitude $\Delta N$ of the extruder screw rotation speed corresponding to the light blocking period difference T employing the control constant "a" when the light blocking period difference T is outside of the deadband. Then, the controller 640 controls the driving of the motor 627 of the screw 628 through the motor driver 644 to attain the target parison length.

It should be noted that the controller 640 may employ the following control architectures of (C-1) to (C-3), in practice.

(C-1) Control Architecture of FIG. 42(A)

In this control architecture, control is performed through following three ranges depending upon light blocking period differnce T:
① deadband;
② proportional correction range; and
③ abnormality correction range.

In FIG. 42(A), PN denotes the upper limit of the correction magnitude for the extruder screw rotation speed. When the calculated correction magnitude $\alpha$ exceeds PN, the correction magnitude is limited to PN. Specifically, the following control is performed (see FIG. 43).

(1) After initiation of the molding process, the output of the counter 651 is connected to the deadband calculation circuit "2". The light blocking period t is measured 60 times to derive the average $\sigma$. Then, the deadband is set to a width corresponding to $3\sigma$. The process of this (1) can be neglected.

(2) Then, by connecting the output of the counter 651 to the correction amount calculation circuit "3" and by measuring the light blocking period t, the expression $\Delta\tau=1/t-1/t_0$ relative to the target light blocking period $t_0$ is derived.

(3) At every extrusion chute, $\Delta\tau$ is monitored. When the $\Delta\tau$ becomes outside of the deadband, the average light blocking period difference T is based upon $\Delta\tau_1$ to $\Delta\tau_6$ of the subsequent six extrusion chutes. If T becomes outside of the deadband, correction of the extruder screw rotation speed is initiated. Here, the reason to judge whether correction is to be performed or not by obtaining the average T of $\Delta\tau_1$ to $\Delta\tau_6$ after $\Delta\tau_0$ is to avoid initiation of correction in response to a temporary fluctuation (measurement error) for only one chute.

At this time, the output of the counter 651 is connected to the control constant calculation circuit "1", to drive the average $t_{AVE}$ of the light blocking period $t_1$ to $t_6$ corresponding to $\Delta\tau_1$ to $\Delta\tau_6$, derives the average $N_{AVE}$ of the screw rotation speeds $N_1$ to $N_6$ corresponding thereto, and to derive the control constant "a" through the equation of $a=t_{AVE}\cdot N_{AVE}$.

(4) Next, the output of the counter 651 is again connected to the correction magnitude calculation circuit "3" so that the absolute value $\alpha=a\times|T|$ of the extruder screw rotation speed employing the control constant "a" derived through the process of (3).

(5) If $\alpha>$PN, judgment within the proportional correction range is made so that the screw rotation speed is accelerated for $\Delta N=\alpha$ when $T<0$, and the screw rotation speed is decelerated for $\Delta N=-\alpha$ when $T>0$.

(6) If $\alpha>$PN, Judgment within the abnormality correction range is made, so that the screw rotation speed is accelerated for $\Delta N=$PN when $T<0$, the screw rotation speed is decelerated for $\Delta N=-$PN when $T>0$.

(C-2) Control Architecture of FIG. 42(B)

This control architecture narrows the deadband (for instance, the width of the deadband is set at $2\sigma$) and expand the proportional correction range for control.

Even in this control architecture, control is performed through following three ranges depending upon the light blocking period difference T:
① deadband;
② proportional correction range; and
③ abnormality correction range.

The concrete operation is the same as that illustrated in FIG. 43.

(C-3) Control Architecture of FIG. 42(C)

This architecture is established by expanding the minimum correction magnitude in the proportional correction range by narrowing the deadband (C-2) similarly to (C-2).

This control architecture is effective in the following case. When resolution is rough in the extruder screw rotation speed control, the minimum correction magnitude cannot be made smaller. In such case, the deadband cannot be narrowed beyond the possible minimum correction magnitude in case of the control architecture of FIG. 42(B). In contrast, in case of the control architecture of FIG. 42(C), the deadband can be narrowed beyond the range where the correction magnitude in the proportional correction range becomes a possible minimum value. In such case, by constant magnitude correction, greater correction than that of FIG. 42(B) is provided to overrun the target value. While such control architecture thus tends to cause difficulty to precisely correct the screw rotation speed at the target value, it may be possible to make adjustment not to exceed the deadband so as to permit narrowing of the deadband.

Even in this control architecture, control is performed through following three ranges depending upon light blocking period differnce T:
① deadband;
② constant magnitude correction range;
③ proportional correction range; and
④ abnormality correction range.

In FIG. 42(C), LB represents a range of fluctuation of the light blocking period difference T in the constant magnitude correction, and LN represents an absolute value of the correction magnitude in the constant magnitude correction. Also, PN represents an upper limit of the correction magnitude for the extruder screw rotation speed. When the correction magnitude $\alpha$ is calculated and exceeds PN, the correction magnitude is limited to PN. Specifically the control is performed through the following processes of (1) to (7) (see FIG. 44)

(1) After initiation of the molding operation, the output of the counter 651 is connected to the deadband calculation circuit "2". The light blocking period t is measured 60 times to derive the average $\sigma$. Then, the deadband is set in a width corresponding to $2\sigma$ and LB.

(2) Next, by connecting the output of the counter 651 to the correction magnitude calculation circuit "3" and by measuring the light blocking period t, $\Delta\tau = 1/t - 1/t_0$ relative to the target light blocking period $t_0$ is derived.

(3) At every extrusion chute, $\Delta\tau$ is monitored. When the $\Delta\tau$ becomes outside of the deadband, an average light blocking period difference T is based upon $\Delta\tau_1$ to $\Delta\tau_6$ of the subsequent six extrusion chutes. If $|T|$ becomes outside of the deadband, correction of the extruder screw rotation speed is initiated. Here, the reason to judge whether correction is to be performed or not by obtaining the average T of $\Delta\tau_1$ to $\Delta\tau_1$ after $\Delta\tau_0$ is to avoid initiation of correction in response to a temporary fluctuation (measurement error) for only one chute.

(4) Though the foregoing (3), if $|T| > LB$, judgment within the constant magnitude correction range is made so that the absolute value $\alpha$ of the extruder screw rotation speed correction magnitude is set at LN to accelerate the screw rotation speed by $\Delta N = LN$ when $T < 0$, to decelerate the screw rotation speed by $\Delta N = -LN$ when $T > 0$.

(5) Though the foregoing (3), if $|T| > LB$, the output of the counter 651 is connected to the control constant calculation circuit "1". An average light blocking period difference $t_{AVE}$ of $t_1$ to $t_6$ corresponding to $\Delta\tau_1$ to $\Delta\tau_6$ is derived, an average value $N_{AVE}$ of the screw rotation speeds $N_1$ to $N_6$ corresponding thereto is calculated and the control constant "a" is calculated as $a = t_{AVE} \cdot N_{AVE}$. Then, the output of the counter 651 is connected again to the correction magnitude calculation circuit "3" to derive the absolute value $\alpha = a \times |T|$ of the extruder correction magnitude is calculated.

(6) If $\alpha$ is not greater than PN, judgment within the proportional correction range is made, so that the screw rotation speed is accelerated for $\Delta N = \alpha$ when $T < 0$, the screw rotation speed is decelerated for $\Delta N = -\alpha$ when $T > 0$.

(7) If $\alpha > PN$, judgment within the abnormality correction range is made, so that the screw rotation speed is accelerated for $\Delta N = PN$ when $T < 0$, the screw rotation speed is decelerated for $\Delta N = -PN$ when $T > 0$.

The effects of the shown embodiment will be discussed herebelow:

(1) The control constant "a" is calculated automatically. Accordingly, the control constant "a" can be derived quickly without relying on the operator's trial and error, and can thus provide high reproducing ability of the control.

(2) The control constant can be derived with respect to the current used resin, and especially depending upon the property variation of the resin in real time. Accordingly, high precision control can be achieved.

In addition, (a) since it becomes unnecessary to preliminarily perform test process for obtaining the control constant and the control constant can be derived during the normal molding process, it becomes possible to save the resin and power required for test process. (b) Even when the die head comprising the die and core is modified for new resin and for new parison configuration, normal molding operation for obtaining normal products can be directly initiated without performing the test process. (c) When the control constant derived through the test process is employed, it is possible that the control constant becomes outside of an optimal value due to variation of the property of the resin resulting from variation of the resin between lots or variation of the mixture ratio of a recycled resin to lower the precision of control. The present invention is adapted to derive the control constant from time to time so that the control constant can always be maintained at the optimal value to permit optimal control.

(3) Since the parison length is controlled on the basis of the error (parison length difference) between the current parison length and the target parison length, high precision can be provided for control. Also, since the control is performed depending upon the parison length difference, possibility of causing hunting can be reduced and the converging period can be shortened.

(4) Since the object of control is the extruder screw rotation speed and not the timing of locking of the molds, synchronization to the parison thickness control which is performed cyclically with a constant interval can be facilitated. In addition, since the parison length can be controlled to be constant, the thickness distribution of the article can be controlled with high precision.

(5) Since the locking timing of the molds is not modified, it is unnecessary to adjust the operation timing and the operation speed of the mechanical system to permit adaption for high speed molding.

(6) The deadband can be set on the basis of the data reflecting the fluctuation of the current parison length with respect to the molding device to be actually used. Therefore, the deadband can be set at the proper range to successfully avoid hunting.

(7) The deadband can be calculated automatically. Accordingly, the deadband can be set quickly without requiring trial and error of the operator. Also, high reproducing ability can be achieved.

(8) The current parison length is calculated from the light blocking period; it becomes possible to accurately and easily derive the parison length.

(9) The items which the operator enters through the input device 642 are only the target parison length and the mounting position of the phototube 641. Therefore, the control precision may not be affected by the particular ability of the operators.

(10) Since the controller 640 monitors the parison length difference, an alarm function for occurrence of abnormal parison length can be provided by setting an allowable range of the parison length.

(11) Even when the screw rotation speed can be set in an arbitrary manner, the parison length can be automatically controlled at the target length. Namely, even when the screw rotation speed is arbitrarily set, the screw rotation speed may quickly converge to the desired speed. Therefore, setting of the screw rotation speed is significantly facilitated.

(12) It has been commonly performed in practical operation that during the period from initiation of the molding operation to stabilizing of the parison, it is possible to achieve concentration of the parison, stacking of the parison on the guide pin of the molds or so forth by driving the screw at a lower speed than the normal speed, and to accelerate to screw rotation speed to the normal speed after stabilization of the parison. However, by employing the present invention the molding operation is initiated by setting the screw rotation speed at low speed, and the foregoing problems can be successfully avoided to permit smooth take-up of the molding operation.

It should be noted that, in the shown embodiment of the invention, the current parison length measurement may not be specified to the light blocking period measurement by the phototube, but can be done by various other means, such as an image processing camera or so forth.

It should be noted that, in the shown embodiment of the invention, it is used as a blow molding machine in which the both ends of the parison are clamped by molds, to which a blowing gas is blown thereto. However, the invention can be applied a blow molding machine of the blow pin type in which one end of the parison is clamped by a mold, and in which a blow gas may be blown into the closed parison. In this case, another end of the parison is clamped and blowing is performed by the blowing gas injection means which is formed separately from the mold.

As set forth above, according to the present invention, the control constant can be determined with respect to the resin to be used. Also, with the present invention, the parison length can be controlled with high precision so as to permit high precision control of the thickness distribution of the article. In addition, the present invention can be well adapted to the high speed molding.

Although the invention has been illustrated and described with respect to several exemplary embodiments thereof, it should be understood by those skilled in the art that the foregoing and various other changes, omissions and additions may be made therein and thereto, without departing from the spirit and scope of the present invention. Therefore, the present invention should not be understood as limited to any specific embodiment set out above but to include all possible embodiments which can be embodied within the scope encompassed, and equivalents thereof, as set out in the appended claims.

What is claimed is:

1. A parison length control method for a blow molding machine, in which a parison is extruded from an extruder to hang in a substantially vertical manner, wherein the end of said parison is closed and a blowing gas is blown into the closed parison, the method comprising the steps of:
preliminarily deriving a relationship between a parison length and a screw rotation speed of the extruder depending upon the resin to be used, during a test molding process;
detecting a current parison length during normal molding operation with a constant locking timing;
deriving a parison length difference between the current parison length and a target parison length;
controlling the extruder screw rotation speed by calculating a correction amount for the extruder screw rotation speed depending upon said parison length difference according to the preliminarily determined relationship between the parison length and the extruder screw rotation speed and adjusting said extruder screw rotation speed by said correction amount to attain the target parison length.

2. A parison length control method for a blow molding machine as set forth in claim 1, which further comprises the step of deriving a fluctuation of the current parison length over a relatively short period and setting a width of a deadband, in which the correction of the extruder screw rotation speed is not performed, on the basis of the magnitude of the fluctuation.

3. A parison length control method for a blow molding machine as set forth in either of claim 1 or 2, wherein a period, in which a light is blocked by the parison, is measured by a phototube provided below the extruder and the measured period is used as a value corresponding to the current parison length.

4. A parison length control method for a blow molding machine, in which a parison is extruded from an extruder to hang, the end of said parison is closed a blowing gas is blown into the closed parison, the method comprising the steps of:
detecting a current parison length during normal molding operation with a constant locking timing;
deriving a parison length difference between the current parison length and a target parison length;
deriving a relationship between a parison length of a resin to be used and a screw rotation speed of the extruder;
controlling the extruder screw rotation speed by calculating a correction amount for the extruder screw rotation speed depending upon said parison length difference according to the determined relationship and adjusting said extruder screw rotation speed by said correction amount to attain the target parison length.

5. A parison length control method for a blow molding machine as set forth in claim 4, which further comprises the step of deriving a fluctuation of the current parison length over a relatively short period and setting a width of a deadband, in which the correction of the extruder screw rotation speed is not performed, on the basis of the magnitude of the fluctuation.

6. A parison length control method for a blow molding machine as set forth in claim 4 or 5, wherein a period in which a light is blocked by the parison, is measured by a phototube provided below the extruder and the measured period is used as a value corresponding to the current parison length.

* * * * *

UNITED STATES PATENT AND TRADEMARK OFFICE
CERTIFICATE OF CORRECTION

PATENT NO. : 5,399,302
DATED : March 21, 1995
INVENTOR(S) : Tokuji Noguchi et al It is certified that error appears in the above-indentified patent and that said Letters Patent is hereby corrected as shown below:

In Column 2, line 45, please delete "e,crc/2/" and substitute --  --.

In Column 20, line 26, delete "22" and substitute --10--, also delete "10" and substitute --22--.

In Column 24, line 16, delete "a" and substitute --A--.

In Column 33, line 65, delete "$N=x(1/t)$" and substitute --$N=a \times (1/t)$--.

In Column 35, line 51, before and after "T" insert -- | --.

In Column 37, line 17, delete "$\Delta T_1$", second occurrence, and substitute --$\Delta T_6$--;
line 43, delete "—when" and substitute -- —α when--.

Signed and Sealed this

Sixth Day of June, 1995

*Attest:*

Bruce Lehman

BRUCE LEHMAN

*Attesting Officer*  *Commissioner of Patents and Trademarks*